(12) United States Patent
Nichols

(10) Patent No.: US 12,000,458 B2
(45) Date of Patent: *Jun. 4, 2024

(54) REVERSIBLE VARIABLE DRIVES AND SYSTEMS AND METHODS FOR CONTROL IN FORWARD AND REVERSE DIRECTIONS

(71) Applicant: Fallbrook Intellectual Property Company LLC, Leander, TX (US)

(72) Inventor: Jon M. Nichols, Georgetown, TX (US)

(73) Assignee: Fallbrook Intellectual Property Company LLC, Leander, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/084,870

(22) Filed: Dec. 20, 2022

(65) Prior Publication Data

US 2023/0279927 A1    Sep. 7, 2023

Related U.S. Application Data

(63) Continuation of application No. 17/527,775, filed on Nov. 16, 2021, now Pat. No. 11,530,739, which is a
(Continued)

(51) Int. Cl.
*F16H 15/52* (2006.01)

(52) U.S. Cl.
CPC .................... *F16H 15/52* (2013.01)

(58) Field of Classification Search
CPC ...................................... F16H 15/52
See application file for complete search history.

(56) References Cited

U.S. PATENT DOCUMENTS

| 225,933 A | 3/1880 | Kellogg |
| 719,595 A | 2/1903 | Huss |

(Continued)

FOREIGN PATENT DOCUMENTS

| CH | 118064 | 12/1926 |
| CN | 1047556 | 12/1990 |

(Continued)

OTHER PUBLICATIONS

Office Action dated Jan. 18, 2017 in U.S. Appl. No. 14/529,773 (LINEARB.073DI).
(Continued)

*Primary Examiner* — Sherry L Estremsky
(74) *Attorney, Agent, or Firm* — Sheppard, Mullin, Richter & Hampton LLP

(57) ABSTRACT

A ball-planetary continuously variable transmission (CVT) capable of stable control in forward and reverse rotation over a range of speed ratios including underdrive and overdrive is provided. Imparting a skew angle (zeta) causes unbalanced forces that change the tilt angle (gamma), resulting in a change in speed ratio of the CVT. Angularly orientating a control system of the CVT with a positive offset angle (psi) configures the CVT for operation in a first direction of rotation or angularly orientating the control system with a negative offset angle (psi) configures the CVT for operation in a reverse direction of rotation. A control system for configuring the offset angle (psi) may lead or trail the planets. The control system may configure a larger offset angle for more stable control or may configure a smaller offset angle for higher sensitivity in potential rollback scenarios.

6 Claims, 38 Drawing Sheets

Related U.S. Application Data continuation of application No. 16/799,025, filed on Feb. 24, 2020, now Pat. No. 11,174,922.

(60) Provisional application No. 62/810,832, filed on Feb. 26, 2019.

(56) References Cited

U.S. PATENT DOCUMENTS

| | | |
|---|---|---|
| 721,663 A | 3/1903 | Brooke |
| 1,121,210 A | 12/1914 | Teckel |
| 1,175,677 A | 3/1916 | Barnes |
| 1,207,985 A | 12/1916 | Null |
| 1,380,006 A | 5/1921 | Nielsen |
| 1,390,971 A | 9/1921 | Samain |
| 1,558,222 A | 10/1925 | Beetow |
| 1,629,092 A | 5/1927 | Crockett |
| 1,629,902 A | 5/1927 | Arter |
| 1,686,446 A | 10/1928 | Gilman |
| 1,774,254 A | 8/1930 | Daukus |
| 1,793,571 A | 2/1931 | Vaughn |
| 1,847,027 A | 2/1932 | Thomsen |
| 1,850,189 A | 3/1932 | Weiss |
| 1,858,696 A | 5/1932 | Weiss |
| 1,865,102 A | 6/1932 | Hayes |
| 1,903,228 A | 3/1933 | Thomson |
| 1,947,044 A | 2/1934 | Gove |
| 1,978,439 A | 10/1934 | Sharpe |
| 2,030,203 A | 2/1936 | Gove |
| 2,060,884 A | 11/1936 | Madle |
| 2,086,491 A | 7/1937 | Dodge |
| 2,097,631 A | 11/1937 | Madle |
| 2,100,629 A | 11/1937 | Chilton |
| 2,109,845 A | 3/1938 | Madle |
| 2,112,763 A | 3/1938 | Cloudsley |
| 2,123,008 A | 7/1938 | Hayes |
| 2,131,158 A | 9/1938 | Almen |
| 2,134,225 A | 10/1938 | Christiansen |
| 2,152,796 A | 4/1939 | Erban |
| 2,196,064 A | 4/1940 | Erban |
| 2,209,254 A | 7/1940 | Ahnger |
| 2,259,933 A | 10/1941 | Holloway |
| 2,269,434 A | 1/1942 | Brooks |
| 2,314,833 A | 3/1943 | Keese |
| 2,325,502 A | 7/1943 | Georges |
| RE22,761 E | 5/1946 | Wemp |
| 2,461,258 A | 2/1949 | Brooks |
| 2,469,653 A | 5/1949 | Kopp |
| 2,480,968 A | 9/1949 | Ronai |
| 2,553,465 A | 5/1951 | Monge |
| 2,563,370 A | 8/1951 | Reese |
| 2,586,725 A | 2/1952 | Schottler |
| 2,595,367 A | 5/1952 | Picanol |
| 2,596,538 A | 5/1952 | Dicke |
| 2,597,849 A | 5/1952 | Alfredeen |
| 2,675,713 A | 4/1954 | Acker |
| 2,696,888 A | 12/1954 | Chillson |
| 2,716,357 A | 8/1955 | Rennerfelt |
| 2,730,904 A | 1/1956 | Rennerfelt |
| 2,748,614 A | 6/1956 | Weisel |
| 2,868,038 A | 1/1959 | Billeter |
| 2,873,911 A | 2/1959 | Perrine |
| 2,874,592 A | 2/1959 | Oehrli |
| 2,883,883 A | 4/1959 | Chillson |
| 2,891,213 A | 6/1959 | Kern |
| 2,901,924 A | 9/1959 | Banker |
| 2,913,932 A | 11/1959 | Oehrli |
| 2,931,234 A | 4/1960 | Hayward |
| 2,931,235 A | 4/1960 | Hayward |
| 2,949,800 A | 8/1960 | Neuschotz |
| 2,959,063 A | 11/1960 | De Brie Perry |
| 2,959,070 A | 11/1960 | Flinn |
| 2,959,972 A | 11/1960 | Madson |
| 2,964,959 A | 12/1960 | Beck |
| 2,982,154 A | 5/1961 | Zapletal |
| 3,008,061 A | 11/1961 | Mims |
| 3,028,778 A | 4/1962 | Hayward |
| 3,035,460 A | 5/1962 | Guichard |
| 3,048,056 A | 8/1962 | Wolfram |
| 3,051,020 A | 8/1962 | Hartupee |
| 3,081,641 A | 3/1963 | Iseman |
| 3,086,704 A | 4/1963 | Hurtt |
| 3,087,348 A | 4/1963 | Kraus |
| 3,088,704 A | 5/1963 | Grady |
| 3,154,957 A | 11/1964 | Kashihara |
| 3,163,050 A | 12/1964 | Kraus |
| 3,176,542 A | 4/1965 | Monch |
| 3,184,983 A | 5/1965 | Kraus |
| 3,204,476 A | 9/1965 | Rouverol |
| 3,207,248 A | 9/1965 | Strom |
| 3,209,606 A | 10/1965 | Yamamoto |
| 3,211,364 A | 10/1965 | Wentling |
| 3,216,283 A | 11/1965 | General |
| 3,229,538 A | 1/1966 | Schottler |
| 3,237,468 A | 3/1966 | Schottler |
| 3,246,531 A | 4/1966 | Kashihara |
| 3,248,960 A | 5/1966 | Schottler |
| 3,273,468 A | 9/1966 | Allen |
| 3,277,745 A | 10/1966 | Harned |
| 3,280,646 A | 10/1966 | Lemieux |
| 3,283,614 A | 11/1966 | Hewko |
| 3,292,443 A | 12/1966 | Perruca |
| 3,340,895 A | 9/1967 | Osgood, Jr. |
| 3,407,687 A | 10/1968 | Hayashi |
| 3,413,896 A | 12/1968 | Wildhaber |
| 3,430,504 A | 3/1969 | Dickenbrock |
| 3,439,563 A | 4/1969 | Petty |
| 3,440,895 A | 4/1969 | Fellows |
| 3,464,281 A | 9/1969 | Azuma |
| 3,477,315 A | 11/1969 | Macks |
| 3,487,726 A | 1/1970 | Burnett |
| 3,487,727 A | 1/1970 | Gustafsson |
| 3,574,289 A | 4/1971 | Scheiter |
| 3,581,587 A | 6/1971 | Dickenbrock |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz |
| 3,743,063 A | 7/1973 | Blechschmidt |
| 3,745,844 A | 7/1973 | Schottler |
| 3,768,715 A | 10/1973 | Tout |
| 3,769,849 A | 11/1973 | Hagen |
| 3,800,607 A | 4/1974 | Zurcher |
| 3,802,284 A | 4/1974 | Sharpe |
| 3,810,398 A | 5/1974 | Kraus |
| 3,820,416 A | 6/1974 | Kraus |
| 3,866,985 A | 2/1975 | Whitehurst |
| 3,891,235 A | 6/1975 | Shelly |
| 3,934,493 A | 1/1976 | Hillyer |
| 3,954,282 A | 5/1976 | Hege |
| 3,984,129 A | 10/1976 | Hege |
| 3,987,681 A | 10/1976 | Keithley |
| 3,996,807 A | 12/1976 | Adams |
| 4,023,442 A | 5/1977 | Woods |
| 4,098,146 A | 7/1978 | McLarty |
| 4,103,514 A | 8/1978 | Grosse-Entrup |
| 4,159,653 A | 7/1979 | Koivunen |
| 4,169,609 A | 10/1979 | Zampedro |
| 4,177,683 A | 12/1979 | Moses |
| 4,227,712 A | 10/1980 | Dick |
| 4,314,485 A | 2/1982 | Adams |
| 4,345,486 A | 8/1982 | Olesen |
| 4,369,667 A | 1/1983 | Kemper |
| 4,382,186 A | 5/1983 | Denholm |
| 4,382,188 A | 5/1983 | Cronin |
| 4,391,156 A | 7/1983 | Tibbals, Jr. |
| 4,456,233 A | 6/1984 | Anton |
| 4,459,873 A | 7/1984 | Black |
| 4,464,952 A | 8/1984 | Stubbs |
| 4,468,984 A | 9/1984 | Castelli |
| 4,494,524 A | 1/1985 | Wagner |
| 4,496,051 A | 1/1985 | Ortner |
| 4,501,172 A | 2/1985 | Kraus |

(56) References Cited

U.S. PATENT DOCUMENTS

| | | |
|---|---|---|
| 4,515,040 A | 5/1985 | Takeuchi |
| 4,526,255 A | 7/1985 | Hennessey |
| 4,546,673 A | 10/1985 | Shigematsu |
| 4,560,369 A | 12/1985 | Hattori |
| 4,567,781 A | 2/1986 | Russ |
| 4,569,670 A | 2/1986 | McIntosh |
| 4,574,649 A | 3/1986 | Seol |
| 4,585,429 A | 4/1986 | Marier |
| 4,592,247 A | 6/1986 | Mutschler |
| 4,617,838 A | 10/1986 | Anderson |
| 4,628,766 A | 12/1986 | De Brie Perry |
| 4,630,839 A | 12/1986 | Seol |
| 4,631,469 A | 12/1986 | Tsuboi |
| 4,643,048 A | 2/1987 | Hattori |
| 4,651,082 A | 3/1987 | Kaneyuki |
| 4,663,990 A | 5/1987 | Hiroshi |
| 4,667,525 A | 5/1987 | Schottler |
| 4,700,581 A | 10/1987 | Tibbals, Jr. |
| 4,706,518 A | 11/1987 | Moroto |
| 4,713,976 A | 12/1987 | Wilkes |
| 4,717,368 A | 1/1988 | Yamaguchi |
| 4,735,430 A | 4/1988 | Tomkinson |
| 4,738,164 A | 4/1988 | Kaneyuki |
| 4,744,261 A | 5/1988 | Jacobson |
| 4,756,211 A | 7/1988 | Fellows |
| 4,781,663 A | 11/1988 | Reswick |
| 4,828,422 A | 5/1989 | Anthony |
| 4,838,122 A | 6/1989 | Takamiya |
| 4,838,832 A | 6/1989 | Schmitt |
| 4,856,374 A | 8/1989 | Kreuzer |
| 4,857,035 A | 8/1989 | Anderson |
| 4,869,130 A | 9/1989 | Wiecko |
| 4,881,925 A | 11/1989 | Hattori |
| 4,884,473 A | 12/1989 | Lew |
| 4,900,046 A | 2/1990 | Aranceta-Angoitia |
| 4,909,101 A | 3/1990 | Terry, Sr. |
| 4,918,344 A | 4/1990 | Chikamori |
| 4,961,477 A | 10/1990 | Sweeney |
| 4,964,312 A | 10/1990 | Kraus |
| 4,976,170 A | 12/1990 | Hayashi |
| 5,006,093 A | 4/1991 | Hiroshi |
| 5,020,384 A | 6/1991 | Kraus |
| 5,025,685 A | 6/1991 | Kobayashi |
| 5,033,322 A | 7/1991 | Nakano |
| 5,033,571 A | 7/1991 | Morimoto |
| 5,037,361 A | 8/1991 | Takahashi |
| 5,044,214 A | 9/1991 | Barber, Jr. |
| 5,059,158 A | 10/1991 | Bellio |
| 5,069,655 A | 12/1991 | Schievelbusch |
| 5,083,982 A | 1/1992 | Sato |
| 5,099,710 A | 3/1992 | Nakano |
| 5,121,654 A | 6/1992 | Fasce |
| 5,125,677 A | 6/1992 | Ogilvie |
| 5,138,894 A | 8/1992 | Kraus |
| 5,156,412 A | 10/1992 | Meguerditchian |
| 5,166,879 A | 11/1992 | Greene |
| 5,194,052 A | 3/1993 | Ueda |
| 5,230,258 A | 7/1993 | Nakano |
| 5,236,211 A | 8/1993 | Meguerditchian |
| 5,236,403 A | 8/1993 | Schievelbusch |
| 5,261,858 A | 11/1993 | Browning |
| 5,267,920 A | 12/1993 | Hibi |
| 5,269,726 A | 12/1993 | Swanson |
| 5,273,501 A | 12/1993 | Schievelbusch |
| 5,318,486 A | 6/1994 | Lutz |
| 5,319,486 A | 6/1994 | Vogel |
| 5,330,396 A | 7/1994 | Lohr |
| 5,355,749 A | 10/1994 | Obara |
| 5,356,348 A | 10/1994 | Bellio |
| 5,375,865 A | 12/1994 | Terry, Sr. |
| 5,379,661 A | 1/1995 | Nakano |
| 5,383,000 A | 1/1995 | Michaloski |
| 5,383,677 A | 1/1995 | Thomas |
| 5,387,000 A | 2/1995 | Sato |
| 5,401,221 A | 3/1995 | Fellows |
| 5,413,540 A | 5/1995 | Streib |
| 5,451,070 A | 9/1995 | Lindsay |
| 5,476,019 A | 12/1995 | Cheever |
| 5,489,003 A | 2/1996 | Ohyama |
| 5,508,574 A | 4/1996 | Vlock |
| 5,514,047 A | 5/1996 | Tibbles |
| 5,526,261 A | 6/1996 | Kallis |
| 5,531,510 A | 7/1996 | Yamane |
| 5,562,564 A | 10/1996 | Folino |
| 5,564,998 A | 10/1996 | Fellows |
| 5,577,423 A | 11/1996 | Mimura |
| 5,582,489 A | 12/1996 | Marzio |
| 5,584,778 A | 12/1996 | Machida |
| 5,601,301 A | 2/1997 | Liu |
| 5,607,373 A | 3/1997 | Ochiai |
| 5,645,507 A | 7/1997 | Hathaway |
| 5,651,750 A | 7/1997 | Takashi |
| 5,664,636 A | 9/1997 | Ikuma |
| 5,669,845 A | 9/1997 | Muramoto |
| 5,669,846 A | 9/1997 | Moroto |
| 5,683,322 A | 11/1997 | Meyerle |
| 5,690,346 A | 11/1997 | Keskitalo |
| 5,701,786 A | 12/1997 | Kawakami |
| 5,720,687 A | 2/1998 | Bennett |
| D391,824 S | 3/1998 | Larson |
| D391,825 S | 3/1998 | Larson |
| 5,722,502 A | 3/1998 | Kubo |
| 5,746,676 A | 5/1998 | Kawase |
| 5,755,303 A | 5/1998 | Yamamoto |
| D396,396 S | 7/1998 | Larson |
| 5,799,541 A | 9/1998 | Arbeiter |
| 5,819,864 A | 10/1998 | Koike |
| 5,823,052 A | 10/1998 | Nobumoto |
| 5,823,058 A | 10/1998 | Arbeiter |
| 5,839,083 A | 11/1998 | Sugiyama |
| 5,846,155 A | 12/1998 | Taniguchi |
| 5,857,387 A | 1/1999 | Larson |
| 5,888,160 A | 3/1999 | Miyata |
| 5,895,337 A | 4/1999 | Fellows |
| 5,899,827 A | 5/1999 | Nakano |
| 5,902,207 A | 5/1999 | Sugihara |
| 5,964,123 A | 10/1999 | Arbeiter |
| 5,967,933 A | 10/1999 | Valdenaire |
| 5,976,054 A | 11/1999 | Yasuoka |
| 5,984,826 A | 11/1999 | Nakano |
| 5,995,895 A | 11/1999 | Watt |
| 6,000,707 A | 12/1999 | Miller |
| 6,003,649 A | 12/1999 | Fischer |
| 6,004,239 A | 12/1999 | Makino |
| 6,006,151 A | 12/1999 | Graf |
| 6,012,538 A | 1/2000 | Sonobe |
| 6,015,359 A | 1/2000 | Kunii |
| 6,019,701 A | 2/2000 | Mori |
| 6,029,990 A | 2/2000 | Busby |
| 6,042,132 A | 3/2000 | Suenaga |
| 6,045,477 A | 4/2000 | Schmidt |
| 6,045,481 A | 4/2000 | Kumagai |
| 6,047,230 A | 4/2000 | Spencer |
| 6,053,833 A | 4/2000 | Masaki |
| 6,053,841 A | 4/2000 | Koide |
| 6,054,844 A | 4/2000 | Frank |
| 6,056,661 A | 5/2000 | Schmidt |
| 6,066,067 A | 5/2000 | Greenwood |
| 6,071,210 A | 6/2000 | Kato |
| 6,074,320 A | 6/2000 | Miyata |
| 6,076,846 A | 6/2000 | Clardy |
| 6,079,726 A | 6/2000 | Busby |
| 6,083,139 A | 7/2000 | Deguchi |
| 6,085,140 A | 7/2000 | Choi |
| 6,085,521 A | 7/2000 | Folsom |
| 6,086,506 A | 7/2000 | Petersmann |
| 6,095,940 A | 8/2000 | Ai |
| 6,095,945 A | 8/2000 | Graf |
| 6,099,431 A | 8/2000 | Hoge |
| 6,101,895 A | 8/2000 | Yamane |
| 6,113,513 A | 9/2000 | Itoh |
| 6,119,539 A | 9/2000 | Papanicolaou |
| 6,119,800 A | 9/2000 | McComber |
| 6,125,314 A | 9/2000 | Graf |

(56) References Cited

U.S. PATENT DOCUMENTS

| | | | |
|---|---|---|---|
| 6,146,297 A | 11/2000 | Kimura | |
| 6,159,126 A | 12/2000 | Oshidari | |
| 6,171,210 B1 | 1/2001 | Miyata | |
| 6,171,212 B1 | 1/2001 | Reuschel | |
| 6,174,260 B1 | 1/2001 | Tsukada | |
| 6,182,000 B1 | 1/2001 | Ohta | |
| 6,186,922 B1 | 2/2001 | Bursal | |
| 6,188,945 B1 | 2/2001 | Graf | |
| 6,203,238 B1 | 3/2001 | Otto | |
| 6,210,297 B1 | 4/2001 | Knight | |
| 6,217,473 B1 | 4/2001 | Ueda | |
| 6,217,478 B1 | 4/2001 | Vohmann | |
| 6,241,636 B1 | 6/2001 | Miller | |
| 6,243,638 B1 | 6/2001 | Abo | |
| 6,251,038 B1 | 6/2001 | Ishikawa | |
| 6,251,043 B1 | 6/2001 | Gierling | |
| 6,258,003 B1 | 7/2001 | Hirano | |
| 6,261,200 B1 | 7/2001 | Miyata | |
| 6,266,931 B1 | 7/2001 | Erickson | |
| 6,296,593 B1 | 10/2001 | Gotou | |
| 6,311,113 B1 | 10/2001 | Danz | |
| 6,312,358 B1 | 11/2001 | Goi | |
| 6,322,475 B2 | 11/2001 | Miller | |
| 6,325,386 B1 | 12/2001 | Shoge | |
| 6,340,067 B1 | 1/2002 | Fujiwara | |
| 6,356,817 B1 | 3/2002 | Abe | |
| 6,358,174 B1 | 3/2002 | Folsom | |
| 6,358,178 B1 | 3/2002 | Wittkopp | |
| 6,367,833 B1 | 4/2002 | Horiuchi | |
| 6,371,878 B1 | 4/2002 | Bowen | |
| 6,375,412 B1 | 4/2002 | Dial | |
| 6,390,945 B1 | 5/2002 | Young | |
| 6,390,946 B1 | 5/2002 | Hibi | |
| 6,406,399 B1 | 6/2002 | Ai | |
| 6,414,401 B1 | 7/2002 | Kuroda | |
| 6,419,608 B1 | 7/2002 | Miller | |
| 6,425,838 B1 | 7/2002 | Matsubara | |
| 6,434,960 B1 | 8/2002 | Rousseau | |
| 6,440,035 B2 | 8/2002 | Tsukada | |
| 6,440,037 B2 | 8/2002 | Takagi | |
| 6,449,548 B1 | 9/2002 | Jain | |
| 6,459,978 B2 | 10/2002 | Taniguchi | |
| 6,461,268 B1 | 10/2002 | Milner | |
| 6,470,252 B2 | 10/2002 | Tashiro | |
| 6,482,094 B2 | 11/2002 | Kefes | |
| 6,492,785 B1 | 12/2002 | Kasten | |
| 6,494,805 B2 | 12/2002 | Ooyama | |
| 6,499,373 B2 | 12/2002 | Van Cor | |
| 6,499,958 B2 | 12/2002 | Haugen | |
| 6,513,405 B1 | 2/2003 | Joachim | |
| 6,514,175 B2 | 2/2003 | Taniguchi | |
| 6,520,878 B1 | 2/2003 | Leclair | |
| 6,522,965 B1 | 2/2003 | Gierling | |
| 6,527,662 B2 | 3/2003 | Miyata | |
| 6,532,890 B2 | 3/2003 | Chen | |
| 6,551,210 B2 | 4/2003 | Miller | |
| 6,558,285 B1 | 5/2003 | Sieber | |
| 6,561,941 B2 | 5/2003 | Nakano | |
| 6,571,920 B1 | 6/2003 | Sturmer | |
| 6,575,047 B2 | 6/2003 | Reik | |
| 6,582,151 B2 | 6/2003 | Hopson | |
| 6,588,296 B2 | 7/2003 | Wessel | |
| 6,658,338 B2 | 12/2003 | Joe | |
| 6,659,901 B2 | 12/2003 | Sakai | |
| 6,672,418 B1 | 1/2004 | Makino | |
| 6,676,559 B2 | 1/2004 | Miller | |
| 6,679,109 B2 | 1/2004 | Gierling | |
| 6,681,652 B2 | 1/2004 | Auer | |
| 6,682,432 B1 | 1/2004 | Shinozuka | |
| 6,684,143 B2 | 1/2004 | Friedrich | |
| 6,689,012 B2 | 2/2004 | Miller | |
| 6,694,241 B2 | 2/2004 | Kim | |
| 6,718,247 B1 | 4/2004 | Graf | |
| 6,721,637 B2 | 4/2004 | Abe | |
| 6,723,014 B2 | 4/2004 | Shinso | |
| 6,723,016 B2 | 4/2004 | Sumi | |
| 6,805,654 B2 | 10/2004 | Nishii | |
| 6,808,053 B2 | 10/2004 | Kirkwood | |
| 6,839,617 B2 | 1/2005 | Mensler | |
| 6,849,020 B2 | 2/2005 | Sumi | |
| 6,859,709 B2 | 2/2005 | Joe | |
| 6,868,949 B2 | 3/2005 | Braford, Jr. | |
| 6,909,953 B2 | 6/2005 | Joe | |
| 6,931,316 B2 | 8/2005 | Joe | |
| 6,932,739 B2 | 8/2005 | Miyata | |
| 6,942,593 B2 | 9/2005 | Nishii | |
| 6,945,903 B2 | 9/2005 | Miller | |
| 6,949,049 B2 | 9/2005 | Miller | |
| 6,958,029 B2 | 10/2005 | Inoue | |
| 6,991,575 B2 | 1/2006 | Inoue | |
| 6,991,579 B2 | 1/2006 | Kobayashi | |
| 6,994,189 B2 | 2/2006 | Chen | |
| 7,000,496 B2 | 2/2006 | Wessel | |
| 7,004,487 B2 | 2/2006 | Matsumoto | |
| 7,011,600 B2 | 3/2006 | Miller | |
| 7,011,601 B2 | 3/2006 | Miller | |
| 7,011,602 B2 | 3/2006 | Makiyama | |
| 7,014,591 B2 | 3/2006 | Miller | |
| 7,029,418 B2 | 4/2006 | Taketsuna | |
| 7,032,914 B2 | 4/2006 | Miller | |
| 7,036,620 B2 | 5/2006 | Miller | |
| 7,044,884 B2 | 5/2006 | Miller | |
| 7,063,195 B2 | 6/2006 | Berhan | |
| 7,063,640 B2 | 6/2006 | Miller | |
| 7,074,007 B2 | 7/2006 | Miller | |
| 7,074,154 B2 | 7/2006 | Miller | |
| 7,074,155 B2 | 7/2006 | Miller | |
| 7,077,777 B2 | 7/2006 | Miyata | |
| 7,086,979 B2 | 8/2006 | Frenken | |
| 7,086,981 B2 | 8/2006 | Ali | |
| 7,094,171 B2 | 8/2006 | Inoue | |
| 7,111,860 B1 | 9/2006 | Grimaldos | |
| 7,112,158 B2 | 9/2006 | Miller | |
| 7,112,159 B2 | 9/2006 | Miller | |
| 7,125,297 B2 | 10/2006 | Miller | |
| 7,131,930 B2 | 11/2006 | Miller | |
| 7,140,999 B2 | 11/2006 | Miller | |
| 7,147,586 B2 | 12/2006 | Miller | |
| 7,153,233 B2 | 12/2006 | Miller | |
| 7,156,770 B2 | 1/2007 | Miller | |
| 7,160,220 B2 | 1/2007 | Shinojima | |
| 7,160,222 B2 | 1/2007 | Miller | |
| 7,163,485 B2 | 1/2007 | Miller | |
| 7,163,486 B2 | 1/2007 | Miller | |
| 7,163,846 B2 | 1/2007 | Sakai | |
| 7,166,052 B2 | 1/2007 | Miller | |
| 7,166,056 B2 | 1/2007 | Miller | |
| 7,166,057 B2 | 1/2007 | Miller | |
| 7,166,058 B2 | 1/2007 | Miller | |
| 7,169,076 B2 | 1/2007 | Miller | |
| 7,172,529 B2 | 2/2007 | Miller | |
| 7,175,564 B2 | 2/2007 | Miller | |
| 7,175,565 B2 | 2/2007 | Miller | |
| 7,175,566 B2 | 2/2007 | Miller | |
| 7,192,381 B2 | 3/2007 | Miller | |
| 7,197,915 B2 | 4/2007 | Luh | |
| 7,198,582 B2 | 4/2007 | Miller | |
| 7,198,583 B2 | 4/2007 | Miller | |
| 7,198,584 B2 | 4/2007 | Miller | |
| 7,198,585 B2 | 4/2007 | Miller | |
| 7,201,693 B2 | 4/2007 | Miller | |
| 7,201,694 B2 | 4/2007 | Miller | |
| 7,201,695 B2 | 4/2007 | Miller | |
| 7,204,777 B2 | 4/2007 | Miller | |
| 7,207,918 B2 | 4/2007 | Shimazu | |
| 7,214,159 B2 | 5/2007 | Miller | |
| 7,217,215 B2 | 5/2007 | Miller | |
| 7,217,216 B2 | 5/2007 | Inoue | |
| 7,217,219 B2 | 5/2007 | Miller | |
| 7,217,220 B2 | 5/2007 | Careau | |
| 7,226,379 B2 | 6/2007 | Ibamoto | |
| 7,232,395 B2 | 6/2007 | Miller | |
| 7,234,873 B2 | 6/2007 | Kato | |
| 7,235,031 B2 | 6/2007 | Miller | |

(56) References Cited

U.S. PATENT DOCUMENTS

| | | |
|---|---|---|
| 7,238,136 B2 | 7/2007 | Miller |
| 7,238,137 B2 | 7/2007 | Miller |
| 7,238,138 B2 | 7/2007 | Miller |
| 7,238,139 B2 | 7/2007 | Roethler |
| 7,246,672 B2 | 7/2007 | Shirai |
| 7,250,018 B2 | 7/2007 | Miller |
| 7,261,663 B2 | 8/2007 | Miller |
| 7,275,610 B2 | 10/2007 | Kuang |
| 7,285,068 B2 | 10/2007 | Hosoi |
| 7,288,042 B2 | 10/2007 | Miller |
| 7,288,043 B2 | 10/2007 | Shioiri |
| 7,320,660 B2 | 1/2008 | Miller |
| 7,322,901 B2 | 1/2008 | Miller |
| 7,343,236 B2 | 3/2008 | Wilson |
| 7,347,801 B2 | 3/2008 | Guenter |
| 7,383,748 B2 | 6/2008 | Rankin |
| 7,383,749 B2 | 6/2008 | Michael |
| 7,384,370 B2 | 6/2008 | Miller |
| 7,393,300 B2 | 7/2008 | Miller |
| 7,393,302 B2 | 7/2008 | Miller |
| 7,393,303 B2 | 7/2008 | Miller |
| 7,395,731 B2 | 7/2008 | Miller |
| 7,396,209 B2 | 7/2008 | Miller |
| 7,402,122 B2 | 7/2008 | Miller |
| 7,410,443 B2 | 8/2008 | Miller |
| 7,419,451 B2 | 9/2008 | Miller |
| 7,422,541 B2 | 9/2008 | Miller |
| 7,422,546 B2 | 9/2008 | Miller |
| 7,427,253 B2 | 9/2008 | Miller |
| 7,431,677 B2 | 10/2008 | Miller |
| 7,452,297 B2 | 11/2008 | Miller |
| 7,455,611 B2 | 11/2008 | Miller |
| 7,455,617 B2 | 11/2008 | Miller |
| 7,462,123 B2 | 12/2008 | Miller |
| 7,462,127 B2 | 12/2008 | Miller |
| 7,470,210 B2 | 12/2008 | Miller |
| 7,478,885 B2 | 1/2009 | Urabe |
| 7,481,736 B2 | 1/2009 | Miller |
| 7,510,499 B2 | 3/2009 | Miller |
| 7,540,818 B2 | 6/2009 | Miller |
| 7,547,264 B2 | 6/2009 | Usoro |
| 7,574,935 B2 | 8/2009 | Rohs |
| 7,591,755 B2 | 9/2009 | Petrzik |
| 7,632,203 B2 | 12/2009 | Miller |
| 7,651,437 B2 | 1/2010 | Miller |
| 7,654,928 B2 | 2/2010 | Miller |
| 7,670,243 B2 | 3/2010 | Miller |
| 7,686,729 B2 | 3/2010 | Miller |
| 7,717,815 B2 | 5/2010 | Tenberge |
| 7,727,101 B2 | 6/2010 | Miller |
| 7,727,106 B2 | 6/2010 | Maheu |
| 7,727,107 B2 | 6/2010 | Miller |
| 7,727,108 B2 | 6/2010 | Miller |
| 7,727,110 B2 | 6/2010 | Miller |
| 7,727,115 B2 | 6/2010 | Serkh |
| 7,731,300 B2 | 6/2010 | Gerstenslager |
| 7,731,615 B2 | 6/2010 | Miller |
| 7,762,919 B2 | 7/2010 | Smithson |
| 7,762,920 B2 | 7/2010 | Smithson |
| 7,770,674 B2 | 8/2010 | Miles |
| 7,785,228 B2 | 8/2010 | Smithson |
| 7,828,685 B2 | 11/2010 | Miller |
| 7,837,592 B2 | 11/2010 | Miller |
| 7,871,353 B2 | 1/2011 | Nichols |
| 7,882,762 B2 | 2/2011 | Armstrong |
| 7,883,442 B2 | 2/2011 | Miller |
| 7,885,747 B2 | 2/2011 | Miller |
| 7,887,032 B2 | 2/2011 | Malone |
| 7,909,723 B2 | 3/2011 | Triller |
| 7,909,727 B2 | 3/2011 | Smithson |
| 7,914,029 B2 | 3/2011 | Miller |
| 7,959,533 B2 | 6/2011 | Nichols |
| 7,963,880 B2 | 6/2011 | Smithson |
| 7,967,719 B2 | 6/2011 | Smithson |
| 7,976,426 B2 | 7/2011 | Smithson |
| 8,066,613 B2 | 11/2011 | Smithson |
| 8,066,614 B2 | 11/2011 | Miller |
| 8,070,635 B2 | 12/2011 | Miller |
| 8,087,482 B2 | 1/2012 | Miles |
| 8,123,653 B2 | 2/2012 | Smithson |
| 8,133,149 B2 | 3/2012 | Smithson |
| 8,142,323 B2 | 3/2012 | Tsuchiya |
| 8,167,759 B2 | 5/2012 | Pohl |
| 8,171,636 B2 | 5/2012 | Smithson |
| 8,197,380 B2 | 6/2012 | Heinzelmann |
| 8,230,961 B2 | 7/2012 | Schneidewind |
| 8,262,536 B2 | 9/2012 | Nichols |
| 8,267,829 B2 | 9/2012 | Miller |
| 8,313,404 B2 | 11/2012 | Carter |
| 8,313,405 B2 | 11/2012 | Bazyn |
| 8,317,650 B2 | 11/2012 | Nichols |
| 8,317,651 B2 | 11/2012 | Lohr |
| 8,321,097 B2 | 11/2012 | Vasiliotis |
| 8,321,103 B2 | 11/2012 | Sakaue |
| 8,342,999 B2 | 1/2013 | Miller |
| 8,360,917 B2 | 1/2013 | Nichols |
| 8,376,889 B2 | 2/2013 | Hoffman |
| 8,376,903 B2 | 2/2013 | Pohl |
| 8,382,631 B2 | 2/2013 | Hoffman |
| 8,382,637 B2 | 2/2013 | Tange |
| 8,393,989 B2 | 3/2013 | Pohl |
| 8,398,518 B2 | 3/2013 | Nichols |
| 8,447,480 B2 | 5/2013 | Usukura |
| 8,469,853 B2 | 6/2013 | Miller |
| 8,469,856 B2 | 6/2013 | Thomassy |
| 8,480,529 B2 | 7/2013 | Pohl |
| 8,496,554 B2 | 7/2013 | Pohl |
| 8,506,452 B2 | 8/2013 | Pohl |
| 8,512,195 B2 | 8/2013 | Lohr |
| 8,517,888 B1 | 8/2013 | Brookins |
| 8,535,199 B2 | 9/2013 | Lohr |
| 8,550,949 B2 | 10/2013 | Miller |
| 8,585,528 B2 | 11/2013 | Carter |
| 8,585,543 B1 | 11/2013 | Davis |
| 8,608,609 B2 | 12/2013 | Sherrill |
| 8,622,866 B2 | 1/2014 | Bazyn |
| 8,622,871 B2 | 1/2014 | Hoff |
| 8,626,409 B2 | 1/2014 | Vasiliotis |
| 8,628,443 B2 | 1/2014 | Miller |
| 8,641,572 B2 | 2/2014 | Nichols |
| 8,641,577 B2 | 2/2014 | Nichols |
| 8,663,050 B2 | 3/2014 | Nichols |
| 8,663,052 B2 | 3/2014 | Sich |
| 8,678,974 B2 | 3/2014 | Lohr |
| 8,682,545 B2 | 3/2014 | Jiang |
| 8,688,337 B2 | 4/2014 | Takanami |
| 8,708,360 B2 | 4/2014 | Miller |
| 8,721,485 B2 | 5/2014 | Lohr |
| 8,738,255 B2 | 5/2014 | Carter |
| 8,776,633 B2 | 7/2014 | Armstrong |
| 8,784,248 B2 | 7/2014 | Murakami |
| 8,790,214 B2 | 7/2014 | Lohr |
| 8,814,739 B1 | 8/2014 | Hamrin |
| 8,818,661 B2 | 8/2014 | Keilers |
| 8,827,856 B1 | 9/2014 | Younggren |
| 8,827,864 B2 | 9/2014 | Durack |
| 8,845,485 B2 | 9/2014 | Smithson |
| 8,852,050 B2 | 10/2014 | Thomassy |
| 8,870,711 B2 | 10/2014 | Pohl |
| 8,888,643 B2 | 11/2014 | Lohr |
| 8,900,085 B2 | 12/2014 | Pohl |
| 8,920,021 B2 | 12/2014 | Mertenat |
| 8,920,285 B2 | 12/2014 | Smithson |
| 8,924,111 B2 | 12/2014 | Fuller |
| 8,956,262 B2 | 2/2015 | Tomomatsu |
| 8,961,363 B2 | 2/2015 | Shiina |
| 8,968,152 B2 | 3/2015 | Beaudoin |
| 8,992,376 B2 | 3/2015 | Ogawa |
| 8,996,263 B2 | 3/2015 | Quinn, Jr. |
| 9,017,207 B2 | 4/2015 | Pohl |
| 9,022,889 B2 | 5/2015 | Miller |
| 9,046,158 B2 | 6/2015 | Miller |
| 9,052,000 B2 | 6/2015 | Cooper |
| 9,074,674 B2 | 7/2015 | Nichols |

(56) References Cited

U.S. PATENT DOCUMENTS

| | | |
|---|---|---|
| 9,086,145 B2 | 7/2015 | Pohl |
| 9,121,464 B2 | 9/2015 | Nichols |
| 9,182,018 B2 | 11/2015 | Bazyn |
| 9,239,099 B2 | 1/2016 | Carter |
| 9,249,880 B2 | 2/2016 | Vasiliotis |
| 9,273,760 B2 | 3/2016 | Pohl |
| 9,279,482 B2 | 3/2016 | Nichols |
| 9,291,251 B2 | 3/2016 | Lohr |
| 9,328,807 B2 | 5/2016 | Carter |
| 9,341,246 B2 | 5/2016 | Miller |
| 9,360,089 B2 | 6/2016 | Lohr |
| 9,365,203 B2 | 6/2016 | Keilers |
| 9,371,894 B2 | 6/2016 | Carter |
| 9,388,896 B2 | 7/2016 | Hibino |
| 9,506,562 B2 | 11/2016 | Miller |
| 9,528,561 B2 | 12/2016 | Nichols |
| 9,541,179 B2 | 1/2017 | Cooper |
| 9,574,642 B2 | 2/2017 | Pohl |
| 9,574,643 B2 | 2/2017 | Pohl |
| 9,611,921 B2 | 4/2017 | Thomassy |
| 9,618,100 B2 | 4/2017 | Lohr |
| 9,656,672 B2 | 5/2017 | Schieffelin |
| 9,676,391 B2 | 6/2017 | Carter |
| 9,677,650 B2 | 6/2017 | Nichols |
| 9,683,638 B2 | 6/2017 | Kolstrup |
| 9,683,640 B2 | 6/2017 | Lohr |
| 9,709,138 B2 | 7/2017 | Miller |
| 9,726,282 B2 | 8/2017 | Pohl |
| 9,732,848 B2 | 8/2017 | Miller |
| 9,739,375 B2 | 8/2017 | Vasiliotis |
| 9,833,201 B2 | 12/2017 | Niederberger |
| 9,845,133 B2 | 12/2017 | Craven |
| 9,850,993 B2 | 12/2017 | Bazyn |
| 9,869,388 B2 | 1/2018 | Pohl |
| 9,878,717 B2 | 1/2018 | Keilers |
| 9,878,719 B2 | 1/2018 | Carter |
| 9,903,450 B2 | 2/2018 | Thomassy |
| 9,909,657 B2 | 3/2018 | Uchino |
| 9,920,823 B2 | 3/2018 | Nichols |
| 9,945,456 B2 | 4/2018 | Nichols |
| 9,950,608 B2 | 4/2018 | Miller |
| 9,963,199 B2 | 5/2018 | Hancock |
| 9,975,557 B2 | 5/2018 | Park |
| 10,023,266 B2 | 7/2018 | Contello |
| 10,036,453 B2 | 7/2018 | Smithson |
| 10,047,861 B2 | 8/2018 | Thomassy |
| 10,056,811 B2 | 8/2018 | Pohl |
| 10,066,712 B2 | 9/2018 | Lohr |
| 10,066,713 B2 | 9/2018 | Nichols |
| 10,088,026 B2 | 10/2018 | Versteyhe |
| 10,100,927 B2 | 10/2018 | Quinn, Jr. |
| 10,197,147 B2 | 2/2019 | Lohr |
| 10,208,840 B2 | 2/2019 | Nichols |
| 10,252,881 B2 | 4/2019 | Hiltunen |
| 10,253,859 B2 | 4/2019 | Schoolcraft |
| 10,253,880 B2 | 4/2019 | Pohl |
| 10,253,881 B2 | 4/2019 | Hamrin |
| 10,260,607 B2 | 4/2019 | Carter |
| 10,323,732 B2 | 6/2019 | Nichols |
| 10,400,872 B2 | 9/2019 | Lohr |
| 10,428,915 B2 | 10/2019 | Thomassy |
| 10,428,939 B2 | 10/2019 | Miller |
| 10,458,526 B2 | 10/2019 | Nichols |
| 10,634,224 B2 | 4/2020 | Lohr |
| 10,703,372 B2 | 7/2020 | Carter |
| 10,704,657 B2 | 7/2020 | Thomassy |
| 10,704,687 B2 | 7/2020 | Vasiliotis |
| 10,711,869 B2 | 7/2020 | Miller |
| 10,800,421 B2 | 10/2020 | Cho |
| 10,920,882 B2 | 2/2021 | Thomassy |
| 10,975,916 B2 | 4/2021 | Okada |
| 11,174,922 B2 | 11/2021 | Nichols |
| 11,530,739 B2 * | 12/2022 | Nichols .................. F16H 15/28 |
| 2001/0008192 A1 | 7/2001 | Morisawa |
| 2001/0023217 A1 | 9/2001 | Miyagawa |
| 2001/0041644 A1 | 11/2001 | Yasuoka |
| 2001/0044358 A1 | 11/2001 | Taniguchi |
| 2001/0044361 A1 | 11/2001 | Taniguchi |
| 2001/0046920 A1 | 11/2001 | Sugihara |
| 2002/0017819 A1 | 2/2002 | Chen |
| 2002/0019285 A1 | 2/2002 | Henzler |
| 2002/0025875 A1 | 2/2002 | Tsujioka |
| 2002/0028722 A1 | 3/2002 | Sakai |
| 2002/0037786 A1 | 3/2002 | Hirano |
| 2002/0045511 A1 | 4/2002 | Geiberger |
| 2002/0049113 A1 | 4/2002 | Watanabe |
| 2002/0117860 A1 | 8/2002 | Man |
| 2002/0128107 A1 | 9/2002 | Wakayama |
| 2002/0151401 A1 | 10/2002 | Lemanski |
| 2002/0161503 A1 | 10/2002 | Joe |
| 2002/0169051 A1 | 11/2002 | Oshidari |
| 2002/0179348 A1 | 12/2002 | Tamai |
| 2002/0189524 A1 | 12/2002 | Chen |
| 2003/0015358 A1 | 1/2003 | Abe |
| 2003/0015874 A1 | 1/2003 | Abe |
| 2003/0022753 A1 | 1/2003 | Mizuno |
| 2003/0036456 A1 | 2/2003 | Skrabs |
| 2003/0096674 A1 | 5/2003 | Uno |
| 2003/0132051 A1 | 7/2003 | Nishii |
| 2003/0135316 A1 | 7/2003 | Kawamura |
| 2003/0144105 A1 | 7/2003 | O'Hora |
| 2003/0151300 A1 | 8/2003 | Goss |
| 2003/0160420 A1 | 8/2003 | Fukuda |
| 2003/0181286 A1 | 9/2003 | Miller |
| 2003/0216216 A1 | 11/2003 | Inoue |
| 2003/0221892 A1 | 12/2003 | Matsumoto |
| 2004/0038772 A1 | 2/2004 | McIndoe |
| 2004/0051375 A1 | 3/2004 | Uno |
| 2004/0058772 A1 | 3/2004 | Inoue |
| 2004/0067816 A1 | 4/2004 | Taketsuna |
| 2004/0082421 A1 | 4/2004 | Wafzig |
| 2004/0087412 A1 | 5/2004 | Mori |
| 2004/0092359 A1 | 5/2004 | Imanishi |
| 2004/0119345 A1 | 6/2004 | Takano |
| 2004/0171452 A1 | 9/2004 | Miller |
| 2004/0171457 A1 | 9/2004 | Fuller |
| 2004/0204283 A1 | 10/2004 | Inoue |
| 2004/0224808 A1 | 11/2004 | Miller |
| 2004/0231331 A1 | 11/2004 | Iwanami |
| 2004/0254047 A1 | 12/2004 | Frank |
| 2005/0037876 A1 | 2/2005 | Unno |
| 2005/0037886 A1 | 2/2005 | Emanski |
| 2005/0064986 A1 | 3/2005 | Ginglas |
| 2005/0073127 A1 | 4/2005 | Miller |
| 2005/0079948 A1 | 4/2005 | Miller |
| 2005/0085326 A1 | 4/2005 | Miller |
| 2005/0085327 A1 | 4/2005 | Miller |
| 2005/0085334 A1 | 4/2005 | Miller |
| 2005/0085336 A1 | 4/2005 | Miller |
| 2005/0085337 A1 | 4/2005 | Miller |
| 2005/0085338 A1 | 4/2005 | Miller |
| 2005/0085979 A1 | 4/2005 | Carlson |
| 2005/0096176 A1 | 5/2005 | Miller |
| 2005/0096179 A1 | 5/2005 | Miller |
| 2005/0113202 A1 | 5/2005 | Miller |
| 2005/0113210 A1 | 5/2005 | Miller |
| 2005/0117983 A1 | 6/2005 | Miller |
| 2005/0119086 A1 | 6/2005 | Miller |
| 2005/0119087 A1 | 6/2005 | Miller |
| 2005/0119090 A1 | 6/2005 | Miller |
| 2005/0119093 A1 | 6/2005 | Miller |
| 2005/0124453 A1 | 6/2005 | Miller |
| 2005/0124456 A1 | 6/2005 | Miller |
| 2005/0130784 A1 | 6/2005 | Miller |
| 2005/0137046 A1 | 6/2005 | Miller |
| 2005/0137051 A1 | 6/2005 | Miller |
| 2005/0137052 A1 | 6/2005 | Miller |
| 2005/0148422 A1 | 7/2005 | Miller |
| 2005/0148423 A1 | 7/2005 | Miller |
| 2005/0153808 A1 | 7/2005 | Miller |
| 2005/0153809 A1 | 7/2005 | Miller |
| 2005/0153810 A1 | 7/2005 | Miller |
| 2005/0159265 A1 | 7/2005 | Miller |
| 2005/0159266 A1 | 7/2005 | Miller |

(56) References Cited

U.S. PATENT DOCUMENTS

| | | |
|---|---|---|
| 2005/0159267 A1 | 7/2005 | Miller |
| 2005/0164819 A1 | 7/2005 | Miller |
| 2005/0170927 A1 | 8/2005 | Miller |
| 2005/0176544 A1 | 8/2005 | Miller |
| 2005/0176545 A1 | 8/2005 | Miller |
| 2005/0178893 A1 | 8/2005 | Miller |
| 2005/0181905 A1 | 8/2005 | Ali |
| 2005/0184580 A1 | 8/2005 | Kuan |
| 2005/0197231 A1 | 9/2005 | Miller |
| 2005/0209041 A1 | 9/2005 | Miller |
| 2005/0227809 A1 | 10/2005 | Bitzer |
| 2005/0229731 A1 | 10/2005 | Parks |
| 2005/0233846 A1 | 10/2005 | Green |
| 2005/0255957 A1 | 11/2005 | Miller |
| 2006/0000684 A1 | 1/2006 | Agner |
| 2006/0006008 A1 | 1/2006 | Brunemann |
| 2006/0052204 A1 | 3/2006 | Eckert |
| 2006/0054422 A1 | 3/2006 | Dimsey |
| 2006/0084549 A1 | 4/2006 | Smithson |
| 2006/0108956 A1 | 5/2006 | Clark |
| 2006/0111212 A9 | 5/2006 | Ai |
| 2006/0154775 A1 | 7/2006 | Ali |
| 2006/0172829 A1 | 8/2006 | Masato |
| 2006/0180363 A1 | 8/2006 | Uchisasai |
| 2006/0223667 A1 | 10/2006 | Nakazeki |
| 2006/0234822 A1 | 10/2006 | Morscheck |
| 2006/0234826 A1 | 10/2006 | Moehlmann |
| 2006/0276299 A1 | 12/2006 | Takashi |
| 2007/0004552 A1 | 1/2007 | Matsudaira |
| 2007/0004554 A1 | 1/2007 | Hans |
| 2007/0004556 A1 | 1/2007 | Rohs |
| 2007/0041823 A1 | 2/2007 | Miller |
| 2007/0049450 A1 | 3/2007 | Miller |
| 2007/0082770 A1 | 4/2007 | Nihei |
| 2007/0099753 A1 | 5/2007 | Matsui |
| 2007/0142161 A1 | 6/2007 | Miller |
| 2007/0149342 A1 | 6/2007 | Guenter |
| 2007/0155552 A1 | 7/2007 | De Cloe |
| 2007/0155567 A1 | 7/2007 | Miller |
| 2007/0155580 A1 | 7/2007 | Nichols |
| 2007/0167274 A1 | 7/2007 | Petrzik |
| 2007/0167275 A1 | 7/2007 | Miller |
| 2007/0167276 A1 | 7/2007 | Miller |
| 2007/0167277 A1 | 7/2007 | Miller |
| 2007/0167278 A1 | 7/2007 | Miller |
| 2007/0167279 A1 | 7/2007 | Miller |
| 2007/0167280 A1 | 7/2007 | Miller |
| 2007/0179013 A1 | 8/2007 | Miller |
| 2007/0193391 A1 | 8/2007 | Armstrong |
| 2007/0197337 A1 | 8/2007 | Miller |
| 2007/0219048 A1 | 9/2007 | Yamaguchi |
| 2007/0219696 A1 | 9/2007 | Miller |
| 2007/0228687 A1 | 10/2007 | Parker |
| 2007/0232423 A1 | 10/2007 | Katou |
| 2007/0245846 A1 | 10/2007 | Armstrong |
| 2007/0270265 A1 | 11/2007 | Miller |
| 2007/0270266 A1 | 11/2007 | Miller |
| 2007/0270267 A1 | 11/2007 | Miller |
| 2007/0270268 A1 | 11/2007 | Miller |
| 2007/0270269 A1 | 11/2007 | Miller |
| 2007/0270270 A1 | 11/2007 | Miller |
| 2007/0270271 A1 | 11/2007 | Miller |
| 2007/0270272 A1 | 11/2007 | Miller |
| 2007/0270278 A1 | 11/2007 | Miller |
| 2007/0275809 A1 | 11/2007 | Miller |
| 2007/0281819 A1 | 12/2007 | Miller |
| 2007/0287578 A1 | 12/2007 | Miller |
| 2007/0287579 A1 | 12/2007 | Miller |
| 2007/0287580 A1 | 12/2007 | Miller |
| 2008/0004008 A1 | 1/2008 | Nicol |
| 2008/0009389 A1 | 1/2008 | Jacobs |
| 2008/0032852 A1 | 2/2008 | Smithson |
| 2008/0032853 A1 | 2/2008 | Smithson |
| 2008/0032854 A1 | 2/2008 | Smithson |
| 2008/0034585 A1 | 2/2008 | Smithson |
| 2008/0034586 A1 | 2/2008 | Smithson |
| 2008/0039269 A1 | 2/2008 | Smithson |
| 2008/0039270 A1 | 2/2008 | Smithson |
| 2008/0039271 A1 | 2/2008 | Smithson |
| 2008/0039272 A1 | 2/2008 | Smithson |
| 2008/0039273 A1 | 2/2008 | Smithson |
| 2008/0039274 A1 | 2/2008 | Smithson |
| 2008/0039275 A1 | 2/2008 | Smithson |
| 2008/0039276 A1 | 2/2008 | Smithson |
| 2008/0039277 A1 | 2/2008 | Smithson |
| 2008/0040008 A1 | 2/2008 | Smithson |
| 2008/0070729 A1 | 3/2008 | Miller |
| 2008/0071436 A1 | 3/2008 | Dube |
| 2008/0073136 A1 | 3/2008 | Miller |
| 2008/0073137 A1 | 3/2008 | Miller |
| 2008/0073467 A1 | 3/2008 | Miller |
| 2008/0079236 A1 | 4/2008 | Miller |
| 2008/0081715 A1 | 4/2008 | Miller |
| 2008/0081728 A1 | 4/2008 | Faulring |
| 2008/0085795 A1 | 4/2008 | Miller |
| 2008/0085796 A1 | 4/2008 | Miller |
| 2008/0085797 A1 | 4/2008 | Miller |
| 2008/0085798 A1 | 4/2008 | Miller |
| 2008/0121486 A1 | 5/2008 | Miller |
| 2008/0121487 A1 | 5/2008 | Miller |
| 2008/0125281 A1 | 5/2008 | Miller |
| 2008/0125282 A1 | 5/2008 | Miller |
| 2008/0132373 A1 | 6/2008 | Miller |
| 2008/0132377 A1 | 6/2008 | Miller |
| 2008/0139363 A1 | 6/2008 | Williams |
| 2008/0141809 A1 | 6/2008 | Miller |
| 2008/0141810 A1 | 6/2008 | Miller |
| 2008/0146403 A1 | 6/2008 | Miller |
| 2008/0146404 A1 | 6/2008 | Miller |
| 2008/0149407 A1 | 6/2008 | Shibata |
| 2008/0161151 A1 | 7/2008 | Miller |
| 2008/0183358 A1 | 7/2008 | Thomson |
| 2008/0188345 A1 | 8/2008 | Miller |
| 2008/0200300 A1 | 8/2008 | Smithson |
| 2008/0228362 A1 | 9/2008 | Muller |
| 2008/0236319 A1 | 10/2008 | Nichols |
| 2008/0248917 A1 | 10/2008 | Nichols |
| 2008/0261771 A1 | 10/2008 | Nichols |
| 2008/0284170 A1 | 11/2008 | Cory |
| 2008/0305920 A1 | 12/2008 | Nishii |
| 2009/0011907 A1 | 1/2009 | Radow |
| 2009/0023545 A1 | 1/2009 | Beaudoin |
| 2009/0055061 A1 | 2/2009 | Zhu |
| 2009/0062062 A1 | 3/2009 | Choi |
| 2009/0082169 A1 | 3/2009 | Kolstrup |
| 2009/0107454 A1 | 4/2009 | Hiyoshi |
| 2009/0132135 A1 | 5/2009 | Quinn, Jr. |
| 2009/0164076 A1 | 6/2009 | Vasiliotis |
| 2009/0189397 A1 | 7/2009 | Miller |
| 2009/0221391 A1 | 9/2009 | Bazyn |
| 2009/0251013 A1 | 10/2009 | Vollmer |
| 2009/0280949 A1 | 11/2009 | Lohr |
| 2009/0312145 A1 | 12/2009 | Pohl |
| 2009/0318261 A1 | 12/2009 | Tabata |
| 2010/0056322 A1 | 3/2010 | Thomassy |
| 2010/0093479 A1 | 4/2010 | Carter |
| 2010/0093480 A1 | 4/2010 | Pohl |
| 2010/0093485 A1 | 4/2010 | Pohl |
| 2010/0120577 A1 | 5/2010 | Gu |
| 2010/0131164 A1 | 5/2010 | Carter |
| 2010/0145573 A1 | 6/2010 | Vasilescu |
| 2010/0181130 A1 | 7/2010 | Chou |
| 2010/0198453 A1 | 8/2010 | Dorogusker |
| 2010/0228405 A1 | 9/2010 | Morgal |
| 2010/0264620 A1 | 10/2010 | Miles |
| 2010/0267510 A1 | 10/2010 | Nichols |
| 2010/0313614 A1 | 12/2010 | Rzepecki |
| 2011/0034284 A1 | 2/2011 | Pohl |
| 2011/0088503 A1 | 4/2011 | Armstrong |
| 2011/0105274 A1 | 5/2011 | Lohr |
| 2011/0127096 A1 | 6/2011 | Schneidewind |
| 2011/0172050 A1 | 7/2011 | Nichols |
| 2011/0178684 A1 | 7/2011 | Umemoto |
| 2011/0184614 A1 | 7/2011 | Keilers |

(56) References Cited

U.S. PATENT DOCUMENTS

| | | |
|---|---|---|
| 2011/0190093 A1 | 8/2011 | Bishop |
| 2011/0218072 A1 | 9/2011 | Lohr |
| 2011/0230297 A1 | 9/2011 | Shiina |
| 2011/0237385 A1 | 9/2011 | Andre Parise |
| 2011/0254673 A1 | 10/2011 | Jean |
| 2011/0291507 A1 | 12/2011 | Post |
| 2011/0319222 A1 | 12/2011 | Ogawa |
| 2012/0029744 A1 | 2/2012 | Yun |
| 2012/0035011 A1 | 2/2012 | Menachem |
| 2012/0035015 A1 | 2/2012 | Ogawa |
| 2012/0035016 A1 | 2/2012 | Miller |
| 2012/0043841 A1 | 2/2012 | Miller |
| 2012/0115667 A1 | 5/2012 | Lohr |
| 2012/0130603 A1 | 5/2012 | Simpson |
| 2012/0158229 A1 | 6/2012 | Schaefer |
| 2012/0238386 A1 | 9/2012 | Pohl |
| 2012/0239235 A1 | 9/2012 | Voigtlaender |
| 2012/0258839 A1 | 10/2012 | Smithson |
| 2012/0309579 A1 | 12/2012 | Miller |
| 2013/0035200 A1 | 2/2013 | Noji |
| 2013/0053211 A1 | 2/2013 | Fukuda |
| 2013/0072340 A1 | 3/2013 | Bazyn |
| 2013/0079191 A1 | 3/2013 | Lohr |
| 2013/0080006 A1 | 3/2013 | Vasiliotis |
| 2013/0095977 A1 | 4/2013 | Smithson |
| 2013/0102434 A1 | 4/2013 | Nichols |
| 2013/0106258 A1 | 5/2013 | Miller |
| 2013/0139531 A1 | 6/2013 | Pohl |
| 2013/0146406 A1 | 6/2013 | Nichols |
| 2013/0152715 A1 | 6/2013 | Pohl |
| 2013/0190123 A1 | 7/2013 | Pohl |
| 2013/0190125 A1 | 7/2013 | Nichols |
| 2013/0288844 A1 | 10/2013 | Thomassy |
| 2013/0288848 A1 | 10/2013 | Carter |
| 2013/0310214 A1 | 11/2013 | Pohl |
| 2013/0324344 A1 | 12/2013 | Pohl |
| 2013/0331218 A1 | 12/2013 | Lohr |
| 2013/0337971 A1 | 12/2013 | Kolstrup |
| 2014/0011619 A1 | 1/2014 | Pohl |
| 2014/0011628 A1 | 1/2014 | Lohr |
| 2014/0038771 A1 | 2/2014 | Miller |
| 2014/0073470 A1 | 3/2014 | Carter |
| 2014/0094339 A1 | 4/2014 | Ogawa |
| 2014/0121922 A1 | 5/2014 | Vasiliotis |
| 2014/0128195 A1 | 5/2014 | Miller |
| 2014/0141919 A1 | 5/2014 | Bazyn |
| 2014/0144260 A1 | 5/2014 | Nichols |
| 2014/0148303 A1 | 5/2014 | Nichols |
| 2014/0155220 A1 | 6/2014 | Messier |
| 2014/0179479 A1 | 6/2014 | Nichols |
| 2014/0206499 A1 | 7/2014 | Lohr |
| 2014/0228163 A1 | 8/2014 | Aratsu |
| 2014/0248988 A1 | 9/2014 | Lohr |
| 2014/0257650 A1 | 9/2014 | Carter |
| 2014/0274536 A1 | 9/2014 | Versteyhe |
| 2014/0323260 A1 | 10/2014 | Miller |
| 2014/0329637 A1 | 11/2014 | Thomassy |
| 2014/0335991 A1 | 11/2014 | Lohr |
| 2014/0365059 A1 | 12/2014 | Keilers |
| 2015/0018154 A1 | 1/2015 | Thomassy |
| 2015/0038285 A1 | 2/2015 | Aratsu |
| 2015/0039195 A1 | 2/2015 | Pohl |
| 2015/0051801 A1 | 2/2015 | Quinn, Jr. |
| 2015/0072827 A1 | 3/2015 | Lohr |
| 2015/0080165 A1 | 3/2015 | Pohl |
| 2015/0219194 A1 | 8/2015 | Winter |
| 2015/0226323 A1 | 8/2015 | Pohl |
| 2015/0233473 A1 | 8/2015 | Miller |
| 2015/0260284 A1 | 9/2015 | Miller |
| 2015/0337928 A1 | 11/2015 | Smithson |
| 2015/0345599 A1 | 12/2015 | Ogawa |
| 2015/0360747 A1 | 12/2015 | Baumgaertner |
| 2015/0369348 A1 | 12/2015 | Nichols |
| 2015/0377305 A1 | 12/2015 | Nichols |
| 2016/0003349 A1 | 1/2016 | Kimura |
| 2016/0031526 A1 | 2/2016 | Watarai |
| 2016/0039496 A1 | 2/2016 | Hancock |
| 2016/0040763 A1 | 2/2016 | Nichols |
| 2016/0061301 A1 | 3/2016 | Bazyn |
| 2016/0075175 A1 | 3/2016 | Biderman |
| 2016/0131231 A1 | 5/2016 | Carter |
| 2016/0146342 A1 | 5/2016 | Vasiliotis |
| 2016/0178037 A1 | 6/2016 | Pohl |
| 2016/0186847 A1 | 6/2016 | Nichols |
| 2016/0195177 A1 | 7/2016 | Versteyhe |
| 2016/0201772 A1 | 7/2016 | Lohr |
| 2016/0244063 A1 | 8/2016 | Carter |
| 2016/0273627 A1 | 9/2016 | Miller |
| 2016/0281825 A1 | 9/2016 | Lohr |
| 2016/0290451 A1 | 10/2016 | Lohr |
| 2016/0298740 A1 | 10/2016 | Carter |
| 2016/0347411 A1 | 12/2016 | Yamamoto |
| 2016/0362108 A1 | 12/2016 | Keilers |
| 2016/0377153 A1 | 12/2016 | Ajumobi |
| 2017/0072782 A1 | 3/2017 | Miller |
| 2017/0082049 A1 | 3/2017 | David |
| 2017/0102053 A1 | 4/2017 | Nichols |
| 2017/0103053 A1 | 4/2017 | Guerra |
| 2017/0106866 A1 | 4/2017 | Schieffelin |
| 2017/0159812 A1 | 6/2017 | Pohl |
| 2017/0163138 A1 | 6/2017 | Pohl |
| 2017/0204948 A1 | 7/2017 | Thomassy |
| 2017/0204969 A1 | 7/2017 | Thomassy |
| 2017/0211696 A1 | 7/2017 | Nassouri |
| 2017/0211698 A1 | 7/2017 | Lohr |
| 2017/0225742 A1 | 8/2017 | Hancock |
| 2017/0268638 A1 | 9/2017 | Nichols |
| 2017/0274903 A1 | 9/2017 | Carter |
| 2017/0276217 A1 | 9/2017 | Nichols |
| 2017/0284519 A1 | 10/2017 | Kolstrup |
| 2017/0284520 A1 | 10/2017 | Lohr |
| 2017/0314655 A1 | 11/2017 | Miller |
| 2017/0328470 A1 | 11/2017 | Pohl |
| 2017/0335961 A1 | 11/2017 | Hamrin |
| 2017/0343105 A1 | 11/2017 | Vasiliotis |
| 2017/0364995 A1 | 12/2017 | Yan |
| 2018/0036593 A1 | 2/2018 | Ridgel |
| 2018/0066754 A1 | 3/2018 | Miller |
| 2018/0106359 A1 | 4/2018 | Kawakami |
| 2018/0119786 A1 | 5/2018 | Mepham |
| 2018/0134750 A1 | 5/2018 | Alkan |
| 2018/0148055 A1 | 5/2018 | Carter |
| 2018/0148056 A1 | 5/2018 | Keilers |
| 2018/0195586 A1 | 7/2018 | Thomassy |
| 2018/0202527 A1 | 7/2018 | Nichols |
| 2018/0221714 A1 | 8/2018 | Anderson |
| 2018/0236867 A1 | 8/2018 | Miller |
| 2018/0251190 A1 | 9/2018 | Hancock |
| 2018/0306283 A1 | 10/2018 | Engesather |
| 2018/0327060 A1 | 11/2018 | De Jager |
| 2018/0347693 A1 | 12/2018 | Thomassy |
| 2018/0372192 A1 | 12/2018 | Lohr |
| 2019/0049004 A1 | 2/2019 | Quinn, Jr. |
| 2019/0102858 A1 | 4/2019 | Pivnick |
| 2019/0195321 A1 | 6/2019 | Smithson |
| 2019/0277399 A1 | 9/2019 | Guerin |
| 2019/0323582 A1 | 10/2019 | Horak |
| 2020/0018384 A1 | 1/2020 | Nichols |

FOREIGN PATENT DOCUMENTS

| | | |
|---|---|---|
| CN | 1054340 | 9/1991 |
| CN | 2245830 Y | 1/1997 |
| CN | 1157379 | 8/1997 |
| CN | 1167221 | 12/1997 |
| CN | 1178573 | 4/1998 |
| CN | 1178751 | 4/1998 |
| CN | 1204991 | 1/1999 |
| CN | 2320843 Y | 5/1999 |
| CN | 1281540 | 1/2001 |
| CN | 1283258 | 2/2001 |
| CN | 1297404 | 5/2001 |
| CN | 1300355 | 6/2001 |
| CN | 1412033 | 4/2003 |

(56) References Cited

FOREIGN PATENT DOCUMENTS

| | | |
|---|---|---|
| CN | 1434229 | 8/2003 |
| CN | 1474917 | 2/2004 |
| CN | 1483235 | 3/2004 |
| CN | 1555466 | 12/2004 |
| CN | 1568407 | 1/2005 |
| CN | 1654858 | 8/2005 |
| CN | 2714896 Y | 8/2005 |
| CN | 1736791 | 2/2006 |
| CN | 1791731 | 6/2006 |
| CN | 1847702 | 10/2006 |
| CN | 1860315 | 11/2006 |
| CN | 1896562 | 1/2007 |
| CN | 1940348 | 4/2007 |
| CN | 101016076 | 8/2007 |
| CN | 101166922 | 4/2008 |
| CN | 101312867 | 11/2008 |
| CN | 201777370 U | 3/2011 |
| CN | 102165219 | 8/2011 |
| CN | 102287530 | 12/2011 |
| CN | 102947626 A | 2/2013 |
| CN | 203358799 U | 12/2013 |
| CN | 103857576 A | 6/2014 |
| CN | 104648595 A | 5/2015 |
| CN | 104854380 A | 8/2015 |
| CN | 108501935 | 9/2018 |
| DE | 498701 | 5/1930 |
| DE | 866748 C | 2/1953 |
| DE | 1165372 B | 3/1964 |
| DE | 1171692 | 6/1964 |
| DE | 2021027 | 12/1970 |
| DE | 2136243 | 2/1972 |
| DE | 2310880 | 9/1974 |
| DE | 2436496 | 2/1975 |
| DE | 3940919 | 6/1991 |
| DE | 4120540 C1 | 11/1992 |
| DE | 19851738 | 5/2000 |
| DE | 10155372 | 5/2003 |
| DE | 10261372 | 7/2003 |
| DE | 102009016869 | 10/2010 |
| DE | 102011016672 | 10/2012 |
| DE | 102012107360 | 2/2013 |
| DE | 102012107927 | 2/2013 |
| DE | 102012210842 | 1/2014 |
| DE | 102012212526 | 1/2014 |
| DE | 102012023551 | 6/2014 |
| DE | 102012222087 | 6/2014 |
| DE | 102013201101 | 7/2014 |
| DE | 102014007271 | 12/2014 |
| DE | 102013214169 | 1/2015 |
| DE | 102019121883 | 9/2020 |
| EP | 0432742 | 6/1991 |
| EP | 0528381 | 2/1993 |
| EP | 0528382 | 2/1993 |
| EP | 0635639 | 1/1995 |
| EP | 0638741 | 2/1995 |
| EP | 0831249 | 3/1998 |
| EP | 0832816 | 4/1998 |
| EP | 0877341 | 11/1998 |
| EP | 0976956 | 2/2000 |
| EP | 1010612 | 6/2000 |
| EP | 1136724 | 9/2001 |
| EP | 1188602 | 3/2002 |
| EP | 1251294 | 10/2002 |
| EP | 1362783 | 11/2003 |
| EP | 1366978 | 12/2003 |
| EP | 1433641 | 6/2004 |
| EP | 1452441 | 9/2004 |
| EP | 1518785 | 3/2005 |
| EP | 1624230 | 2/2006 |
| EP | 1811202 | 7/2007 |
| EP | 1850038 | 10/2007 |
| EP | 2261108 | 12/2010 |
| EP | 2338782 | 6/2011 |
| EP | 2464560 | 6/2012 |
| EP | 2602672 | 6/2013 |
| EP | 2620672 | 7/2013 |
| EP | 2357128 | 8/2014 |
| EP | 2893219 | 7/2015 |
| EP | 2927534 | 10/2015 |
| FR | 620375 | 4/1927 |
| FR | 2460427 | 1/1981 |
| FR | 2590638 | 5/1987 |
| FR | 2909938 | 6/2008 |
| FR | 2996276 | 4/2014 |
| FR | 3073479 | 5/2019 |
| GB | 391448 | 4/1933 |
| GB | 592320 | 9/1947 |
| GB | 772749 A | 4/1957 |
| GB | 858710 | 1/1961 |
| GB | 906002 A | 9/1962 |
| GB | 919430 A | 2/1963 |
| GB | 1132473 | 11/1968 |
| GB | 1165545 | 10/1969 |
| GB | 1376057 | 12/1974 |
| GB | 2031822 | 4/1980 |
| GB | 2035481 | 6/1980 |
| GB | 2035482 | 6/1980 |
| GB | 2080452 | 2/1982 |
| JP | 38025315 | 11/1963 |
| JP | 413126 | 2/1966 |
| JP | 0422844 | 2/1967 |
| JP | 441098 | 1/1969 |
| JP | 46029087 B | 8/1971 |
| JP | 47448 B | 1/1972 |
| JP | 47962 B | 1/1972 |
| JP | 47207 | 6/1972 |
| JP | 4720535 | 6/1972 |
| JP | 47001621 | 8/1972 |
| JP | 4700962 | 11/1972 |
| JP | 4729762 | 11/1972 |
| JP | 4854371 | 7/1973 |
| JP | 4912742 | 3/1974 |
| JP | 49013823 | 4/1974 |
| JP | 49041536 | 11/1974 |
| JP | 50114581 | 9/1975 |
| JP | 5125903 | 8/1976 |
| JP | 51150380 | 12/1976 |
| JP | 5235481 | 3/1977 |
| JP | 53048166 | 1/1978 |
| JP | 5350395 U1 | 4/1978 |
| JP | 55135259 | 10/1980 |
| JP | 5624251 | 3/1981 |
| JP | 56047231 | 4/1981 |
| JP | 56101448 | 8/1981 |
| JP | 56127852 | 10/1981 |
| JP | 58065361 | 4/1983 |
| JP | 59069565 | 4/1984 |
| JP | 59144826 | 8/1984 |
| JP | 59190557 | 10/1984 |
| JP | 6073958 U | 5/1985 |
| JP | 60247011 | 12/1985 |
| JP | 61031754 | 2/1986 |
| JP | 61053423 | 3/1986 |
| JP | 61173722 | 10/1986 |
| JP | 61270552 | 11/1986 |
| JP | 62075170 | 4/1987 |
| JP | 63125854 | 5/1988 |
| JP | 63219953 | 9/1988 |
| JP | 63160465 | 10/1988 |
| JP | 01210653 | 8/1989 |
| JP | 01039865 | 11/1989 |
| JP | 01286750 | 11/1989 |
| JP | 01308142 | 12/1989 |
| JP | 02130224 | 5/1990 |
| JP | 02157483 | 6/1990 |
| JP | 02271142 | 6/1990 |
| JP | 02182593 | 7/1990 |
| JP | 03149442 | 6/1991 |
| JP | 03223555 | 10/1991 |
| JP | 422843 B | 1/1992 |
| JP | 470207 | 3/1992 |
| JP | 470962 | 3/1992 |
| JP | 479762 | 3/1992 |
| JP | 04166619 | 6/1992 |

(56) References Cited

FOREIGN PATENT DOCUMENTS

| | | |
|---|---|---|
| JP | 04272553 | 9/1992 |
| JP | 04327055 | 11/1992 |
| JP | 04351361 | 12/1992 |
| JP | 05087154 | 4/1993 |
| JP | 0650358 | 2/1994 |
| JP | 06050169 | 2/1994 |
| JP | 07042799 | 2/1995 |
| JP | 07133857 | 5/1995 |
| JP | 07139600 | 5/1995 |
| JP | 07259950 | 10/1995 |
| JP | 08135748 | 5/1996 |
| JP | 08170706 A | 7/1996 |
| JP | 08247245 | 9/1996 |
| JP | 08270772 | 10/1996 |
| JP | 09024743 A | 1/1997 |
| JP | 09089064 | 3/1997 |
| JP | 1078094 | 3/1998 |
| JP | 10061739 | 3/1998 |
| JP | 10089435 | 4/1998 |
| JP | 10115355 | 5/1998 |
| JP | 10115356 | 5/1998 |
| JP | 10194186 | 7/1998 |
| JP | 10225053 | 8/1998 |
| JP | 10511621 | 11/1998 |
| JP | H10307964 | 11/1998 |
| JP | 11063130 A | 3/1999 |
| JP | 11091411 | 4/1999 |
| JP | 11210850 | 8/1999 |
| JP | 11227669 | 8/1999 |
| JP | 11240481 | 9/1999 |
| JP | 11257479 | 9/1999 |
| JP | 11317653 | 11/1999 |
| JP | 2000006877 | 1/2000 |
| JP | 2000046135 | 2/2000 |
| JP | 2000177673 | 6/2000 |
| JP | 2001027298 | 1/2001 |
| JP | 2001071986 | 3/2001 |
| JP | 2001107827 | 4/2001 |
| JP | 2001165296 | 6/2001 |
| JP | 2001234999 | 8/2001 |
| JP | 2001328466 | 11/2001 |
| JP | 2001521109 | 11/2001 |
| JP | 2002147558 | 5/2002 |
| JP | 61144466 | 9/2002 |
| JP | 2002250421 | 9/2002 |
| JP | 2002291272 | 10/2002 |
| JP | 2002307956 | 10/2002 |
| JP | 2002533626 | 10/2002 |
| JP | 2002372114 | 12/2002 |
| JP | 2003028257 | 1/2003 |
| JP | 2003056662 | 2/2003 |
| JP | 2003507261 | 2/2003 |
| JP | 2003161357 | 6/2003 |
| JP | 2003194206 | 7/2003 |
| JP | 2003194207 | 7/2003 |
| JP | 2003524119 | 8/2003 |
| JP | 2003320987 | 11/2003 |
| JP | 2003336732 | 11/2003 |
| JP | 2004011834 | 1/2004 |
| JP | 2004038722 | 2/2004 |
| JP | 2004162652 | 6/2004 |
| JP | 2004189222 | 7/2004 |
| JP | 2004232776 | 8/2004 |
| JP | 2004526917 | 9/2004 |
| JP | 2004301251 | 10/2004 |
| JP | 2005003063 | 1/2005 |
| JP | 2005095637 | 4/2005 |
| JP | 2005188694 | 7/2005 |
| JP | 2005240928 | 9/2005 |
| JP | 2005312121 | 11/2005 |
| JP | 2006015025 | 1/2006 |
| JP | 2006283900 | 10/2006 |
| JP | 2006300241 | 11/2006 |
| JP | 2007085404 | 4/2007 |
| JP | 2007321931 | 12/2007 |
| JP | 2007535715 | 12/2007 |
| JP | 2008002687 | 1/2008 |
| JP | 2008014412 | 1/2008 |
| JP | 2008133896 | 6/2008 |
| JP | 4351361 | 10/2009 |
| JP | 2010069005 | 4/2010 |
| JP | 2010532454 | 10/2010 |
| JP | 2011178341 | 9/2011 |
| JP | 2012501418 | 1/2012 |
| JP | 2012506001 | 3/2012 |
| JP | 4913823 | 4/2012 |
| JP | 4941536 | 5/2012 |
| JP | 2012107725 | 6/2012 |
| JP | 2012121338 | 6/2012 |
| JP | 2012122568 | 6/2012 |
| JP | 2012211610 | 11/2012 |
| JP | 2012225390 | 11/2012 |
| JP | 2013521452 | 6/2013 |
| JP | 2013147245 | 8/2013 |
| JP | 5348166 | 11/2013 |
| JP | 5647231 | 12/2014 |
| JP | 5668205 | 2/2015 |
| JP | 2015505022 | 2/2015 |
| JP | 2015075148 | 4/2015 |
| JP | 2015227690 | 12/2015 |
| JP | 2015227691 | 12/2015 |
| JP | 5865361 | 2/2016 |
| JP | 5969565 | 8/2016 |
| JP | 6131754 | 5/2017 |
| JP | 6153423 | 6/2017 |
| JP | 6275170 | 2/2018 |
| JP | 2018025315 | 2/2018 |
| KR | 20020054126 | 7/2002 |
| KR | 20020071699 | 9/2002 |
| KR | 20080079274 | 8/2008 |
| KR | 20080081030 | 9/2008 |
| KR | 20130018976 | 2/2013 |
| KR | 101339282 | 1/2014 |
| NL | 98467 C | 7/1961 |
| TW | 74007 | 1/1984 |
| TW | 175100 | 12/1991 |
| TW | 218909 B | 1/1994 |
| TW | 227206 | 7/1994 |
| TW | 275872 | 5/1996 |
| TW | 294598 U | 1/1997 |
| TW | 360184 B | 6/1999 |
| TW | 366396 B | 8/1999 |
| TW | 401496 B | 8/2000 |
| TW | 510867 B | 11/2002 |
| TW | 512211 B | 12/2002 |
| TW | 582363 B | 4/2004 |
| TW | 590955 B | 6/2004 |
| TW | 225129 B | 12/2004 |
| TW | 225912 B | 1/2005 |
| TW | 235214 B | 7/2005 |
| TW | 200637745 | 11/2006 |
| TW | 200741116 | 11/2007 |
| TW | 200821218 | 5/2008 |
| TW | 201339049 | 10/2013 |
| WO | 9908024 | 2/1999 |
| WO | 9920918 | 4/1999 |
| WO | 2000061388 | 10/2000 |
| WO | 0138758 | 5/2001 |
| WO | 2001073319 | 10/2001 |
| WO | 2002088573 | 11/2002 |
| WO | 2003086849 | 10/2003 |
| WO | 2003100294 | 12/2003 |
| WO | 2004079223 | 9/2004 |
| WO | 2005019669 | 3/2005 |
| WO | 2005083305 | 9/2005 |
| WO | 2005108825 | 11/2005 |
| WO | 2005111472 | 11/2005 |
| WO | 2006014617 | 2/2006 |
| WO | 2006047887 | 5/2006 |
| WO | 2006091503 | 8/2006 |
| WO | 2007061993 | 5/2007 |
| WO | 2007070167 | 6/2007 |
| WO | 2007077502 | 7/2007 |
| WO | 2008002457 | 1/2008 |

(56) References Cited

FOREIGN PATENT DOCUMENTS

| WO | 2008057507 | 5/2008 |
|---|---|---|
| WO | 2008078047 | 7/2008 |
| WO | 2008095116 | 8/2008 |
| WO | 2008100792 | 8/2008 |
| WO | 2008101070 | 8/2008 |
| WO | 2008131353 | 10/2008 |
| WO | 2008154437 | 12/2008 |
| WO | 2009006481 | 1/2009 |
| WO | 2009148461 | 12/2009 |
| WO | 2009157920 | 12/2009 |
| WO | 2010017242 | 2/2010 |
| WO | 2010024809 | 3/2010 |
| WO | 2010044778 | 4/2010 |
| WO | 2010073036 | 7/2010 |
| WO | 2010094515 | 8/2010 |
| WO | 2010135407 | 11/2010 |
| WO | 2011064572 | 6/2011 |
| WO | 2011101991 | 8/2011 |
| WO | 2011109444 | 9/2011 |
| WO | 2011121743 | 10/2011 |
| WO | 2011124415 | 10/2011 |
| WO | 2011138175 | 11/2011 |
| WO | 2012030213 | 3/2012 |
| WO | 2013042226 | 3/2013 |
| WO | 2013112408 | 8/2013 |
| WO | 2014186732 | 11/2014 |
| WO | 2016022553 | 2/2016 |
| WO | 2016062461 | 4/2016 |
| WO | 2016079620 | 5/2016 |
| WO | 2016205639 | 12/2016 |
| WO | 2017056541 | 4/2017 |
| WO | 2017186911 | 11/2017 |

OTHER PUBLICATIONS

Office Action dated Jan. 20, 2012 for U.S. Appl. No. 12/137,456. (LINEARB.037C1).
Office Action dated Jan. 20, 2015 in U.S. Appl. No. 13/682,176 (LINEARB.037C4).
Office Action dated Jul. 16, 2012 for U.S. Appl. No. 12/271,611 (LINEARB.073A).
Office Action dated Jul. 18, 2016 in U.S. Appl. No. 13/938,056 (LINEARB.056C1).
Office Action dated Jul. 25, 2012 for European Patent Application No. 06816430.0 (LINEARB.037VEP).
Office Action dated Jul. 5, 2017 in U.S. Appl. No. 14/529,773 (LINEARB.073DI).
Office Action dated Jul. 6, 2016 in U.S. Appl. No. 14/529,773 (LINEARB.073DI).
Office Action dated Jun. 19, 2014 in U.S. Appl. No. 13/682,176 (LINEARB.037C4).
Office Action dated Jun. 28, 2011 from Japanese Patent Application No. 2009-518168 (LINEARB.043VJP).
Office Action dated Jun. 8, 2018 in U.S. Appl. No. 14/839,567 (LINEARB.037C5).
Office Action dated Mar. 14, 2012 for U.S. Appl. No. 12/137,480 (LINEARB.037C3).
Office Action dated Mar. 18, 2010 from U.S. Appl. No. 12/137,464 (LINEARB.037C2).
Office Action dated Mar. 5, 2015 in U.S. Appl. No. 14/541,875.
Office Action dated May 17, 2002 for Chinese Patent Application No. 98812170.0 (LINEARB.002QCN).
Office Action dated May 17, 2012 for U.S. Appl. No. 12/159,688 (LINEARB.056NP).
Office Action dated May 29, 2013 for Chinese Patent Application No. 200880116244.9 (LINEARB.073VCN).
Office Action dated Nov. 14, 2012 for U.S. Appl. No. 12/159,688 (LINEARB.056NP).
Office Action dated Nov. 14, 2017 in U.S. Appl. No. 15/172,031, 5 pages (LINEARB.11 0A).
Office Action dated Nov. 3, 2017 in U.S. Appl. No. 14/996,743, 10 pages (LINEARB.106A).
Office Action dated Oct. 19, 2012 for Canadian Patent Application No. 2632751 (LINEARB.037VCA).
Office Action dated Sep. 14, 2010 for Japanese Patent Application No. 2007-278224 (LINEARB.2QR2JP).
Office Action dated Sep. 15, 2010 for U.S. Appl. No. 11/543,311 (LINEARB.037A).
Office Action dated Sep. 24, 2012 for Chinese Patent Application No. 200880116244.9 (LINEARB.073VCN).
Office Action dated Sep. 24, 2012 for Taiwanese Patent Application No. 095137289 (LINEARB.037VTW).
Office Action dated Sep. 28, 2005 for Japanese Patent Application No. 2001-540276 (LINEARB.007VJP).
Partial International Search Report for International Application No. PCT/US2008/052685 dated Sep. 2, 2008.
Preliminary Notice of First Office Action dated Jan. 14, 2014 for Taiwanese Patent Application No. 095137289 (LINEARB.037VTW).
Preliminary Notice of First Office Action dated Jun. 20, 2014 in Taiwanese Patent Application No. 97144386 (LINEARB.073VTW).
Rejection Decision dated May 29, 2015 in Taiwanese Patent Application No. 97144386 (LINEARB.073VTW).
Second Office Action dated Feb. 24, 2016 in Chinese Patent Application No. 201410145485.3 (LINEARB.73VCNDI).
Supplementary European Search Report dated Apr. 1, 2009, for European Application No. 04715691.4, filed Feb. 7, 2004. (LINEARB.019VEP).
Taiwan Search Report and Preliminary Notice of First Office Action dated Oct. 30, 2008 for Taiwanese Patent Application No. 094134761 (LINEARB.023VTW).
Thomassy, Fernand A., "An Engineering Approach to Simulating Traction EHL", CVT-Hybrid International Conference Mecc/Maastricht/The Netherlands, Nov. 17-19, 2010, p. 97.
Chinese Office Action dated Aug. 26, 2013 for Chinese Patent Application No. 201110120716.1 LINEARB.037VCND2).
Chinese Office Action dated Dec. 24, 2012 for Chinese Patent Application No. 201110120717.6 LINEARB.037VCND3).
Chinese Office Action dated Jan. 22, 2010 for Chinese Patent Application No. 200680052833.6 (LINEARB.056VCN2).
Chinese Office Action dated May 28, 2013 for Chinese Patent Application No. 201110120717.6 (LINEARB.037VCND3).
Examination Report dated Dec. 17, 2020 in Indian Patent Application No. 201837029026, 7 pages (LINEARB.106IN).
Examination report dated Jul. 11, 2018 in Indian Patent Application No. 2060/KOLNP/2010.
Examination Report dated Mar. 2, 2017 in Indian Patent Application No. 2772/KOLNP/2008 (LINEARB.037VIN).
Examination Report dated Sep. 25, 2013 for European Patent Application No. 06816430.0 (LINEARB.037VEP).
First Office Action dated Sep. 2, 2015 in Chinese Patent Application No. 201410145485.3 (LINEARB.73VCNDI).
International Search Report and Written Opinion dated Apr. 16, 2008, for PCT Application No. PCT/US2007/023315 (LINEARB.047VPC).
International Search Report and Written Opinion dated Dec. 20, 2006 from International Patent Application No. PCT/US2006/033104, filed on Aug. 23, 2006. (LINEARB.033VPC).
International Search Report and Written Opinion dated Feb. 2, 2010 from International Patent Application No. PCT/US2008/068929, filed on Jan. 7, 2008. (LINEARB.054VPC).
International Search Report and Written Opinion dated Jan. 25, 2010 from International Patent Application No. PCT/US2009/052761, filed on Aug. 4, 2009.
International Search Report and Written Opinion dated Jul. 21, 2017 in PCT/US2017/032023 (LINEARB.11 0WO).
International Search Report and Written Opinion dated Jul. 27, 2009 from International Patent Application No. PCT/US2008/079879, filed on Oct. 14, 2008. (LINEARB.077VPC).
International Search Report and Written Opinion dated Jun. 27, 2017 in PCT/US2016/063880 (LINEARB.106WO).

(56) References Cited

OTHER PUBLICATIONS

International Search Report and Written Opinion dated May 16, 2007 from International Patent Application No. PCT/IB2006/054911, dated Dec. 18, 2006.
International Search Report and Written Opinion dated May 19, 2009 from International Patent Application No. PCT/US2008/083660, filed on Nov. 14, 2008. (LINEARB.073VPC).
International Search Report and Written Opinion dated May 8, 2020 in PCT/US2020/019446 (LINEARB.118WO).
International Search Report and Written Opinion dated Nov. 13, 2009 from International Patent Application No. PCT/US2008/053951, filed on Feb. 14, 2008.
International Search Report dated May 16, 2007, for PCT Application No. PCT/IB2006/054911 (LINEARB.056VPC).
International Search Report dated Nov. 21, 2002, for PCT Application No. PCT/US02/13399, filed on Apr. 25, 2002.
International Search Report for International Application No. PCT/US04/15652 dated Aug. 26, 2005 (LINEARB.020VPC).
International Search Report for International Application No. PCT/US05/25539 dated Jun. 8, 2006 (LINEARB.022VPC).
International Search Report for International Application No. PCT/US07/14510 dated Sep. 23, 2008.
International Search Report for International Application No. PCT/US2006/041389 dated Sep. 24, 2007.
International Search Report for International Application No. PCT/US2006/044983 dated Jun. 13, 2008.
International Search Report for International Application No. PCT/US2008/053347 dated Jul. 18, 2008.
International Search Report for International application No. PCT/US2005/035164 dated Jun. 27, 2007.
International Search Report for International Application No. PCT/US2006/039166 dated Feb. 27, 2007.
International Search Report for International application No. PCT/US2009/035540 dated Aug. 6, 2009. (LINEARB.061VPC).
Invitation to Pay Additional Fees dated May 3, 2017 in PCT/US2016/063880.
Notice of Office Action dated Jun. 22, 2016 in Taiwan Patent Application No. 103129866 (LINEARB.37VTWD1 ).
Notification of Reasons for Rejection dated Oct. 6, 2020 in Japanese Patent Application No. 2018-536480, 21 pages (LINEARB.106JP).
Notification of Reexamination dated Aug. 29, 2013 for Chinese Patent Application No. 200680052833.6 (LINEARB.056VCN2).
Notification of the First Office Action dated Jun. 26, 2019 in Chinese Patent Application No. 201680080281.3 (LINEARB.106CN).
Notification of the Second Office Action dated Mar. 16, 2020 in Chinese Patent Application No. 201680080281.3, 15 pages (LINEARB.106CN).
Office Action dated Apr. 2, 2014 in U.S. Appl. No. 13/288,711.
Office Action dated Aug. 13, 2013 for Canadian Patent Application No. 2632751 (LINEARB.037VCA).
Office Action dated Aug. 20, 2010 for Chinese Patent Application No. 200680052482.9 (LINEARB.037VCN).
Office Action dated Aug. 23, 2006 from Japanese Patent Application No. 2000-517205 (LINEARB.002QJP).
Office Action dated Aug. 29, 2013 in U.S. Appl. No. 13/288,711.
Office Action dated Aug. 3, 2015 in U.S. Appl. No. 14/541,875.
Office Action dated Dec. 12, 2011 for U.S. Appl. No. 12/271,611.
Office Action dated Dec. 12, 2011 for U.S. Appl. No. 12/271,611 (LINEARB.073A).
Office Action dated Dec. 12, 2016 in U.S. Appl. No. 13/938,056 (LINEARB.056C1).
Office Action dated Dec. 29, 2017 in U.S. Appl. No. 14/839,567 (LINEARB.037C5).
Office Action dated Dec. 4, 2012 for Korean Patent Application No. 10-2008-7016716 (LINEARB.037VKR).
Office Action dated Feb. 17, 2010 from Japanese Patent Application No. 2009-294086. (LINEARB.19VRIJP).
Office Action dated Feb. 24, 2010 from Japanese Patent Application No. 2006-508892. (LINEARB.019VJP).

\* cited by examiner

REVERSIBLE VARIABLE DRIVES AND SYSTEMS AND METHODS FOR CONTROL IN FORWARD AND REVERSE DIRECTIONS

CROSS REFERENCE TO RELATED APPLICATION

This application is a continuation of U.S. Nonprovisional application Ser. No. 17/527,775, filed Nov. 16, 2021, now U.S. Pat. No. 11,530,739, which is a continuation of U.S. Nonprovisional application Ser. No. 16/799,025, filed Feb. 24, 2020, now U.S. Pat. No. 11,174,922, which claims the benefit of U.S. Provisional Application No. 62/810,832, filed Feb. 26, 2019, which are hereby incorporated by reference in their entirety.

BACKGROUND

To assist with the description of embodiments, the following description of the relationship between tilt and skew is provided, in which FIGS. 1A-1C depict coordinate systems in reference to embodiments of certain components of a ball-planetary continuously variable transmission (CVT).

As depicted in FIGS. 1A-1G, CVT 100 includes planets 108 in contact with sun 110 and traction rings 102, 104. Planets 108 are interposed between and in contact with first traction ring 102 and second traction ring 104 at, respectively, first angular position 112 and second angular position 114. FIG. 1A depicts global coordinate system 150 (defined herein to include axes $x_g$, $y_g$, $z_g$) and planet-centered coordinate system 160 (defined herein to include axes x, y, z). Global coordinate system 150 is oriented with respect to longitudinal axis 15 of CVT 100, with the $z_g$-axis coinciding with longitudinal axis 15 about which planets 108 are arranged. Planet-centered coordinate system 160 has its origin at the geometric center of each planet 108, with the y-axis perpendicular to longitudinal axis 15, and the z-axis parallel to longitudinal axis 15. Each of planets 108 has axle 103 defining a planet axis of rotation (defined herein as planet axis 106). Planet axis 106 may be angularly oriented in the y-z plane relative to the x-axis at tilt angle (gamma) 118. Tilt angle (gamma) 118 determines the kinematic ratio between the rotational speeds of traction rings 102 and 104. Each planet 108 has a rotational velocity ω (omega) about planet axis 106, depicted in FIG. 1A as planet rotational velocity 122. Planet axis 106 is defined by planet axle 103. In planet-centered coordinate system 160, the x-axis is directed into the plane of the page (though not shown precisely as such in FIG. 1A), and the z-axis is parallel to longitudinal axis 15. For purposes of illustration, tilt angle (gamma) 118 is generally defined in the y-z plane.

As depicted in FIGS. 1B and 1C, planet-centered coordinate system 160 is resolved further to illustrate the angular adjustments of each planet axis 106 used in embodiments of skew control systems. As depicted in FIG. 1B, tilt angle (gamma) 118 can be derived by rotating coordinate system 160 (with planet axis 106 in the y-z plane) about the x-axis to achieve first relative coordinate system 170 (x', y', z'). In relative coordinate system 170, planet axis 106 coincides with the z'-axis. As depicted in FIG. 1C, skew angle (zeta) 120 can be derived by rotating coordinate system 170 about the y-axis (not the y'-axis) to achieve second relative coordinate system 180 (x", y", z"). In relative coordinate system 180, planet axis 106 coincides with the z"-axis. Skew angle (zeta) 120 is the angular orientation relative to the y-axis in the x-z plane of the planet axis 106. In some embodiments, tilt angle (gamma) 118 is controlled, at least in part, through an adjustment of skew angle (zeta) 120.

As depicted in FIG. 1D, certain kinematic relationships between contacting components of CVT 100 explain how the inducement of a skew condition generates forces that tend to adjust tilt angle (gamma) 118. As used herein, the phrase "skew condition" refers to an orientation of planet axes 106 such that a non-zero skew angle (zeta) 120 relative to the y-axis exists. Hence, reference to "inducement of a skew condition" implies an inducement of planet axes 106 to align at non-zero skew angle (zeta) 120. In certain embodiments of CVT 100, certain spin-induced forces also act on planet 108. In CVT 100, traction rings 102, 104 and sun 110 contact planet 108 at three locations to form traction or friction contact areas. In certain embodiments, first traction ring 102 drives planet 108 at contact 1, and planet 108 transmits power to second traction ring 104 at contact 2. Traction sun 110 contacts traction planet 108 at contact 3, which may be a single point (shown) or may collectively refer to multiple contact points (not shown here for simplicity). Contact points 1, 2 and 3 are arranged in FIG. 1D to reflect a view of the x-z plane as seen from above CVT 100. However, for ease of understanding, since contact areas 1, 2 and 3 are not coplanar, contact-centered coordinate systems are used in FIG. 1D so that contact areas 1, 2 and 3 can be illustrated with the x-z plane. Subscripts 1, 2, and 3 are used to denote the specific contact area for contact-centered coordinate systems. The $z_1$, $z_2$, and $z_3$ axes intersect at the center of a spherical traction planet 108.

As depicted in FIG. 1D, the surface velocity of first traction ring 102 is denoted in the negative $x_1$ direction by vector $V_{r1}$ and the surface velocity of planet 108 is represented by a vector $V_{p1}$; the angle formed between the vectors $V_{r1}$ and $V_{p1}$ is approximately skew angle 120. The resulting relative surface velocity between first traction ring 102 and traction planet 108 is represented by a vector $V_{r1/p}$. At contact area 3 between traction planet 108 and traction sun 110, the surface velocity of traction sun 110 is represented by vector $V_{sv}$ and the surface velocity of traction planet 108 is represented by vector $V_{ps}$; the angle formed between $V_{sv}$ and $V_{ps}$ is approximately skew angle 120. The relative surface velocity between traction planet 108 and traction sun 110 is represented by vector $V_{sv/p}$. Similarly, for contact 2, the surface velocity of traction planet 108 at contact area 2 is represented by vector $V_{p2}$ and the surface velocity of second traction ring 104 is represented by vector $V_{r2}$; the angle formed between $V_{p2}$ and $V_{r2}$ is approximately skew angle 120; the relative surface velocity between traction planet 108 and second traction ring 104 is represented by vector $V_{r2/p}$.

The kinematic relationships discussed above tend to generate forces at the contacting components. FIG. 1E depicts a generalized, representative traction curve that can be applied at each of contact areas 1, 2, 3, illustrating a relationship between the traction coefficient μ and the relative velocity between contacting components. The traction coefficient μ is indicative of the capacity of the fluid to transmit a force. The relative velocity, such as $V_{r1/p}$, can be a function of skew angle 120. The traction coefficient μ is the vector sum of the traction coefficient in the x-direction ($\mu_x$) and the traction coefficient in the y-direction ($\mu_y$) at contact area 1, 2, or 3. As a general matter, traction coefficient μ is a function of the traction fluid properties, the normal force at the contact area, and the velocity of the traction fluid in the contact area, among many other things. For a given traction fluid, the traction coefficient μ increases with increasing relative velocities of components, until the traction coefficient μ reaches a maximum capacity after which the traction coefficient μ decreases with increasing relative velocities of components. Consequently, in the presence of skew angle 120 (i.e., under a non-zero skew condition), forces are generated at contact areas 1, 2, 3 around the traction planet 108 due to kinematic conditions.

Based on the traction curve depicted in FIG. 1E and the diagrams depicted in FIGS. 1D and 1F, $V_{r1/p}$ generates a traction force parallel to $V_{r1/p}$ with a component side force $F_{s1}$. Increasing skew angle 120 increases $V_{r1/p}$ and, thereby increases force $F_{s1}$ (according to the general relationship illustrated in FIG. 1D). $V_{sv/p}$ generates force $F_{ss}$, and similarly, $V_{r2/p}$ generates force $F_{s2}$. Forces $F_{s1}$, $F_{ss}$, and $F_{s2}$ combine to create a net moment about traction planet 108 in the y-z plane. More specifically, the summation of moments about traction planet 108 is $M=R*(F_{s1}+F_{s2}+F_{ss})$, where R is the radius of traction planet 108, and forces $F_{s1}$, $F_{s2}$, and $F_{ss}$ are the resultant components of the contact forces in the y-z plane. The contact forces, also referred to here as skew-induced forces, in the above equation are as follows: $F_{s1}=\mu_{y1}N1$, $F_{s2}=\mu_{y2}N2$ and $F_{ss}=\mu_{ys}N3$, where N1, N2 and N3 are the normal forces at the respective contact areas 1, 2 and 3. Since the traction coefficient μ is a function of relative velocity between contacting components, the traction coefficients $\mu_{y1}$, $\mu_{y2}$, and $\mu_{ys}$ are consequently a function of skew angle 120 as related by the kinematic relationship. In the embodiment illustrated here, a moment is an acceleration of inertia and the moment will generate a tilt angle acceleration $\ddot{\gamma}$. Therefore, the rate of change of tilt angle $\dot{\gamma}$ is a function of skew angle 120.

FIG. 1G depicts a top view of one embodiment of traction planet 108 having non-zero skew angle (zeta) 120, which results in planet axis of rotation 106 being non-parallel (in the $y_g$-$z_g$ plane) to longitudinal axis 15 of CVT 100 and rotational velocity 122 of traction planet 108 is not coaxial with the z-axis. Skew angle 120 generates forces for motivating a change in tilt angle 118. In the presence of skew angle 120, traction planet 108 would have rotational velocity 122 about an axis z″, and tilt angle 118 would be formed between axis z″ and the y-z plane.

SUMMARY OF CERTAIN INVENTIVE ASPECTS

Embodiments of CVTs disclosed herein are capable of operating according to the above-mentioned principles during operation in forward direction and reverse direction, may switch between operation in forward direction and reverse direction, and may be controlled using various control schemes that enable switching between operation in forward direction and reverse direction. In particular, embodiments disclosed herein include a vehicle or equipment with a transmission, drivetrain, CVT or a control system for a CVT having a control system coupled to a plurality of trunnions coupled to each axle in a plurality of axles, wherein the control system is capable of misaligning the axles to adjust a speed ratio over a range of speed ratios between underdrive and overdrive (and including 1:1), and configurable to operate in forward and reverse directions and further configurable to operate according to different control strategies for stability and sensitivity.

Advantageously, embodiments disclosed herein may operate in either forward direction or reverse direction, allowing a CVT to be continuously adjusted to maintain a constant output speed for varying input speeds and torques, to maintain a speed ratio for variable input speeds and torques or variable output speeds and torques, or to provide variable output speeds for constant input speeds and torques. Furthermore, when radial translation of trunnion extensions results in trunnions oriented with an offset angle (psi) that reverses signs (that is, switching from positive to negative or negative to positive), embodiments may proactively, simultaneously or reactively adjust a speed ratio of a CVT. As such, if a CVT is operating in overdrive in forward and trunnion extensions are radially translated to reorient the trunnions to reverse the sign of offset angle (psi), the CVT may also be adjusted from overdrive to underdrive. Furthermore, control of a CVT between operation in forward direction and reverse direction may include radially translating trunnion extensions to change the orientation of trunnions relative to a pitch circle to accommodate a switch in the direction of rotation and compensating for the corresponding switch between overdrive and underdrive by axially translating trunnion extensions to apply a skew condition to maintain the skew angle (zeta) imparted on the planets. The processes of orienting the trunnions to an offset angle (psi) relative to the pitch circle to configure the CVT for switching between operation in forward direction and reverse direction and applying a skew angle (zeta) to adjust a tilt angle (gamma) of the CVT adjust the speed ratio of the CVT to any speed ratio between underdrive and overdrive may be performed independently, allowing for multiple possible control schemes for a CVT, such as an example CVT 200 described below.

To configure a CVT for operation in a forward direction or a reverse direction, embodiments may translate trunnion extensions radially inward or outward of a pitch circle to orient trunnions to have a positive or negative offset angle (psi). Furthermore, embodiments disclosed herein may adjust tilt angles (gamma), angular positioning (beta), skew angles (zeta) and offset angles (psi) independently or concurrently, allowing a control system to switch operation of CVT between forward and reverse rotation, and adjust or maintain a speed ratio.

Couplings between trunnions and trunnion extensions allow trunnion extensions to move axially but allow trunnions to rotate to a target offset angle (psi) about their respective z-axes.

Embodiments disclosed herein may advantageously orient trunnions at an offset angle (psi) and adjust a tilt angle (gamma) of axles for a CVT concurrently or independently, allowing for controlled operations in both forward and reverse directions, wherein an offset angle (psi) sign can change at any ratio range, and a transmission ratio (speed or torque) may be adjusted at any offset angle (psi). Advantageously, if a control system for a vehicle operating a CVT determines that a rollback scenario is occurring or likely to occur, a control system may initiate radial movement of couplings or trunnion extensions or change an orientation of trunnions to change the offset angle (psi) sign relative to the pitch circle. Instead of disconnecting power to avoid rollback damage or locking the CVT at a set angle to mitigate rollback damage, changing the offset angle (psi) independently or concurrently with changing the tilt angle (gamma) allows the control system (and therefore the operator) to maintain positive control of the CVT even in rollback scenarios.

Embodiments of a control system may also determine a control sensitivity. The control sensitivity is a function of the offset angle (psi) and dimensions of components including links. Small offset angles (psi) or short link lengths require less axial movement to achieve the same tilt angle (gamma) and allow for faster ratio adjustments but may be less stable. Larger offset angles (psi) or longer link lengths require more axial movement to achieve the same tilt angle (gamma) and may limit ratio adjustment rates but may be more stable. Embodiments of a control system may determine a control sensitivity based on operator input, sensor information, or some combination. Embodiments may also operate according to a first control sensitivity under a first set of conditions and change to a second control sensitivity under a second set of conditions. In some embodiments, a first set of conditions may correspond to operating a CVT in a forward direction and a second set of conditions may correspond to operating the CVT in a reverse direction, operating in a forward direction when reversal of rotation direction is imminent, operating in a forward direction when reversal of rotation direction is probable, in a forward direction when reversal of rotation direction is possible, operating in a forward direction under an increased load, or operating in a forward direction at higher vehicle speed. Other conditions may be based on sensor inputs. In some embodiments, if a sensor determines battery capacity is low or components are overheating, a control system may determine a control sensitivity that limits the axial movement of a coupling and reduce the offset angle (psi) to allow for reduced axial movement of the coupling or may increase the offset angle (psi) and reduce the frequency of commands for adjusting the axial movement of the coupling.

In a broad respect, embodiments disclosed herein may be generally directed to a ball planetary continuously variable transmission (CVT) comprising a plurality of spherical planets between and in contact with two traction rings and a sun, each planet having an axle and a geometric center through which an x-axis, y-axis and z-axis intersect, wherein the plurality of geometric centers define a pitch circle for the plurality of planets, wherein each axle extends through a central bore of a spherical planet and defines the z-axis and an axis of rotation. In some such embodiments, each planet axle is capable of tilting in a first skew plane, and has a skew angle defined as an angle between the central axis and the planet axle, and in a second tilting plane defining a tilt angle as the angle between the central axis and the planet axle, wherein the tilt angle defines a transmission ratio of the transmission. Some embodiments have a first carrier half coaxial with and rotatable about the central axis, the first carrier half coupled by a plurality of links to a first end of each of the planet axles; and a second carrier half coaxial with and rotatable about the central axis, the second carrier half coupled by a plurality of links to a second end of each of the planet axles. In some such embodiments, the first carrier half and second carrier half are rotatable with respect to each other to define an angular position, wherein relative rotation of the first and second carrier halves defines a non-zero angular position that imparts a non-zero skew angle, and wherein a non-zero skew angle imparts an adjustment to the tilt angle, resulting in a change in the transmission ratio of the CVT. In some embodiments, a plurality of couplings couple the plurality of links to the first and second carrier halves, wherein the plurality of couplings are adapted to allow the plurality of links to rotate out of plane with the first and second carrier halves to facilitate the tilting of the planet axles. The plurality of couplings may be ball joints. The plurality of links may be flexible. In some embodiments, the CVT further includes a pitch circle coaxial about the central axis and having a radius equal to a plurality of centers of the planet assemblies, a plurality of connections that connect the plurality of links to the plurality of planet axles. An effective offset angle is defined by the tangent of the pitch circle at a respective one of the plurality of connections and a line between an associated one of the plurality of connections and an associated one of the plurality of couplings. In such embodiments, the effective offset angle may be positive when the plurality of links are located radially outside of the pitch circle, a positive offset angle associated with a forward direction of rotation, and the effective offset angle may be negative when the plurality of links are located radially inside of the pitch circle, a negative offset angle associated with a reverse direction of rotation. In certain embodiments, the CVT further includes an actuator adapted to adjust the radial position of the plurality of couplings in order to adjust the effective offset angle. Certain of these embodiments include an actuator adapted to adjust the radial position of the plurality of couplings to a positive effective offset angle when the CVT is rotating in the forward direction, and adapted to adjust the radial position of the plurality of couplings to a negative offset angle when the CVT is rotating in the reverse direction.

In one broad respect, embodiments disclosed herein may be directed to a continuously variable transmission comprising a plurality of spherical planets between and in contact with two traction rings and a sun, each planet having a geometric center through which an x-axis, y-axis and z-axis intersect, wherein the plurality of geometric centers define a pitch circle for the plurality of planets, wherein an axle extends through a central bore of each of the plurality of spherical planets and defines the z-axis and an axis of rotation. In some embodiments, the control system comprises a plurality of trunnions, wherein each trunnion is coupled to each end of an axle and extends around a spherical planet to a coupling. In some embodiments, the plurality of trunnions are oriented at an offset angle (psi). In some embodiments, orientation of the plurality of traction planets such that the offset angle (psi) has a positive sign configures the CVT for operation in a first direction and orientation of the plurality of traction planets such that the offset angle (psi) has a negative sign configures the CVT for operation in a second direction. In some embodiments in which the plurality of couplings lead the spherical planets, the plurality of trunnions are oriented such that the offset angle (psi) has a positive sign for operation in a forward direction and a negative sign for operation in a reverse direction. In some embodiments in which the plurality of couplings trail the spherical planets, the plurality of trunnions are oriented such that the offset angle (psi) has a negative sign for operation in a forward direction and a positive sign for operation in a reverse direction. In some embodiments in which the axles are fixed axially to the plurality of planets, axial translation of the plurality of couplings imparts a skew condition on the plurality of traction planets to adjust a speed ratio of the CVT. In some embodiments in which the CVT further comprises a synchronizing ring coupled to the plurality of couplings, axial translation of the synchronizing ring axially translates the plurality of couplings to adjust the speed ratio of the CVT. The orientation of the plurality of trunnions is controlled by radial translation of the plurality of couplings. In some embodiments in which the couplings are fixed axially, an axial force applied to the plurality of axles imparts a skew condition on the plurality of traction planets to adjust a speed ratio of the CVT. In some embodiments in which a synchronizer is coupled to at least one end of each axle, axial translation of the synchronizer axially translates the plurality of axles to adjust a speed ratio of the CVT. In some embodiments in which the synchronizer comprises a control disc positioned on one side of the CVT, the control disc comprises a plurality of slots and an end of each axle is coupled to a slot of the plurality of slots, wherein an axial force is applied to the control disc in a first direction or a second direction opposite the first direction to adjust a speed ratio of the CVT. In some embodiments in which the synchronizer comprises a first control disc positioned on a first side of the plurality of slots and a second control disc positioned on a second side of the plurality of slots opposite the first control disc, an axial force is applied to the first control disc to apply an axial force to the axles in a first direction and an axial force is applied to the second control disc to apply an axial force to the axles in a second direction. In some embodiments in which the synchronizer comprises a plurality of arms with each arm coupled to an axle of the plurality of axles, an axial force applied to the plurality of arms applies an axial force to the plurality of axles to adjust a speed ratio of the CVT.

In another broad respect, embodiments disclosed herein may be directed to a method of controlling a continuously variable transmission (CVT) comprising a plurality of spherical planets between and in contact with two traction rings and a sun, each planet having a geometric center through which an x-axis, y-axis and z-axis intersect, wherein the plurality of geometric centers define a pitch circle for the plurality of planets, wherein an axle extends through a central bore of each of the plurality of spherical planets and defines the z-axis and an axis of rotation for that planet, and a plurality of trunnions, wherein each trunnion is coupled to each end of an axle and extends around a spherical planet coupled to the axle. In some embodiments, the method comprises rotating the plurality of trunnions about their respective z-axes to an offset angle (psi). An offset angle (psi) having a positive sign configures the CVT for operation in a first direction of rotation, and an offset angle (psi) having a negative sign configures the CVT for operation in a second direction of rotation. In some embodiments, each trunnion is coupled to a trunnion extension via a coupling with multiple degrees of freedom, wherein the method comprises axially translating the plurality of trunnion extensions to impart a skew angle (zeta) on the plurality of traction planets to cause a change in a speed ratio of the CVT, whereby the couplings allow forces generated by the axial translation to tilt the planets. In some embodiments, each trunnion is coupled to a trunnion extension with limited degrees of freedom, wherein the method comprises applying an axial force to the plurality of axles to impart the skew angle (zeta) on the plurality of traction planets to cause a change in a speed ratio of the CVT, whereby the couplings react forces generated by the axial translation of the planets to tilt the planets. In some embodiments, the method comprises axially fixing the plurality of couplings, wherein adjusting the speed ratio of the CVT comprises applying an axial force to the plurality of axles. In some embodiments, the method comprises axially fixing the plurality of axles to the plurality of traction planets, wherein adjusting the speed ratio of the CVT comprises axially translating the plurality of couplings. In some embodiments, the method comprises determining a first direction of rotation for the CVT; rotating the plurality of trunnions about their respective z-axes to a first offset angle (psi) for operation in the first direction of rotation; determining a change in direction of rotation of the CVT to a second direction of rotation; and rotating the plurality of trunnions about their respective z-axes to a second offset angle (psi) for operation in the second direction of rotation of the CVT. In some embodiments, the method comprises determining a first direction of operation; configuring the CVT for operation at a first offset angle (psi) for the first direction of rotation based on one or more of a first user input, a first operating condition and a first environmental condition; and configuring the CVT for operation at a second offset angle (psi) for the first direction of rotation based on one or more of a second user input, a second operating condition and a second environmental condition, wherein the first offset angle (psi) or the second offset angle (psi) is selected for stable operation or sensitivity.

In another broad respect, embodiments disclosed herein may be directed to a control system for a continuously variable transmission (CVT) comprising a plurality of spherical planets between and in contact with two traction rings and a sun, each planet having a geometric center through which an x-axis, y-axis and z-axis intersect, wherein the plurality of geometric centers define a pitch circle for the plurality of planets, wherein an axle extends through a central bore of each of the plurality of spherical planets and defines the z-axis and an axis of rotation. The control system comprises a controller communicatively coupled to a plurality of sensors and further coupled to a plurality of trunnions coupled to the plurality of axles, wherein each trunnion is coupled to each end of an axle and extends around a spherical planet coupled to that axle. The controller may receive signals related to performance of the CVT, performance of a prime mover coupled to the CVT, signals related to performance of a vehicle associated with the CVT, signals related to the environment, and user inputs. The controller may analyze the signals and configure the CVT. In some embodiments, the controller may configure the CVT for forward or reverse rotation. In some embodiments, the controller may configure the CVT for a desired stability or sensitivity. In some embodiments, the controller may compare the signals with values stored in memory, determine an operating condition is present and configure the CVT according to the operating condition. The operating condition may be a rollback condition, in which a vehicle containing the CVT is in a rollback condition or about to encounter a rollback condition. In some embodiments, the controller may analyze the signals and determine a rollback condition is possible and configure the CVT for increased sensitivity. Configuring the CVT for increased sensitivity may include adjusting trunnions to a smaller offset angle (psi). In some embodiments, the smaller offset angle may be less than 10 degrees. In some embodiments, configuring the CVT for increased sensitivity may include increasing the rate at which sensors send signals to the controller. In some embodiments the controller may configure the CVT for increased stability, which may include adjusting trunnions to a higher offset angle (psi). Adjusting the trunnions may comprise radially translating a control point for each trunnion to a radial position relative to a pitch circle or rotating the trunnions to an offset angle (psi). Each trunnion comprises a coupling, wherein a control point is defined along a line passing through the geometric center of each traction planet and the coupling for that traction planet, wherein a position of a plurality of control points radially outside the pitch circle configures the CVT for a first direction, wherein a position of the plurality of control points radially inside the pitch circle configures the CVT for a second direction opposite the first direction. An axial translation of the plurality of control points, an axial force applied to the plurality of axles, or a combination thereof misaligns the plurality of axles relative to a longitudinal axis of the CVT to adjust a tilt angle of the plurality of planets. In some embodiments in which the plurality of couplings lead the spherical planets, the controller may position the plurality of control points radially inward of the pitch circle for operation in a forward direction of rotation or radially outward of the pitch circle for operation in a reverse direction of rotation. In some embodiments in which the plurality of couplings trail the spherical planets, a controller may position the plurality of control points radially outward of the pitch circle for operation in a forward direction of rotation or radially inward of the pitch circle for a reverse direction of rotation. In some embodiments, the plurality of axles are axially fixed to the plurality of planets and the CVT further comprises a plurality of trunnion extensions coupled to the plurality of couplings and a synchronizing ring. A controller may control a radial position of the plurality of couplings by radial translation of the plurality of trunnion extensions. A controller may command an axial translation of the synchronizing ring to axially translate the plurality of couplings to adjust the speed ratio of the CVT. In some embodiments, the couplings are fixed axially, and a controller may command an axial force be applied to the plurality of axles to impart a non-zero skew condition to the plurality of planets. The non-zero skew condition causes the CVT to adjust a tilt angle of the plurality of spherical planets. In some embodiments, a synchronizer is coupled to at least one end of each axle, wherein a controller commanding an axial force applied to the synchronizer misaligns the plurality of axles to adjust a tilt angle of the plurality of traction planets. In some embodiments, the synchronizer comprises a control disc positioned on one side of the CVT. The control disc has a plurality of slots and an end of each axle is coupled to a slot of the plurality of slots. An axial force applied to the control disc in a first direction or a second direction opposite the first direction imparts a non-zero skew condition to adjust a tilt angle of the plurality of traction planets. In some embodiments, the synchronizer comprises a first control disc positioned on a first side of the plurality of slots and a second control disc positioned on a second side of the plurality of slots opposite the first control disc, wherein a controller commanding an axial force applied to the first control disc applies an axial force to the axles in a first direction to impart a non-zero skew condition to adjust a tilt angle of the plurality of traction planets toward underdrive, or an axial force applied to the second control disc applies an axial force to the axles in a second direction to impart a non-zero skew condition to adjust a tilt angle of the plurality of traction planets toward overdrive. In some embodiments, the synchronizer comprises a plurality of arms. Each rigid member is coupled to an axle of the plurality of axles, wherein an axial force applied to the plurality of arms applies an axial force to the plurality of axles to adjust a tilt angle of the plurality of traction planets.

In another broad respect, embodiments disclosed herein may be generally directed to a method of controlling a continuously variable transmission (CVT) comprising a plurality of spherical planets between and in contact with two traction rings and a sun, each planet having a geometric center through which an x-axis, y-axis and z-axis intersect, wherein the plurality of geometric centers define a pitch circle for the plurality of planets, wherein an axle extends through a central bore of each of the plurality of spherical planets and defines the z-axis and an axis of rotation for that planet, and a plurality of trunnions, wherein each trunnion is coupled to each end of an axle and extends around a spherical planet coupled to that axle, wherein each trunnion comprises a coupling, wherein a control point is defined along a line passing through the geometric center of each traction planet and the coupling for that traction planet. In some embodiments, rotating the plurality of trunnions about their respective z-axes to an offset angle (psi) comprises determining a control scheme and rotating the plurality of trunnions to the offset angle (psi) based on the control scheme. In some embodiments, the plurality of trunnions are rotated to a larger angle associated with a control scheme selected for stable operation or are rotated to a smaller angle associated with a control scheme selected for increased sensitivity.

In another broad respect, embodiments disclosed herein may be generally directed to a control system for a ball planetary continuously variable transmission (CVT) comprising a plurality of spherical planets between and in contact with two traction rings and a sun, each planet having a geometric center through which an x-axis, y-axis and z-axis intersect, wherein the plurality of geometric centers define a pitch circle for the plurality of planets, wherein an axle extends through a central bore of each of the plurality of spherical planets and defines the z-axis and an axis of rotation. In some embodiments, the control system comprises a plurality of trunnions coupled to the plurality of axles, wherein each trunnion comprises a first link coupled to a first end of an axle, a second link coupled to a second end of the axle, and a center link coupled to the first link and the second link. A first actuator may configure the plurality of trunnions to an offset angle (psi) relative to the pitch circle. A second actuator may rotate the center link. A controller communicatively coupled to the actuator and a plurality of sensors may be configured to receive signals from the plurality of sensors, determine a direction of rotation for the CVT, send a first signal to the first actuator to adjust the offset angle (psi) of the plurality of trunnions and send a signal to the second actuator to impart a skew angle (zeta) on the plurality of axles to adjust a tilt angle. In some embodiments, if the plurality of trunnions lead the plurality of planets and the offset angle (psi) is positive, the CVT is configured for operation in a forward direction. In some embodiments, if the plurality of trunnions trail the plurality of planets and the offset angle (psi) is negative, the CVT is configured for operation in forward direction. A speed ratio of the CVT may be based on the tilt angle, the skew angle and the offset angle. The controller may receive signals related to performance of the CVT, performance of a prime mover coupled to the CVT, signals related to performance of a vehicle associated with the CVT, signals related to the environment, and user inputs. The controller may analyze the signals and configure the CVT. In some embodiments, the controller may configure the CVT for forward or reverse rotation. In some embodiments, the controller may configure the CVT for a desired stability or sensitivity. In some embodiments, the controller may compare the signals with values stored in memory, determine an operating condition is present and configure the CVT according to the operating condition. The operating condition may be a rollback condition, in which a vehicle containing the CVT is in a rollback condition or about to encounter a rollback condition. In some embodiments, the controller may analyze the signals and determine a rollback condition is possible and configure the CVT for increased sensitivity. In some embodiments, the controller is further configured to change the offset angle (psi) in response to determining a change in the direction of rotation or receiving an input to change the direction of rotation. In some embodiments, the controller is further configured to adjust the offset angle (psi) to have a larger magnitude for a first control scheme for stable control or to have a smaller magnitude for a second control scheme for increased sensitivity.

In another broad respect, embodiments disclosed herein may be generally directed to a ball planetary continuously variable transmission (CVT) comprising a plurality of spherical planets between and in contact with two traction rings and a sun, each planet having a geometric center through which an x-axis, y-axis and z-axis intersect, wherein the plurality of geometric centers define a pitch circle for the plurality of planets, wherein an axle extends through a central bore of each of the plurality of spherical planets and defines the z-axis and an axis of rotation, and a control system. The control system may comprise a plurality of trunnions coupled to the plurality of axles, a first actuator for configuring the plurality of trunnions to an offset angle (psi) relative to the pitch circle, a second actuator for rotating the center link and a controller communicatively coupled to the actuator and a plurality of sensors. In some embodiments, each trunnion comprises a first link coupled to a first end of an axle, a second link coupled to a second end of the axle, and a center link coupled to the first link and the second link. In some embodiments, the controller is configured to receive signals from the plurality of sensors, determine a direction of rotation for the CVT, send a first signal to the first actuator to adjust the offset angle (psi) of the plurality of trunnions, and send a signal to the second actuator to impart a skew angle (zeta) on the plurality of axles to adjust a tilt angle. In some embodiments, if the plurality of trunnions lead the plurality of planets and the offset angle (psi) is positive, a controller may configure the CVT for operation in a forward direction. In some embodiments, if the plurality of trunnions trail the plurality of planets and the offset angle (psi) is negative, a controller may configure the CVT for operation in forward direction. In some embodiments, a speed ratio of the CVT may be based on the tilt angle, the skew angle and the offset angle. In some embodiments, the first link and the second link comprise rigid members.

In another broad respect, embodiments disclosed herein may be generally directed to a control system for a continuously variable transmission (CVT) comprising a plurality of spherical planets between and in contact with two traction rings and a sun, each planet having a geometric center through which an x-axis, y-axis and z-axis intersect, wherein the plurality of geometric centers define a pitch circle for the plurality of planets, wherein an axle extends through a central bore of each of the plurality of spherical planets and defines the z-axis and an axis of rotation. The control system comprises a first carrier member located on a first side of the CVT, a first plurality of arms on the first side of the CVT, a second carrier member located on a second side of the CVT, a second plurality of arms, a first actuator for rotating one or more of the first carrier and the second carrier to an angular orientation of the first carrier relative to the second carrier member, and a controller communicatively coupled to the actuator and a plurality of sensors. A first end of each arm of the first plurality of arms is coupled to a first end of an axle and a second end of each arm of the first plurality of arms is coupled to the first carrier member. A first end of each arm of the second plurality of arms is coupled to a second end of an axle and a second end of each arm of the second plurality of arms is coupled to the second carrier member. The controller configured to receive signals from the plurality of sensors and command the first actuator to rotate the first carrier member relative to the second carrier member, wherein rotation of the first carrier member relative to the second carrier member imparts a skew condition on the plurality of planets to tilt the plurality of axles to a tilt angle associated with a speed ratio for the CVT. In some embodiments, the first plurality of arms are movable relative to the first carrier member and the second plurality of arms are movable relative to the second carrier member and the control system further comprises a second actuator for radially rotating one or more of the first plurality of arms and the second plurality of arms to an offset angle (psi) to configure the CVT for operation in a forward direction of rotation or reverse direction of rotation. The controller may receive signals related to performance of the CVT, performance of a prime mover coupled to the CVT, signals related to performance of a vehicle associated with the CVT, signals related to the environment, and user inputs. The controller may analyze the signals and configure the CVT. In some embodiments, the controller may configure the CVT for forward or reverse rotation. In some embodiments, the controller may configure the CVT for a desired stability or sensitivity. In some embodiments, the controller may compare the signals with values stored in memory, determine an operating condition is present and configure the CVT according to the operating condition. The operating condition may be a rollback condition, in which a vehicle containing the CVT is in a rollback condition or about to encounter a rollback condition. In some embodiments, the controller may analyze the signals and determine a rollback condition is possible and configure the CVT for increased sensitivity. In some embodiments, the controller is further configured to change the offset angle (psi) in response to determining a change in the direction of rotation or receiving an input to change the direction of rotation. In some embodiments, the controller is further configured to adjust the offset angle (psi) to have a larger magnitude for a first control scheme for stable control or to have a smaller magnitude for a second control scheme for increased sensitivity. In some embodiments, the controller is configured to receive a user input for one or more of a direction of rotation, a control mode, and a speed ratio. In some embodiments, orientation of the first plurality of arms to a positive first offset angle (psi) relative to the first carrier member and orientation of the second plurality of arms to a positive second offset angle (psi) relative to the second carrier member configures the CVT for operation in a first direction of rotation, wherein orientation of the first plurality of arms to a negative first offset angle (psi) relative to the first carrier member and orientation of the second plurality of arms to a negative second offset angle (psi) relative to the second carrier member configures the CVT for operation in a second direction of rotation. In some embodiments, if the first carrier member and the second carrier member lead the plurality of axles, orientation of the first plurality of arms to a positive first offset angle (psi) and orientation of the second plurality of arms to a positive second offset angle (psi) configures the CVT for operation in forward direction and orientation of the first plurality of arms to a negative first offset angle (psi) and orientation of the second plurality of arms to a negative second offset angle (psi) configures the CVT for operation in reverse direction, and wherein if the first carrier member and the second carrier member trail the plurality of axles, orientation of the first plurality of arms to a positive first offset angle (psi) and orientation of the second plurality of arms to a positive second offset angle (psi) configures the CVT for operation in reverse direction and orientation of the first plurality of arms to a negative first offset angle (psi) and orientation of the second plurality of arms to a negative second offset angle (psi) configures the CVT for operation in forward direction. In some embodiments, at least one of the first plurality of arms and the second plurality of arms is formed as a resilient member. In some embodiments, at least one of the first plurality of arms and the second plurality of arms is formed with directional resiliency.

In another broad respect, embodiments disclosed herein may be generally directed to a continuously variable transmission (CVT) comprising a plurality of spherical planets between and in contact with two traction rings and a sun, each planet having a geometric center through which an x-axis, y-axis and z-axis intersect, wherein the plurality of geometric centers define a pitch circle for the plurality of planets, wherein an axle extends through a central bore of each of the plurality of spherical planets and defines the z-axis and an axis of rotation. In some embodiments, orientation of the first plurality of arms to a positive first offset angle (psi) relative to the first carrier member and orientation of the second plurality of arms to a positive second offset angle (psi) relative to the second carrier member configures the CVT for operation in a first direction of rotation. In some embodiments, orientation of the first plurality of arms to a negative first offset angle (psi) relative to the first carrier member and orientation of the second plurality of arms to a negative second offset angle (psi) relative to the second carrier member configures the CVT for operation in a second direction of rotation. In some embodiments, if the first carrier member and the second carrier member lead the plurality of axles, orientation of the first plurality of arms to a positive first offset angle (psi) and orientation of the second plurality of arms to a positive second offset angle (psi) configures the CVT for operation in forward direction and orientation of the first plurality of arms to a negative first offset angle (psi) and orientation of the second plurality of arms to a negative second offset angle (psi) configures the CVT for operation in reverse direction. In some embodiments, if the first carrier member and the second carrier member trail the plurality of axles, orientation of the first plurality of arms to a positive first offset angle (psi) and orientation of the second plurality of arms to a positive second offset angle (psi) configures the CVT for operation in reverse direction and orientation of the first plurality of arms to a negative first offset angle (psi) and orientation of the second plurality of arms to a negative second offset angle (psi) configures the CVT for operation in forward direction. In some embodiments, at least one of the first link and the second link is formed as a resilient member. In some embodiments, at least one of the first link and the second link is formed with directional resiliency.

In another broad respect, embodiments disclosed herein may be generally directed to a method of adjusting a speed ratio of a continuously variable transmission (CVT) comprising a plurality of spherical planets between and in contact with two traction rings and a sun, each planet having a geometric center through which an x-axis, y-axis and z-axis intersect, wherein the plurality of geometric centers define a pitch circle for the plurality of planets, wherein an axle extends through a central bore of each of the plurality of spherical planets and defines the z-axis and an axis of rotation. In some embodiments, the method comprises rotating a first carrier member relative to a second carrier member, wherein the first carrier member is coupled to a first plurality of arms, wherein each arm of the first plurality of arms is coupled to a first end of an axle of a traction planet, wherein the second carrier member is coupled to a second plurality of arms, wherein each arm of the second plurality of arms coupled to a second end of the axle of a traction planet, wherein rotating the first carrier member relative to the second carrier member misaligns the plurality of axes of rotation relative to a longitudinal axis of the CVT to change a speed ratio of the CVT. In some embodiments, the method includes adjusting an offset angle (psi) for the first plurality of arms and the second plurality of arms, wherein a positive offset angle (psi) configures the CVT for operation in a first direction of rotation, wherein a negative offset angle (psi) configures the CVT for operation in a second direction of rotation. In some embodiments, adjusting an offset angle (psi) for the first plurality of arms and the second plurality of arms comprises adjusting a magnitude of the offset angle (psi). In some embodiments, the magnitude is based on a control scheme, wherein the offset angle (psi) is adjusted to a larger magnitude for stable control or adjusted to a smaller magnitude for increased sensitivity. In some embodiments, one or more of the control scheme, the direction of rotation and the speed ratio are user input received from a user interface.

These, and other, aspects of the disclosed technology will be better appreciated and understood when considered in conjunction with the following description and the accompanying drawings. The following description, while indicating various embodiments of the disclosed technology and numerous specific details thereof, is given by way of illustration and not of limitation. Many substitutions, modifications, additions or rearrangements may be made within the scope of the disclosed technology, and the disclosed technology includes all such substitutions, modifications, additions or rearrangements.

BRIEF DESCRIPTION OF THE DRAWINGS

The drawings accompanying and forming part of this specification are included to depict certain aspects of the disclosed technology. A clearer impression of the disclosed technology, and of the components and operation of systems provided with the disclosed technology, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION OF CERTAIN ILLUSTRATIVE EMBODIMENTS

Figure 1A:
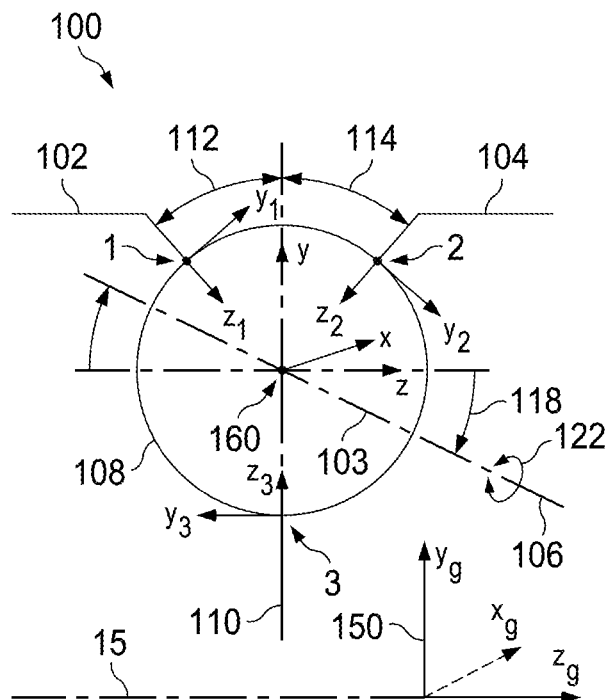
FIG. 1A depicts a schematic diagram of a continuously variable transmission relative to global and planet-centered coordinate systems.
Figure 1B:
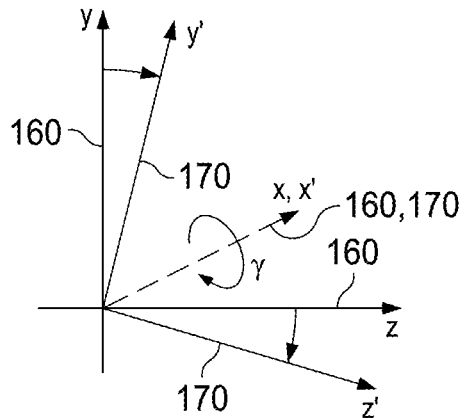
FIGS. 1B and 1C depict schematic diagrams of planet-centered coordinate systems and relative coordinate systems, illustrating relationships between skew and tilt in ball-planetary continuously variable transmissions.
Figure 1C:
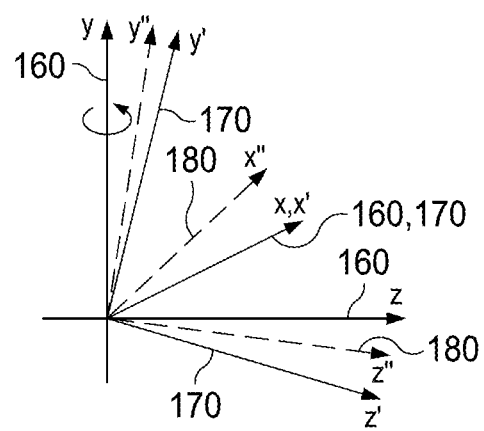
Figure 1D:
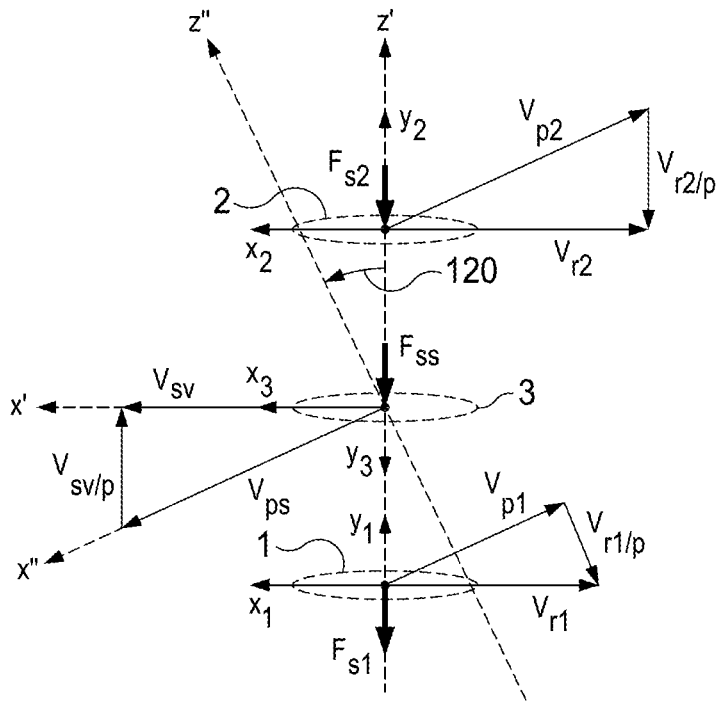
FIG. 1D depicts a schematic diagram of certain kinematic relationships between contacting components of a CVT, illustrating how the inducement of a skew condition generates forces that tend to adjust a tilt angle.
Figure 1E:
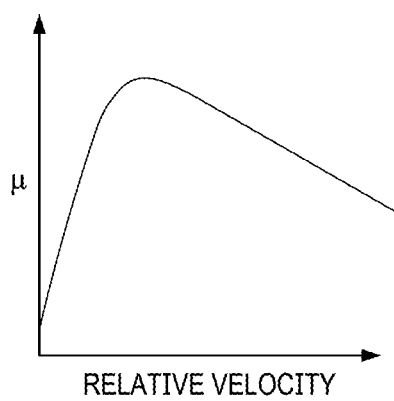
FIG. 1E depicts a generalized, representative traction curve that can be applied at each of contact areas 1, 2, 3, illustrating a relationship between the traction coefficient $\mu$ and the relative velocity between contacting components.
Figure 1F:
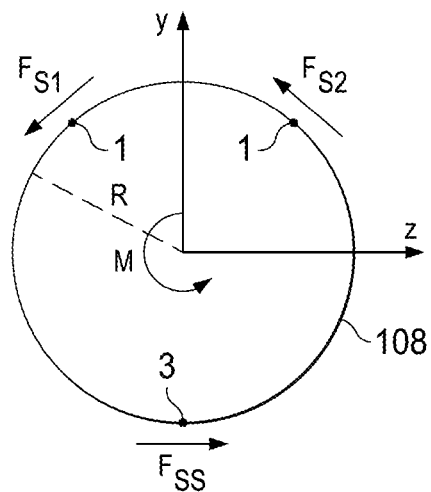
FIGS. 1F and 1G depict front and top schematic diagrams, illustrating traction forces exerted relative to a planet under non-zero skew conditions.
Figure 1G:
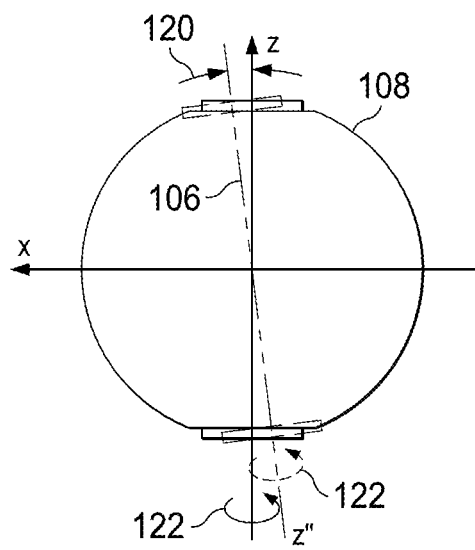

Systems and methods and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the disclosed technology in detail. It should be understood, however, that the detailed description and the specific examples, while indicating certain embodiments of the disclosed technology, are given by way of illustration only and not by way of limitation. Various substitutions, modifications, additions and/or rearrangements within the spirit and/or scope of this disclosure will become apparent to those skilled in the art from this disclosure.

Embodiments disclosed herein comprise ball-planetary continuously variable transmissions (CVTs) in which a plurality of planets are interposed between and in contact with traction rings and a sun, in which tilting of the planets changes a speed ratio of the CVT.

Speed ratio may vary between underdrive and overdrive. In underdrive, power enters a first traction ring with a first torque and a first speed and is transferred through planets to a second traction ring with a second torque higher than the first torque and a second speed lower than the first speed. In overdrive, power enters the first traction ring with a first torque and a first speed and is transferred through planets to the second traction ring with a lower torque greater than the first torque and a second speed higher than the first speed.

Each planet has a geometric center, with an x-axis, y-axis and z-axis for that planet intersecting at its geometric center. The geometric centers of planets arranged angularly around a longitudinal axis collectively define a pitch circle for the plurality of planets.

Each planet is coupled to an axle. Each axle defines an axis of rotation, which is aligned with a z-axis of a planet. Tilting axles to a non-zero tilt angle (gamma) causes contact points between planets and traction rings to change, adjusting a speed ratio of a CVT. Those skilled in the art will appreciate that for a change in speed ratio of a CVT, there is also a reciprocal change in torque ratio. Thus, a change that results in an increase in speed ratio will have a decrease in torque ratio, and a change that results in a decrease in speed ratio will have an increase in torque ratio.

As used herein, the terms "axial", "axially" and the like refer to a direction along or parallel to a longitudinal axis of the CVT.

As used herein, the terms "radial", "radially" and the like refer to a direction perpendicular to a longitudinal axis of the CVT.

For ease of understanding, direction 25 refers to a forward rotation (also referred to as a design direction) and direction 26 refers to reverse rotation, and in the embodiments illustrated power is transferred from first traction ring 102 to second traction ring 104.

Embodiments disclosed herein may include a control system configurable to adjust a CVT, such as CVT 200, to a target speed ratio for operation in a forward direction or a reverse direction, including maintaining a speed ratio during a switch between operation in forward direction and operation in a reverse direction, and operate according to a control scheme for increased stability or sensitivity. FIGS. 2A-2J depict front and side views of CVT 200 comprising a plurality of planets 108 interposed between traction rings 102, 104 and sun 110, illustrating CVT 200 configured for operation at 1:1, underdrive and overdrive speed ratios in forward and reverse directions.

As depicted in FIGS. 2A-2J, planets 108 are coupled to tiltable axles 103 that define axes of rotation 106 which are coaxial with the z-axes for planets 108. Axles 103 are coupled to planets 108 such the planets 108 may rotate about axes of rotation 106. If present, bearings 107 may facilitate rotation of axles 103 in trunnions 220. In embodiments depicted in FIGS. 2A-2J, bearings 107 allow axles 103 to rotate relative to trunnions 220 but axially fix axles 103 relative to trunnions 220.

Trunnions 220 may be machined or otherwise formed as rigid members for coupling to axles 103 to allow a control system to adjust an orientation of planets 108 in operation to adjust a speed ratio in forward direction and reverse direction. Trunnions 220 are rotatably coupled to axles 103 on either side of planets 108. FIGS. 2A-2J depict embodiments of trunnions 220 formed as arcuate rigid members. However, trunnions 220 may be formed having any shape capable of coupling to both ends of axle 103 and not contacting planets 108. FIGS. 2A-2J depict embodiments in which trunnions 220 are formed such that axles 103 and bearings 107 may be accessible via openings 223. However, trunnions 220 may be formed with smaller openings 223 such that only axles 103 are accessible, including without openings 223. Trunnions 220 are formed having an effective length defined along line 23 between a first intersection A of line 23 and radial line 20 and a second intersection B of line 23 and radial line 22. Offset 40 may result in an angular offset, allow clearance between trunnions 220 and planets 108, allow for ease in assembly, and other advantages.

Couplings 215 on trunnions 220 allow trunnions 220 one or more degrees of freedom relative to trunnion extensions 213. FIGS. 2A-2J depict CVT 200 with one embodiment of coupling 215 as a ball and socket coupling, which allows for multiple degrees of freedom. Other shapes and configurations of coupling 215 may be used to provide fewer or more degrees of freedom.

Trunnion extensions 213 may be coupled to ring 212 such that axial translation and circumferential rotation of trunnion extensions 213 are fixed relative to ring 212, but radial translation of trunnion extensions 213 and rotation about radial lines 22 are possible. For example, as depicted in FIGS. 2A-2J, trunnion extensions 213 are cylindrical and ring 212 is formed with openings 216 such that trunnion extensions 213 are restricted to radial translation along radial lines 22 and/or rotation about radial lines 22.

For purposes of describing concepts related to embodiments such as CVT 200, FIGS. 2B-2J refer to point A and point B, which are approximate locations. For example, point A is depicted as coincident with the intersection of axis of rotation 106 and a midplane of axle 103, but the exact location of point A will depend on factors such as tilt angle (gamma) 28, skew angle (zeta) 27, offset angle (psi) 24, the input speed of first traction ring 102, the output speed of second traction ring 104, a friction coefficient between components, the presence and characteristics of a traction fluid. Thus, at 1:1 ratio, point A may be generally coincident with the intersection of axis of rotation 106 and a midplane of axle 103. At full underdrive or full overdrive, point A may not be coincident with the intersection of axis of rotation 106 and a midplane of axle 103. Similarly, point B is depicted as coincident with an intersection of radial line 22 and line 23 passing through a geometric center of planets 108, but the exact position of point B will depend on factors such as tilt angle (gamma) 28, skew angle (zeta) 27, offset angle (psi) 24, the input speed of first traction ring 102, the output speed of second traction ring 104, a friction coefficient between components, and the presence and characteristics of a traction fluid. Accordingly, when referring to point A or point B in the accompanying figures, an arrow depicts an approximate location of point A or point B.

Radial translation or axial translation of trunnion extensions 213 may be controlled by an actuator. In some embodiments, ring 212 may be coupled to one or more actuators (not shown). An actuator may axially translate ring 212 or radially translate trunnion extensions 213. An actuator may be actuated manually, such as by a person adjusting a lever or twisting a grip, or an actuator may be controlled electronically, such as by a controller operating a set of instructions and communicatively coupled to an electronic servo, encoder, or hydraulic pump.

Axial translation of ring 212 distance D axially translates each trunnion extension 213 distance D to rotate trunnion 220, axle 103 and planet 108 about point A. Multiple degrees of freedom associated with coupling 215 allow ring 212 to translate axially but allow each trunnion 220, axle 103 or planet 108 to be rotated about its respective y-axis.

In operation, an actuator (controlled manually or by an electronic controller) may orient trunnions 220 to an offset angle (psi) 24 relative to pitch circle 12. Offset angle (psi) 24 may have a first sign (e.g., positive) during forward rotation and an opposite sign (e.g., negative) during reverse rotation. For embodiments such as those depicted with respect to FIGS. 2A-2J in which couplings 215 lead planets 108 in forward rotation and trail planets 108 in reverse rotation, a positive offset angle (psi) (that is, coupling 215 is translated radially inward to orient trunnions 220 to a positive offset angle (psi) 24 relative to pitch circle 12) configures CVT 200 for operation in a forward direction, and a negative offset angle (psi) 24 (that is, coupling 215 is translated radially outward to orient trunnions 220 to a negative offset angle (psi) 24 relative to pitch circle 12) configures CVT 200 for operation in a reverse direction. Offset angle (psi) 24 of trunnions 220 may be changed independently or concurrently with a change in axial translation D of couplings 215 or skew angle (zeta) 27 of axles 103.

FIGS. 2A-2J depict embodiments at 1:1, underdrive and overdrive, in forward rotation and reverse rotation. Each trunnion 220 is movably coupled to trunnion extension 213 coupled to ring 212. Ring 212 may be translated axially relative to longitudinal axis 15 a distance D to misalign axles 103 (and therefore axes of rotation 106) of planets 108. Skew angle (zeta) 27 in conjunction with axial constraint of planets 108 results in spin-induced forces causing axles 103 to tilt to tilt angle (gamma) 28. Skew angle (zeta) 27 to which axles 103 are misaligned may be determined based on an axial translation of synchronizing ring 212 relative to center plane 14 of CVT 200 as defined by the geometric centers of planets 108. In some embodiments, offset angle (psi) 24 depends on a distance that trunnion extensions 213 are translated radially outward or inward of pitch circle 12.

As depicted in FIGS. 2A-2C and 2F-2H, center plane 13 of carrier 212 is coplanar with center plane 14 of CVT 200 such that a distance D between center plane 13 of carrier 212 and center plane 14 of CVT 200 is zero. Under these conditions, skew angle (zeta) 27 applied to planets 108 is zero. As axles 103 react to unbalanced forces and tilt to an equilibrium state, tilt angle (gamma) 28 adjusts to zero, and the speed ratio of CVT 200 is 1:1 (minus any losses). As depicted in FIGS. 2A-2D, when coupling 215 is radially inward of pitch circle 12, trunnions 220 are oriented to a positive offset angle (psi) 24 and CVT 200 is configured for forward rotation 25.

Figure 2A:
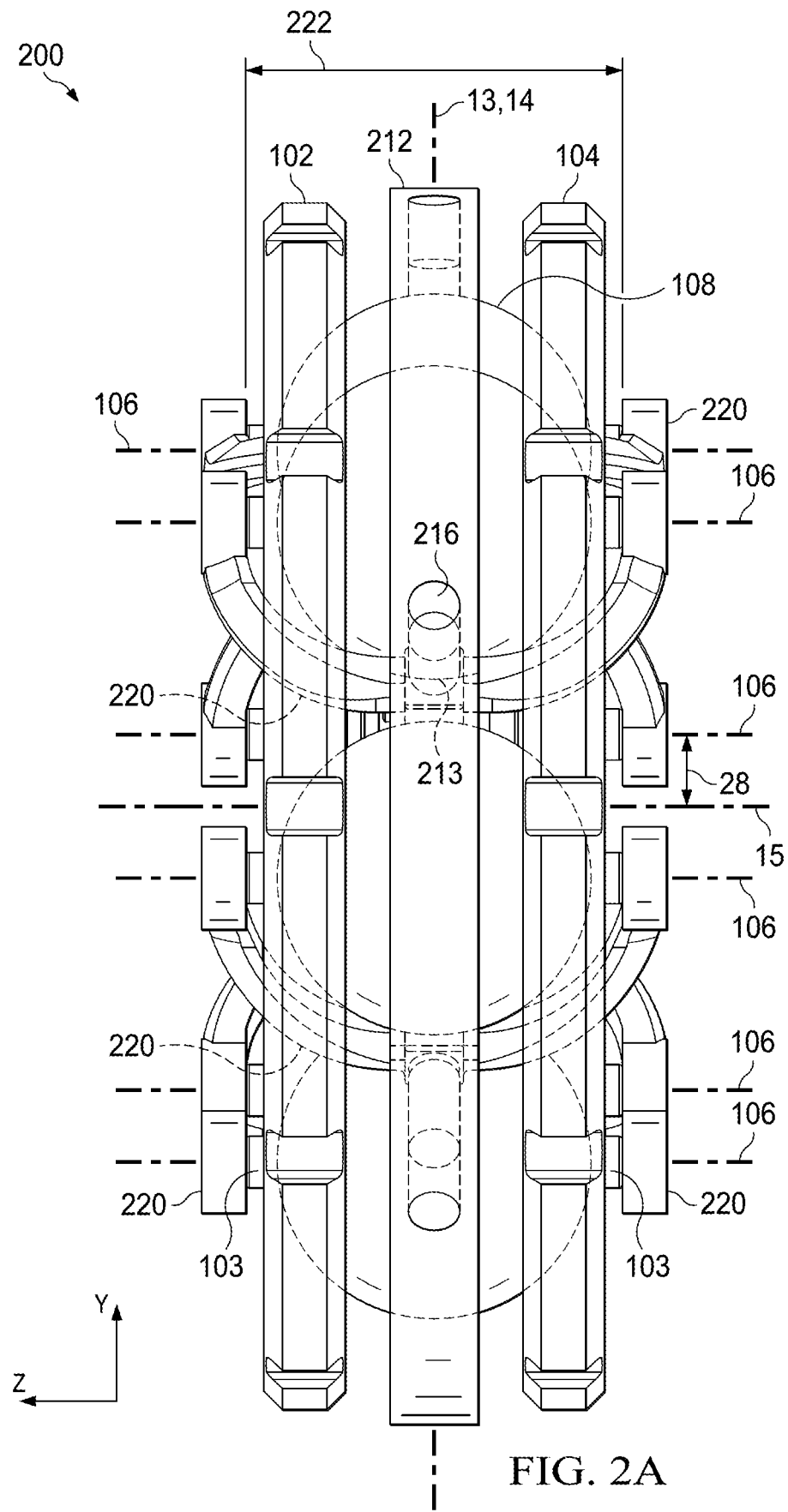
FIGS. 2A-2J depict partial perspective, side and front views of a CVT, illustrating one embodiment of a control system capable of operation in forward direction and reverse direction.
Figure 2B:
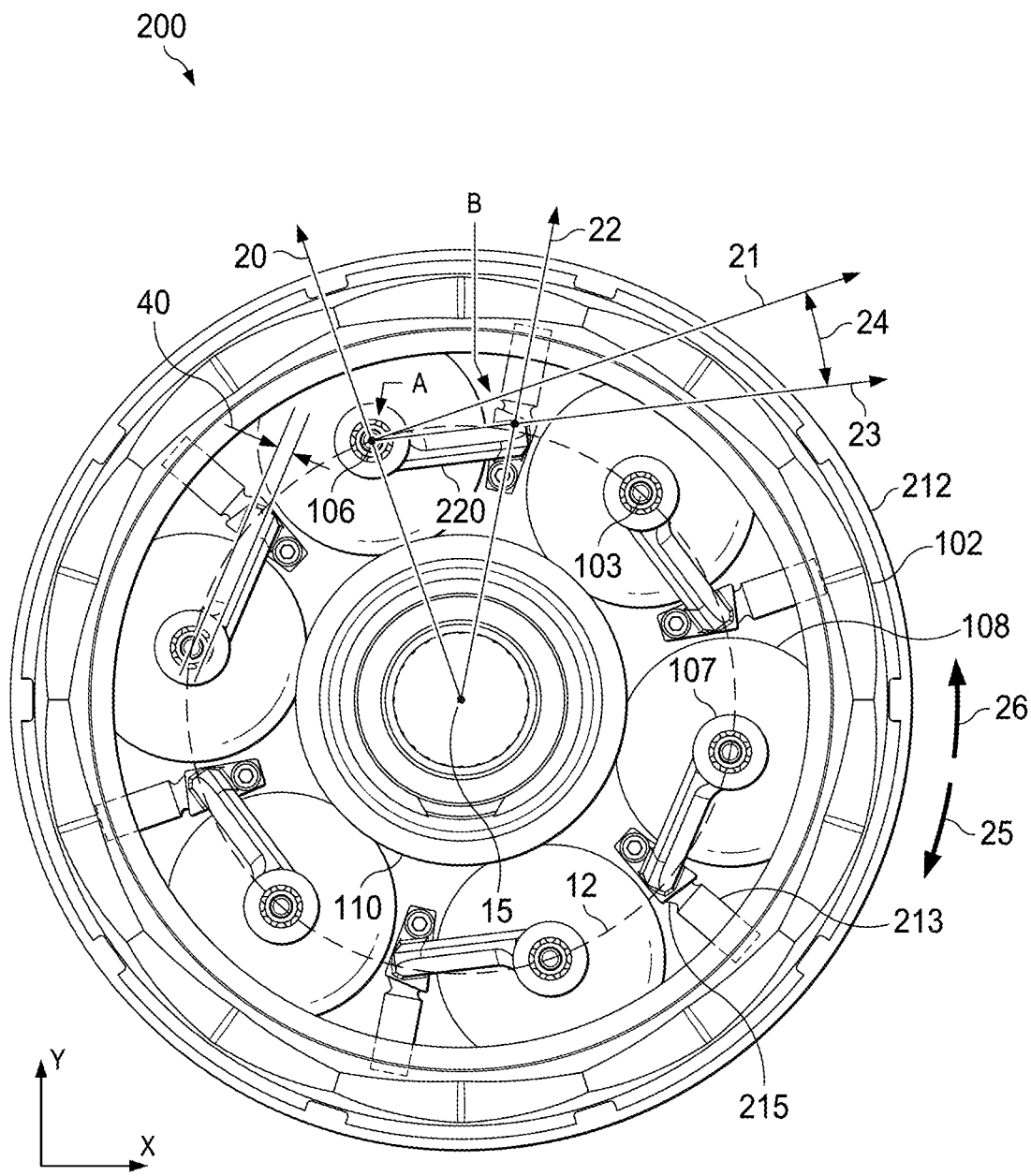
Figure 2C:
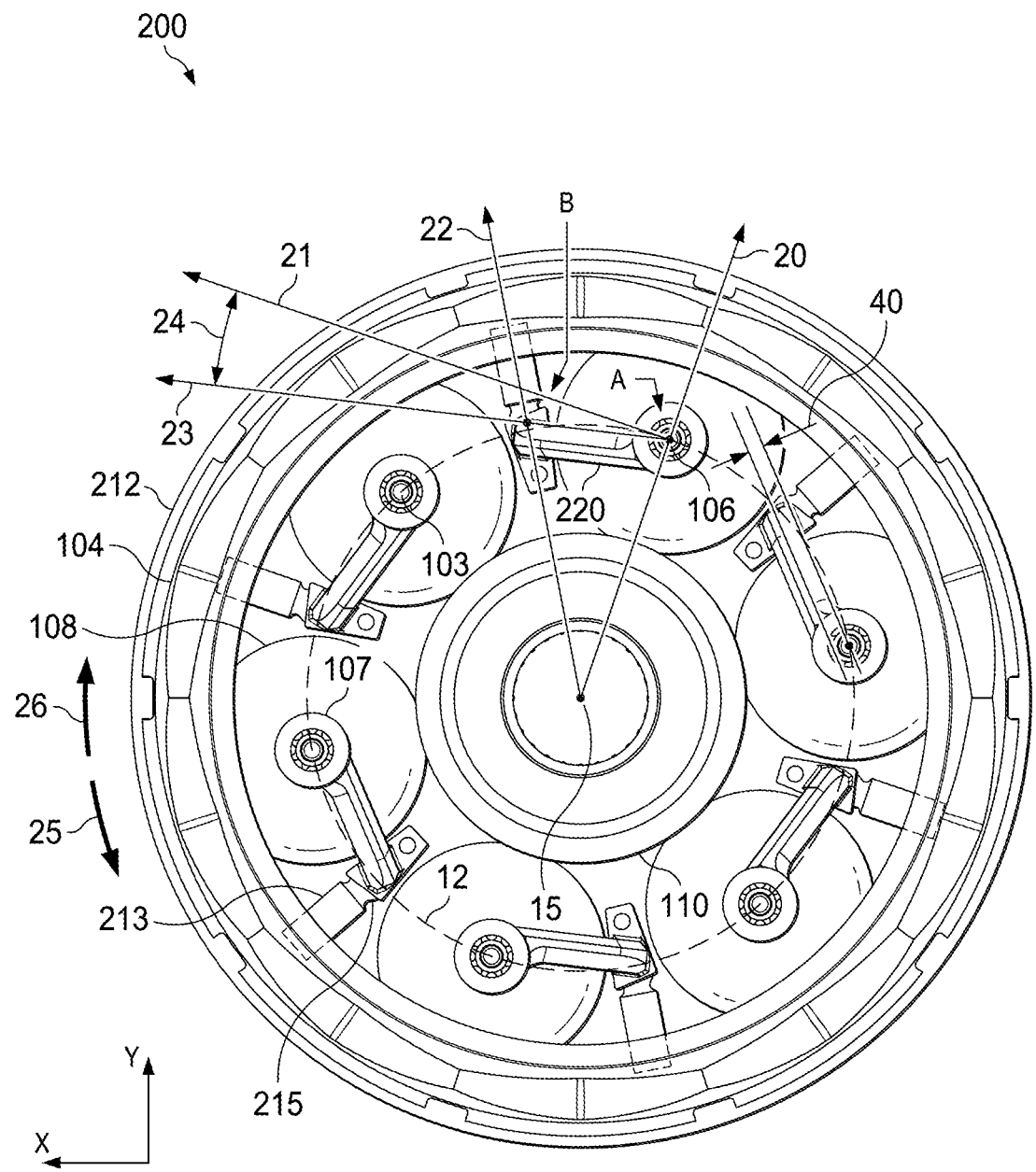
Figure 2D:
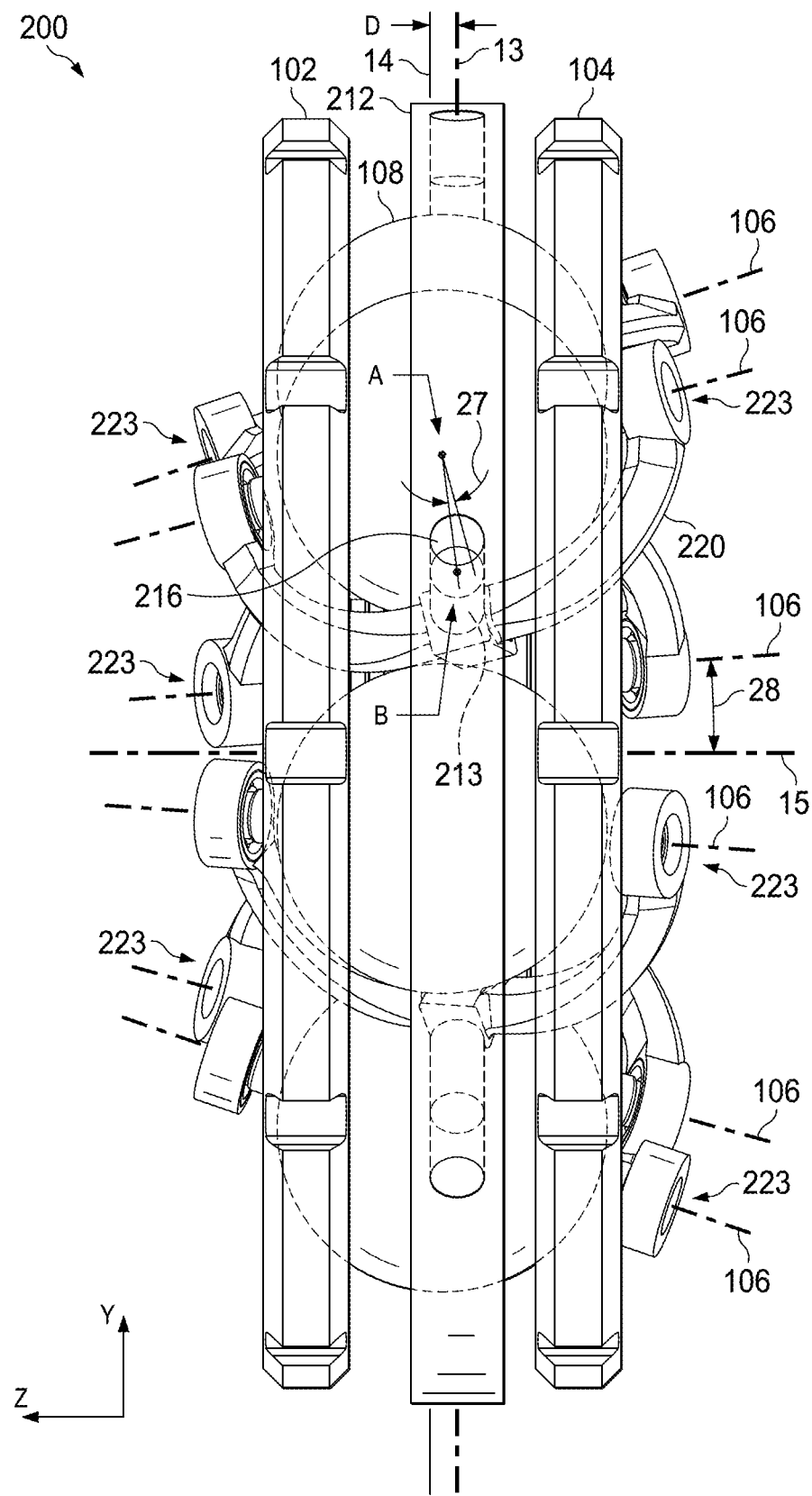

As depicted in FIG. 2D, synchronizing ring 212 may be translated distance D toward second traction ring 104 such that trunnion extension 213 and coupling 215 are translated axially toward second traction ring 104. Since planets 108 are axially constrained but capable of rotation about their respective y-axes, an axial translation of couplings 215 imparts a skew angle (zeta) 27 on axles 103, with skew angle (zeta) 27 being a function of one or more of distance D of axial translation of synchronizing ring 212, width 222 of trunnions 220, and the length of line AB. Tilt angle (gamma) 28 is a function of one or more of skew angle (zeta) 27 and offset angle (psi) 24. FIG. 2D depicts CVT 200 with a positive offset angle (psi) 24 and configured in underdrive for forward rotation 25.

Figure 2E:
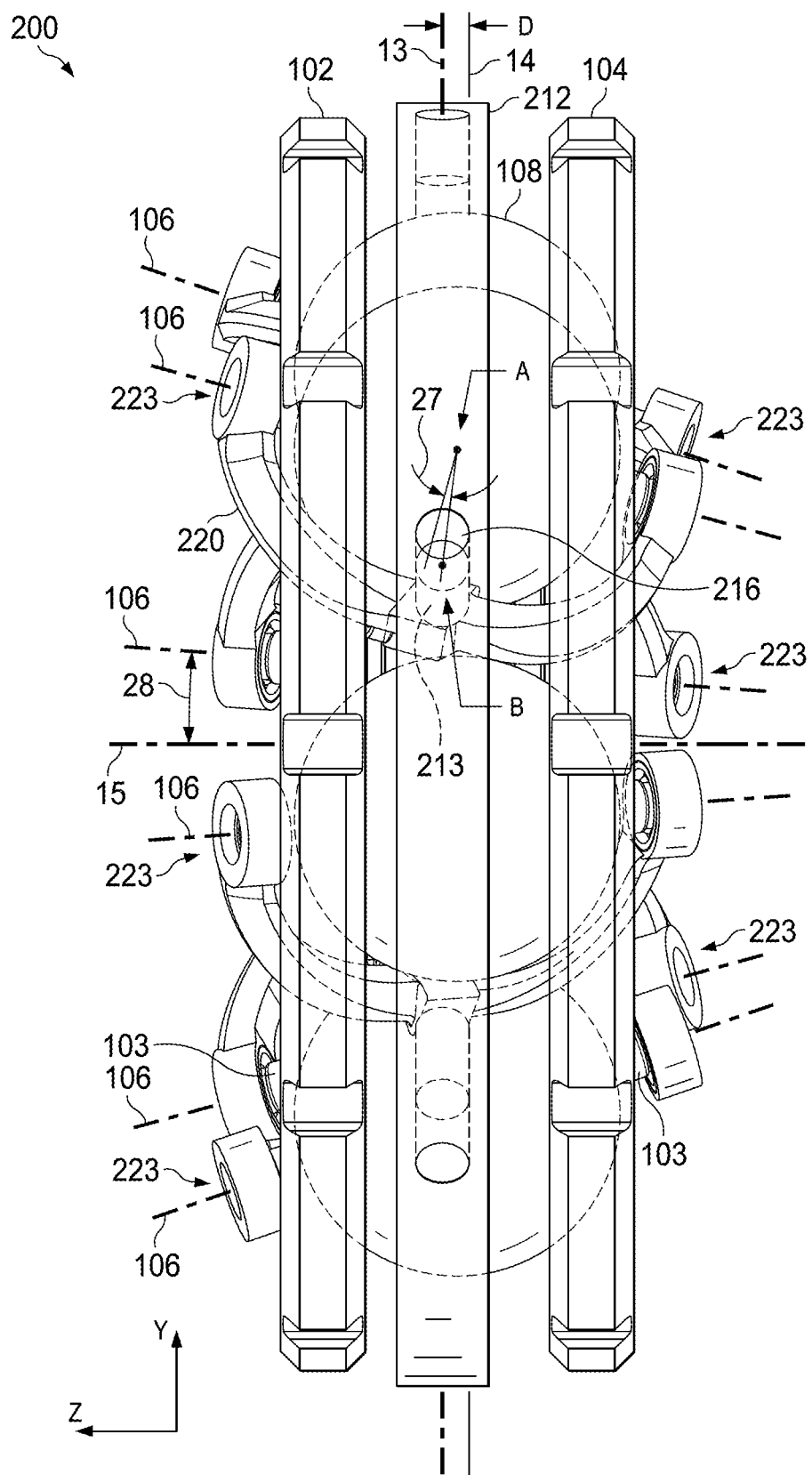

As depicted in FIG. 2E, synchronizing ring 212 may be translated axially toward first traction ring 102 such that trunnion extensions 213 and couplings 215 are translated axially toward first traction ring 102. If axles 103 are axially fixed relative to planets 108, the axial translation imparts skew angle (zeta) 27 on trunnions 220, with skew angle (zeta) 27 being a function of one or more of distance D of axial translation of trunnion extensions 215, width 222 of trunnions 220, and the length of line AB. Rotation of each planet 108 about a corresponding y-axis results in spin-induced (traction) forces on that planet 108. As these forces are exerted on planets 108, friction and other forces in CVT 200 act to return CVT 200 to a balanced state. If trunnion extension 213 is maintained axial distance D from center plane 14 of CVT 200, returning to a balanced state results in planet axles 103 (and therefore planets 108) tilting to a new tilt angle (gamma) 28 corresponding to a zero-skew condition. Embodiments described herein may continuously adjust distance D to adjust a speed ratio of CVT 200. Tilt angle (gamma) 28 is a function of one or more of skew angle (zeta) 27 and offset angle (psi) 24. FIG. 2E depicts CVT 200 with a positive offset angle (psi) 24 and configured in overdrive for forward rotation 25.

Figure 2F:
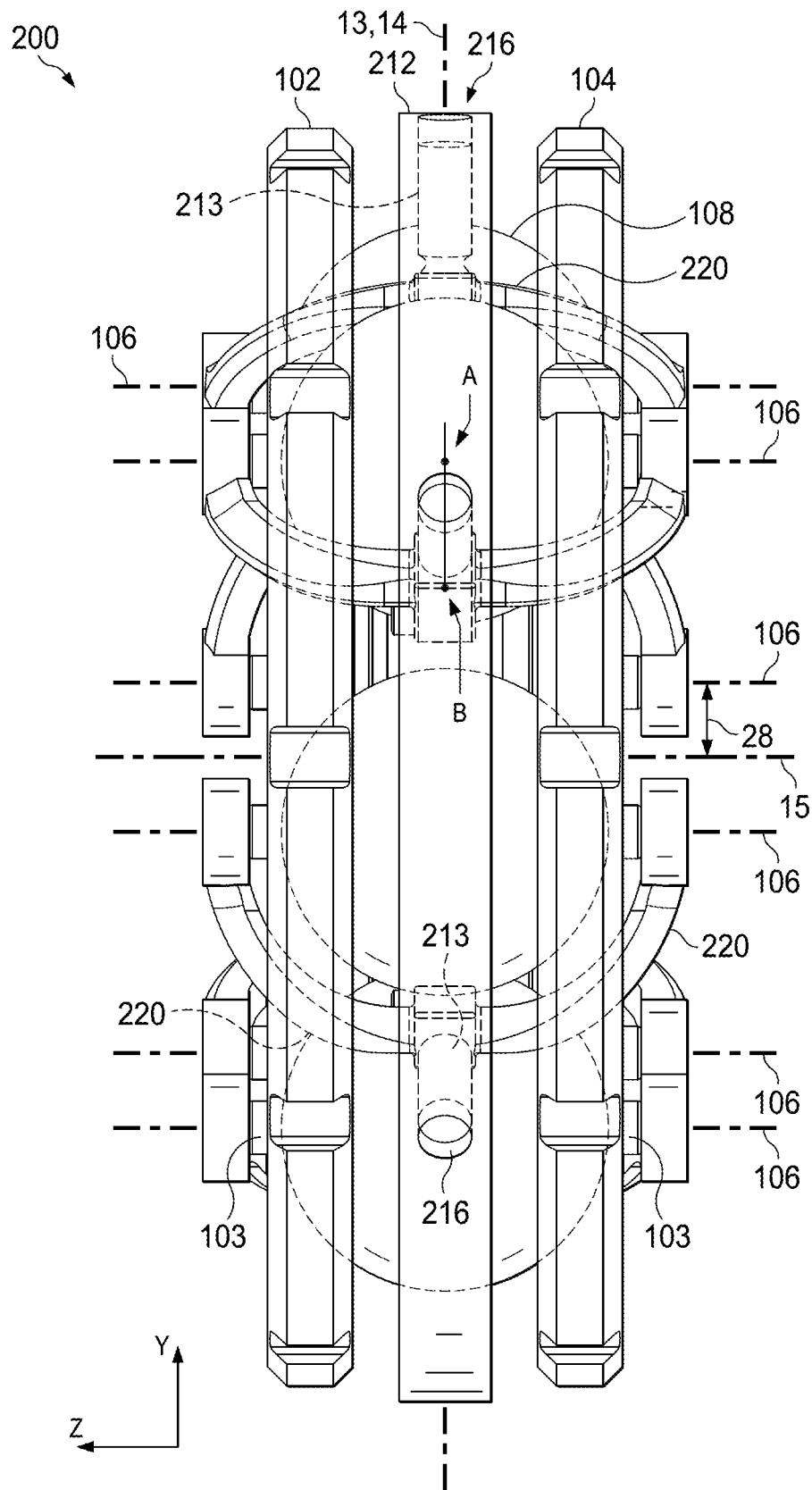
Figure 2G:
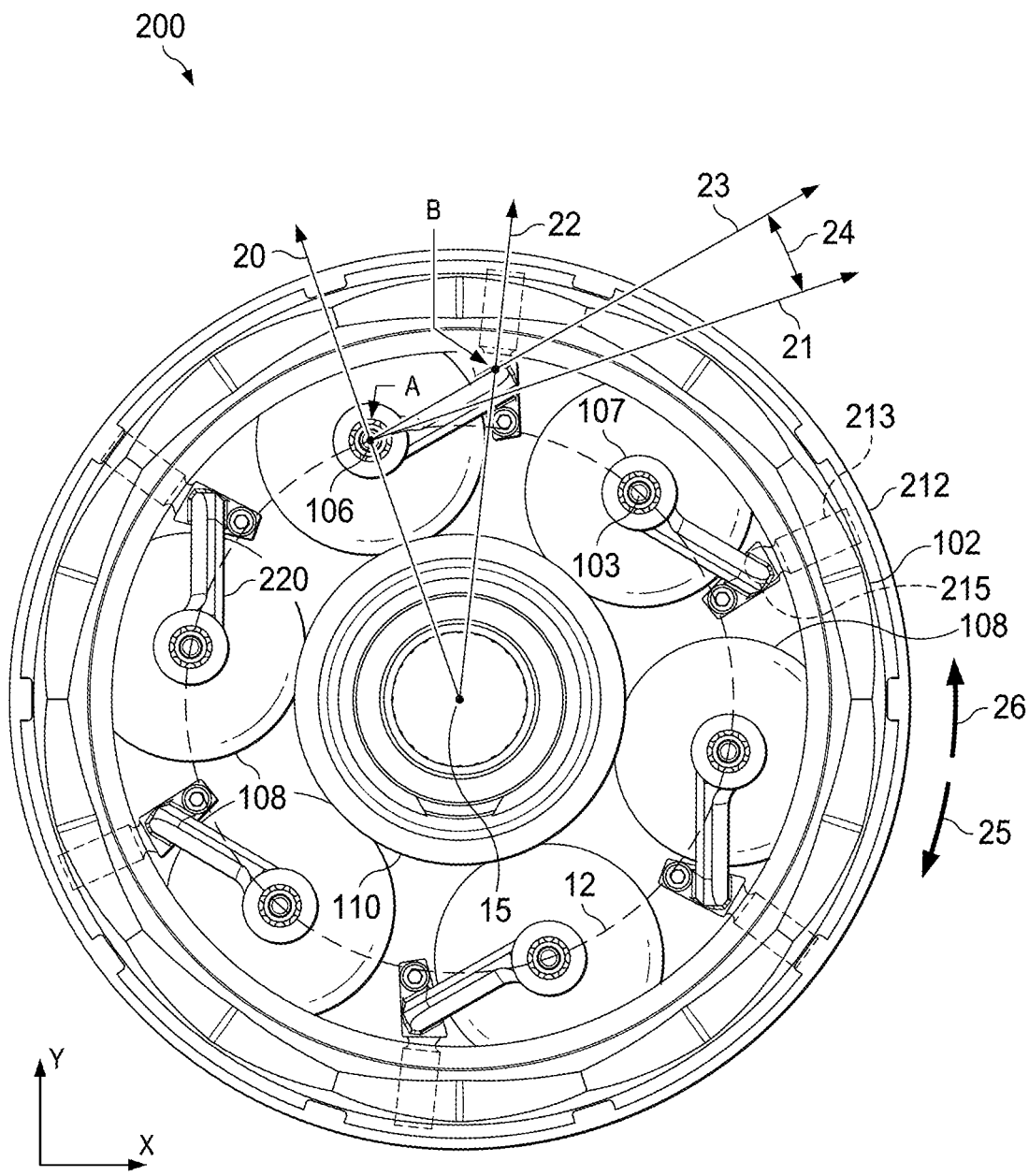
Figure 2H:
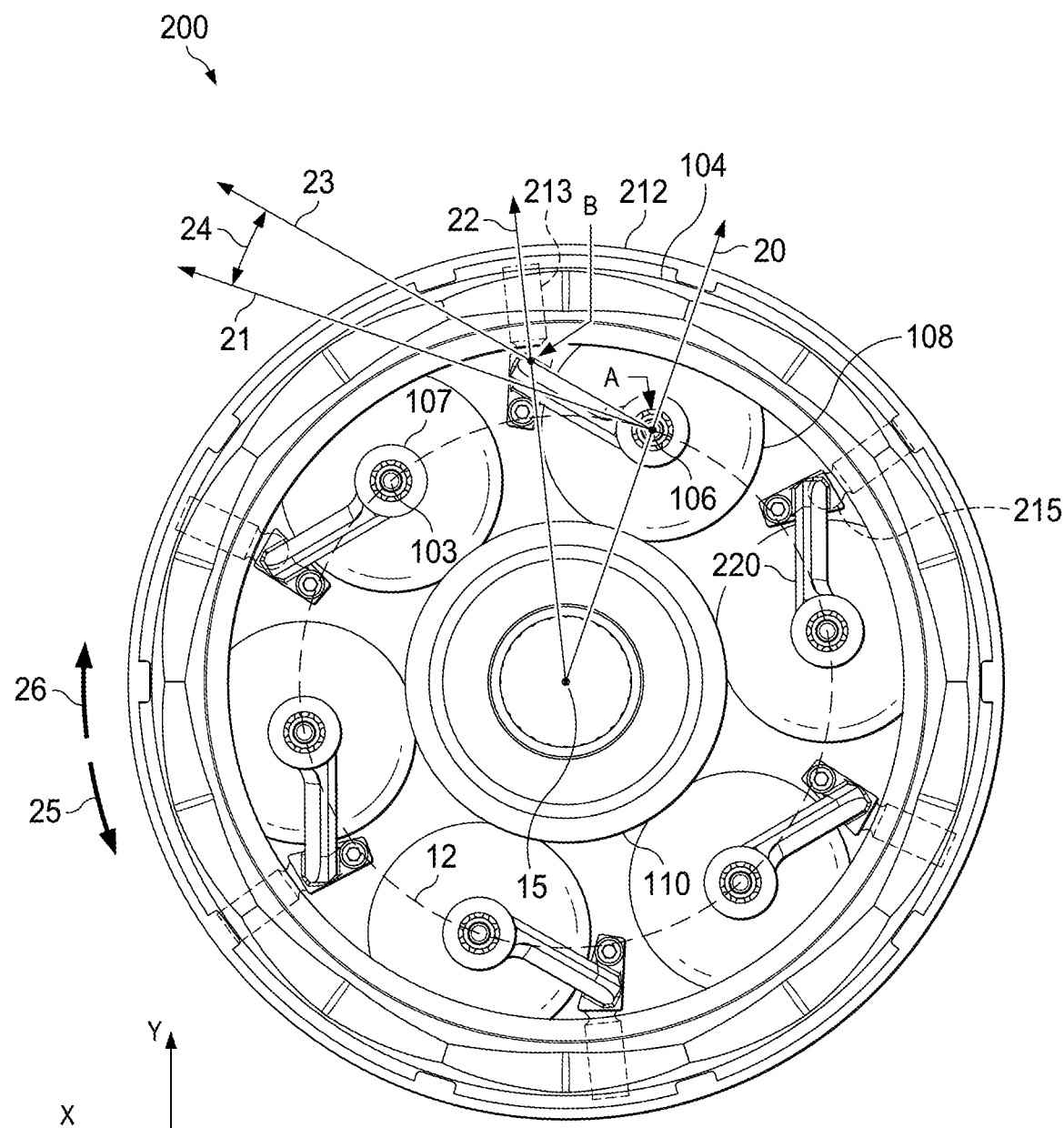

As depicted in FIGS. 2F-2H, center plane 13 of carrier 212 may be translated axially to a position that is coplanar with center plane 14 of CVT 200 such that a distance D between center plane 13 of carrier 212 and center plane 14 of CVT 200 is zero. Under these conditions, skew angle (zeta) 27 is zero, which may be characterized as having zero or minimal spin-induced forces. A lack of spin-induced forces causes planets 108 to tilt to an equilibrium position in which tilt angle (gamma) 28 is zero, and the speed ratio of CVT 200 is 1:1 (minus any losses). As depicted in FIGS. 2F-2H, when coupling 215 is radially outward of pitch circle 12 of planets 108, offset angle (psi) 24 is negative and CVT 200 is configured for reverse direction 26.

Figure 2I:
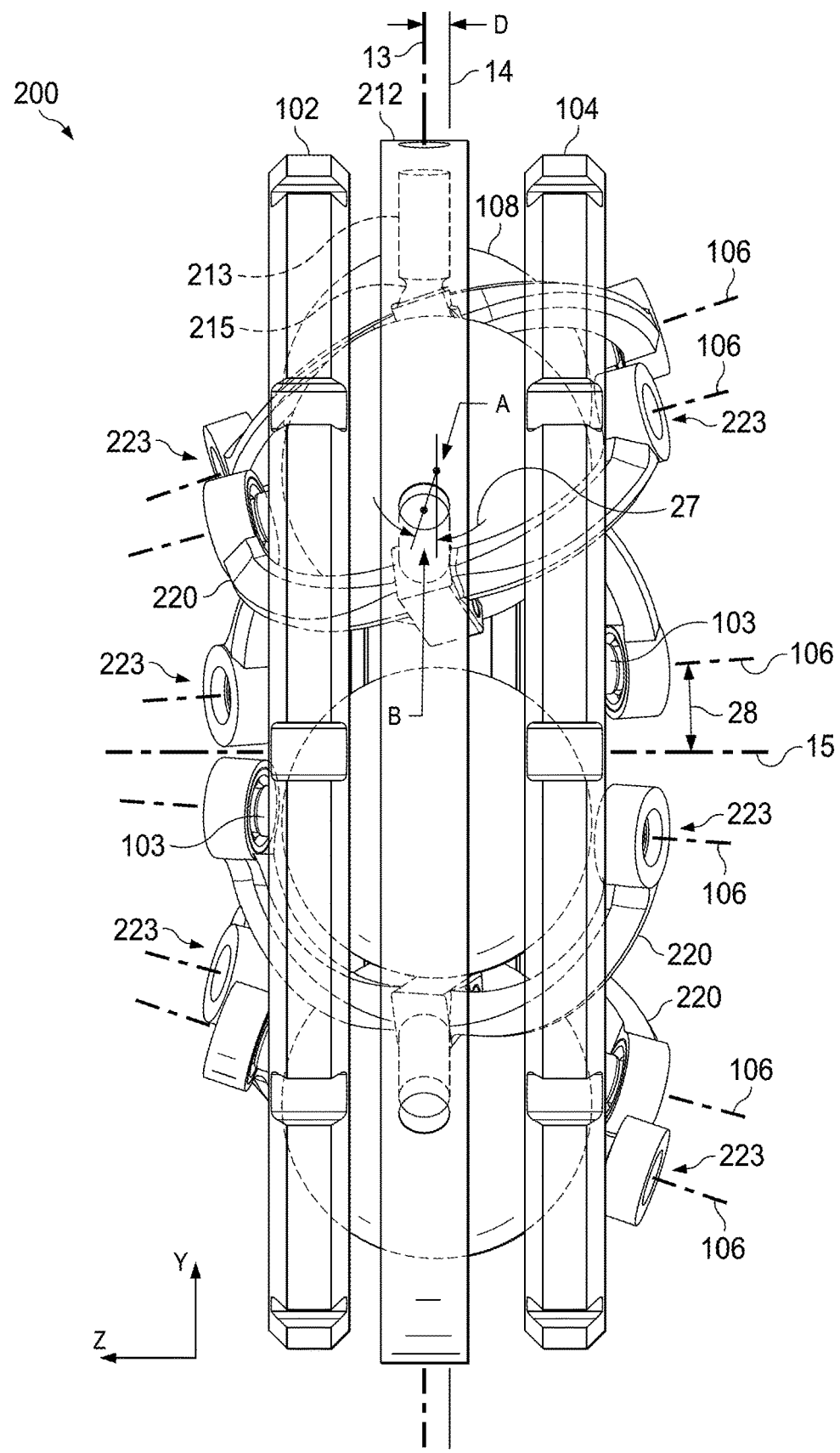
Figure 2J:
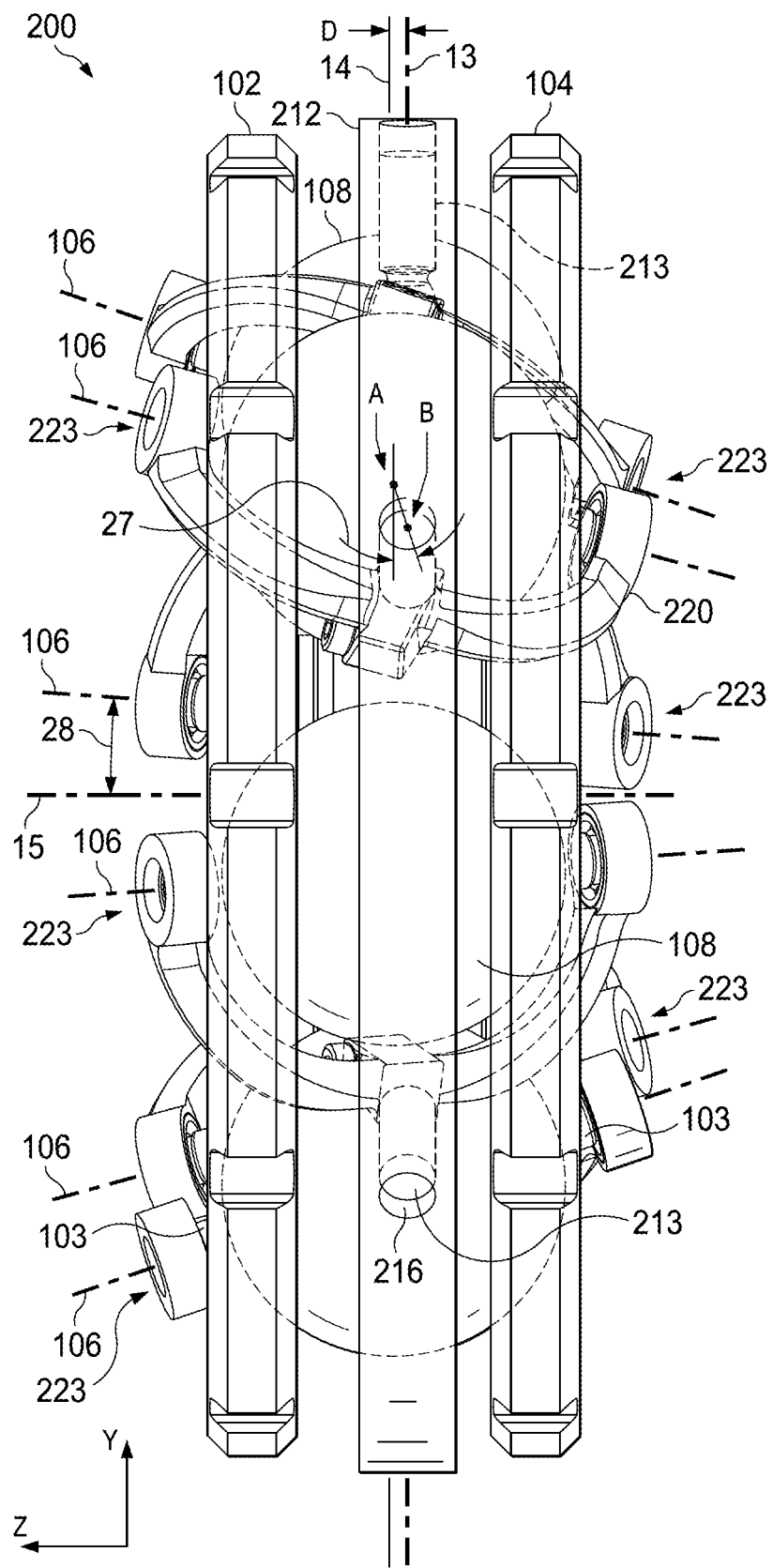

As depicted in FIG. 2J, synchronizing ring 212 may be translated distance D toward second traction ring 104 such that trunnion extension 213 and coupling 215 are translated axially toward second traction ring 104. If axles 103 are axially fixed relative to planets 108, the axial translation imparts skew angle (zeta) 27 on trunnions 220, with skew angle (zeta) 27 being a function of one or more of distance D of axial translation of trunnion extensions 215, width 222 of trunnions 220, and the length of line AB. Rotation of each planet 108 about a corresponding y-axis results in spin-induced (traction) forces on that planet 108. As these forces are exerted on planets 108, friction and other forces in CVT 200 act to return CVT 200 to a balanced state. If trunnion extensions 213 are maintained axial distance D from center plane 14 of CVT 200, returning to a balanced state results in planet axles 103 (and therefore planets 108) tilting to a new tilt angle (gamma) 28 corresponding to a zero-skew condition. Embodiments described herein may continuously adjust distance D to adjust a speed ratio of CVT 200. Tilt angle (gamma) 28 is a function of one or more of skew angle (zeta) 27 and offset angle (psi) 24. FIG. 2I depicts CVT 200 with a negative offset angle (psi) 24 and configured in overdrive for operation in reverse direction 26.

As depicted in FIG. 2J, synchronizing ring 212 may be translated axially toward first traction ring 102 such that trunnion extension 213 and coupling 215 are translated axially toward first traction ring 102. If axles 103 are axially fixed relative to planets 108, the geometric center of planets 108 may serve as control points. The axial translation rotates trunnions 220 to skew angle (zeta) 27, with skew angle (zeta) 27 being a function of one or more of distance D of axial translation of trunnion extensions 215, width 222 of trunnions 220, and the length of line AB. Rotation of each planet 108 about a corresponding y-axis results in spin-induced (traction) forces on that planet 108. As these forces are exerted on planets 108, friction and other forces in CVT 200 act to return CVT 200 to a balanced state. If trunnion extensions 213 are maintained axial distance D from center plane 14 of CVT 200, returning to a balanced state results in planet axles 103 (and therefore planets 108) tilting to a new tilt angle (gamma) 28 corresponding to a zero-skew condition. Embodiments described herein may continuously adjust distance D to adjust a speed ratio of CVT 200. Tilt angle (gamma) 28 is a function of one or more of skew angle (zeta) 27 and offset angle (psi) 24. FIG. 2I depicts CVT 200 with a negative offset angle (psi) 24 and configured in underdrive for operation in reverse rotation 26.

Offset angle (psi) 24 may be adjusted to any angle within a range of positive and negative angles. In some embodiments, a range of offset angle (psi) 24 may be selected to allow operation of CVT 200 in forward or reverse direction and capable of operating according to different control schemes. Persons skilled in the art will appreciate that rotation of trunnions 220 to new offset angles (psi) 24 results in one or more of the following states:

for increased offset angle (psi) 24, CVT 200 becomes more stable but sensitivity is decreased, resulting in adjusting speed ratios taking more time or adjusting at a slower rate;

for offset angles (psi) that approach zero, the speed at which speed ratios may be adjusted may be faster, but the stability of CVT 200 is diminished.

For example, a range may include larger angles (for example, but not limited to, up to +15 degrees) to allow CVT 200 to use a control scheme for stable operation during forward rotation or for increased sensitivity, and may include larger angles (for example, but not limited to, up to −15 degrees) to also allow CVT 200 to use a control scheme for stable operation or for increased sensitivity during operation in reverse direction 26. In other embodiments, a range may include larger angles (for example, but not limited to, up to +15 degrees) to allow CVT 200 to use a control scheme for stable operation during forward rotation or for increased sensitivity, but may include smaller angles (for example, but not limited to, up to −5 degrees) to allow CVT 200 to use a control scheme for increased sensitivity during operation in reverse direction 26.

Adjustment of CVT 200 may involve changing the sign of offset angle (psi) 24. In some embodiments, radial translation of couplings 215 from a position radially outward of pitch circle 12 of planets 108 to a position radially inward of pitch circle 12 of planets 108 (or vice versa) changes the sign of offset angle (psi) 24 from positive to negative or negative to positive, respectively. As depicted in FIGS. 2E-2H, when couplings 215 are radially outward of pitch circle 12 of planets 108, offset angle (psi) 24 is negative, and CVT 200 is configured for operation in reverse direction 26.

Embodiments may change skew angle (zeta) 27 to accommodate changes in offset angle (psi) 24. For example, if CVT 200 is operating in forward direction 25 in underdrive and CVT 200 needs to be operating in reverse direction 26 in underdrive, embodiments may configure CVT 200 by changing offset angle (psi) 24 from a first sign (e.g., positive) to a second sign (e.g., negative) and axially translating couplings 215 from a first side of center plane 14 of CVT 200 to a second side of center plane 14 of CVT 200 opposite the first side.

As described in relation to FIGS. 2A-2J, adjusting a CVT may include axial constraint between a planet and a trunnion and adjustment may be accomplished by axial translation of a trunnion extension. Variations are possible. For example, in some embodiments, couplings 215 may be fixed axially and adjustment of CVT 200 may be accomplished by axial translation of axles 103 relative to planets 108. In these embodiments, bearings 107, axles 103, or planets 108 may allow for axial translation of planets 108 relative to axles 103. In some embodiments, an actuator may be coupled to a torus plate, a control disc, spider arms, or other synchronizer (not shown) coupled to axles 103 or trunnions 220. The actuator may translate the synchronizer to impart an axial translation of axles 103 relative to planets 108. Axial translation of axles 103 relative to planets 108 while restricting axial movement of coupling 215 will impart a non-zero skew angle (zeta) 24 on planets 108, adjusting axles 103 to a target tilt angle (gamma) 28 such that CVT 200 operates at a target speed ratio. In some embodiments, a synchronizer may comprise a single control disc coupled to one end of axles 103. In other embodiments, a synchronizer may comprise a first control disc coupled to a first end of axles 103 and a second control disc coupled to a second end of axles 103. The pair of control discs may be coupled such that axial translation of one control disc equals axial translation of the second control disc.

Embodiments disclosed herein may refer to a CVT with a control system capable of controlling a tilt angle using two carrier halves coupled to links. In these embodiments, one or both carrier halves are rotatable independently or collectively to an angular position (beta) to impart a skew angle (zeta) on planet axles to adjust a tilt angle (gamma) for a plurality of planets coupled to the planet axles. Furthermore, to enable forward and reverse rotation, the control system may control an offset angle (psi) of the links) for operation in forward direction and reverse directions or for a selected sensitivity.

FIGS. 3A-3J depict CVT 300 in which two carrier halves 310A, 310B may be rotated relative to each other to angular position (beta) 29, imparting a non-zero skew angle (zeta) 27 on axles 103 to cause axles 103 to adjust a speed ratio of CVT 300. A non-zero skew angle (zeta) 27 causes a non-zero skew condition, and spin-induced (traction) forces generated by the geometry and configuration of CVT 300 adjusts a tilt angle (gamma) 28 of axles 103. During forward rotation, links 321 may be rotated about axes of rotation 106 (coaxial with the z-axes of axles 103) to a positive offset angle (psi) as depicted in FIGS. 3A-3E, and during reverse rotation, links 321 may be rotated about axes of rotation 106 to a negative offset angle (psi) as depicted in FIGS. 3F-3J.

Links 321 comprise a first end coupled to axles 103 and a second end coupled to pins 312. Pins 312 may translate along slots 313 in carrier arms 311A on carrier half 310A and pins 312 may translate along slots 313 in carrier arms 311B on carrier half 310B. Pins 312 may be located at a first radial position in slots 313 in carrier arms 311A and pins 312 may be located at a second radial position in slots 313 in carrier arms 311B. Thus, a first offset angle (psi) 24A on a first side of CVT 300 and a second offset angle (psi) 24B on a second side of CVT 300 may be, but are not required to be, the same angle, or even the same sign. The difference between first offset angle (psi) 24A and second offset angle (psi) 24B is the effective offset angle (psi) 24 for CVT 300. Assuming a positive effective offset angle (psi) 24 is more stable for operation in a forward direction, CVT 300 may be configured for operation in a forward direction with each of first offset angle (psi) 24A and second offset angle (psi) 24B having any angle such that effective offset angle (psi) 24 is positive, including combinations in which first offset angle (psi) 24A and second offset angle (psi) 24B are both positive, first offset angle (psi) 24A is negative and second offset angle (psi) 24B is positive and larger in magnitude than first offset angle 24A, or first offset angle (psi) 24A is positive and second offset angle (psi) 24B is negative but first offset angle 24A is larger in magnitude than second offset angle 24B. Similarly assuming a negative effective offset angle (psi) 24 is more stable for operation in reverse direction 26, CVT 300 may be configured for operation in reverse direction 26 with each of first offset angle (psi) 24A and second offset angle (psi) 24B having any angle such that effective offset angle (psi) 24 is negative, including combinations in which first offset angle (psi) 24A and second offset angle (psi) 24B are both negative, first offset angle (psi) 24A is positive and second offset angle (psi) 24B is negative and greater in magnitude than first offset angle (psi) 24A or first offset angle (psi) 24A is negative and second offset angle (psi) 24B is positive but first offset angle (psi) 24A is greater in magnitude than second offset angle 24B.

Embodiments disclosed herein may be controlled or configured such that only carrier half 310A is rotated, only carrier half 310B is rotated, or both carrier 310A and 310B are rotated to angular position (beta) 29.

If the effective offset angle (psi) 24 is negative but needs to be positive, a controller may determine which offset angle (psi) 24A or 24B is positive and which offset angle (psi) is negative, and changing one or both offset angles (psi) to be positive or changing one offset angle (psi) 24A or 24B to a positive angle such that the effective offset angle (psi) 24 changes from negative to positive. Furthermore, in embodiments depicted in FIGS. 3A-3J, both links 321 are oriented in the same direction (i.e., both trailing planets 108). However, embodiments may also be configured with one link 321 oriented in a forward direction and the other link 321 oriented in a reverse direction. In these configurations, control of CVT 300 results in one link 321 being in tension and the other link 321 being in compression. Control of CVT 300 may involve only adjusting one link 321 of a pair of links.

FIGS. 3A-3J depict side and front partial views of CVT 300, illustrating carrier 310 formed with carrier halves 310A, 310B rotatable about longitudinal axis 15 to angular position (beta) 29 for imparting a skew angle (zeta) 27 on axles 103 to cause an adjustment of a tilt angle of axles 103 and therefore adjust to a target speed ratio of CVT 300 in, underdrive, overdrive configurations and 1:1 ratio, and in forward and reverse configurations.

As depicted in FIGS. 3A-3J, CVT 300 may be configured with links 321 trailing planets 108. However, variations are possible, including embodiments in which links 321 are leading planets and embodiments in which one link 321 is leading and the other link 321 is trailing. Embodiments in which one link 321 is leading and the other link 321 is trailing may avoid situations in which links 321 buckle or bind due to two forces being applied in the same general direction.

CVT 300 comprises planets 108 located between and in contact with traction rings 102, 104 and sun 110. Each planet 108 has a geometric center, with an x-axis, y-axis and z-axis intersecting at a geometric center of planet 108. The geometric centers collectively define pitch circle 12 for the plurality of planets 108. Planets 108 are rotatably coupled to axles 103. Tilting axles 103 to a non-zero tilt angle (gamma) causes contact points between planets 108 and traction rings 102, 104 to change, thereby adjusting a speed ratio of CVT 300.

Axles 103 are rotatably coupled to planets 108 to allow planets 108 to rotate about axes of rotation 106 defined by axles 103. Bearings 107 allow rotation of planets 108 about axles 103. In some embodiments, bearings 107 allow planets 108 to rotate about axles 103 but constrain planets 108 from movement along axles 103.

Links 321 are coupled to axles 103 on either side of planets 108. As depicted in FIGS. 3A-3J, links 321 are coupled to carrier arms 311A, 311B of carrier halves 310A, 310B. Couplings 312 between links 321 and carrier arms 311A, 311B allows for adjustment of offset angle (psi) 24A, 24B of links 321 about axes of rotation 106 when carrier halves 310A, 310B rotate. Couplings 312 between links 321 and carrier arms 311A, 311B may comprise pin 312 movable in slot 313 (as depicted) or some other coupling. Links 321, couplings 312, or carrier arms 311A, 311B may be configured to allow axles 103 to be adjusted in any direction while maintaining planets 108 centered between traction rings 102, 104. In some embodiments, couplings 312 comprise pins formed with arcuate surfaces. In some embodiments, links 321 may be formed as resilient members capable of deflection. In some embodiments, carrier arms 311A, 311B may be formed such that couplings 312 or links 321 are capable of some axial movement. Combinations of these embodiments and other embodiments are possible.

In operation, links 321 may be rotated about axes of rotation 106 to offset angle (psi) 24 and one or more of carrier halves 310A, 310B may be rotated relative to each other to angular position (beta) 29 to impart skew angle (zeta) 27.

Figure 3A:
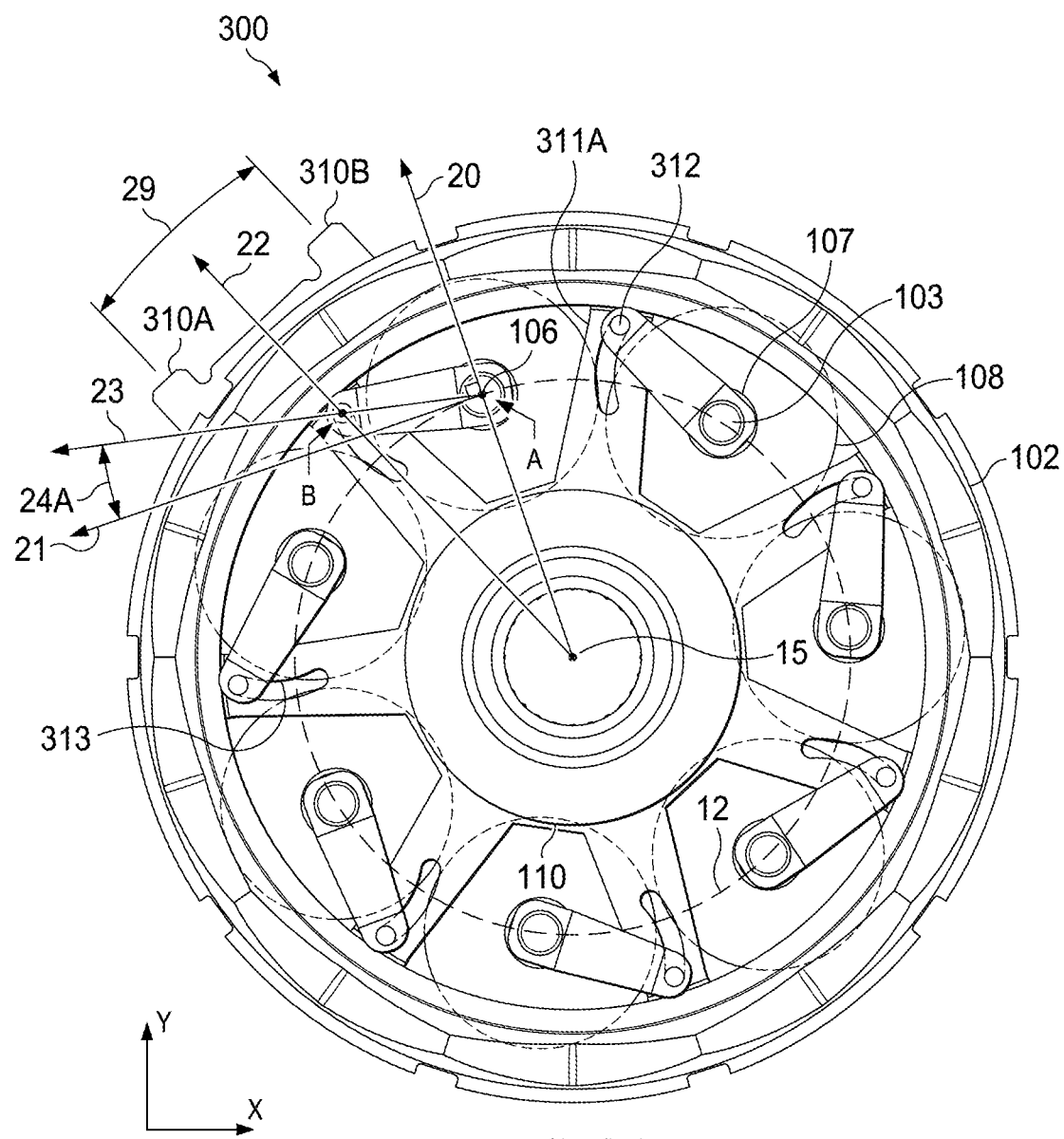
FIGS. 3A-3J depict front partial views of a CVT, illustrating one embodiment of a control system capable of operation in forward direction and reverse direction.
Figure 3B:
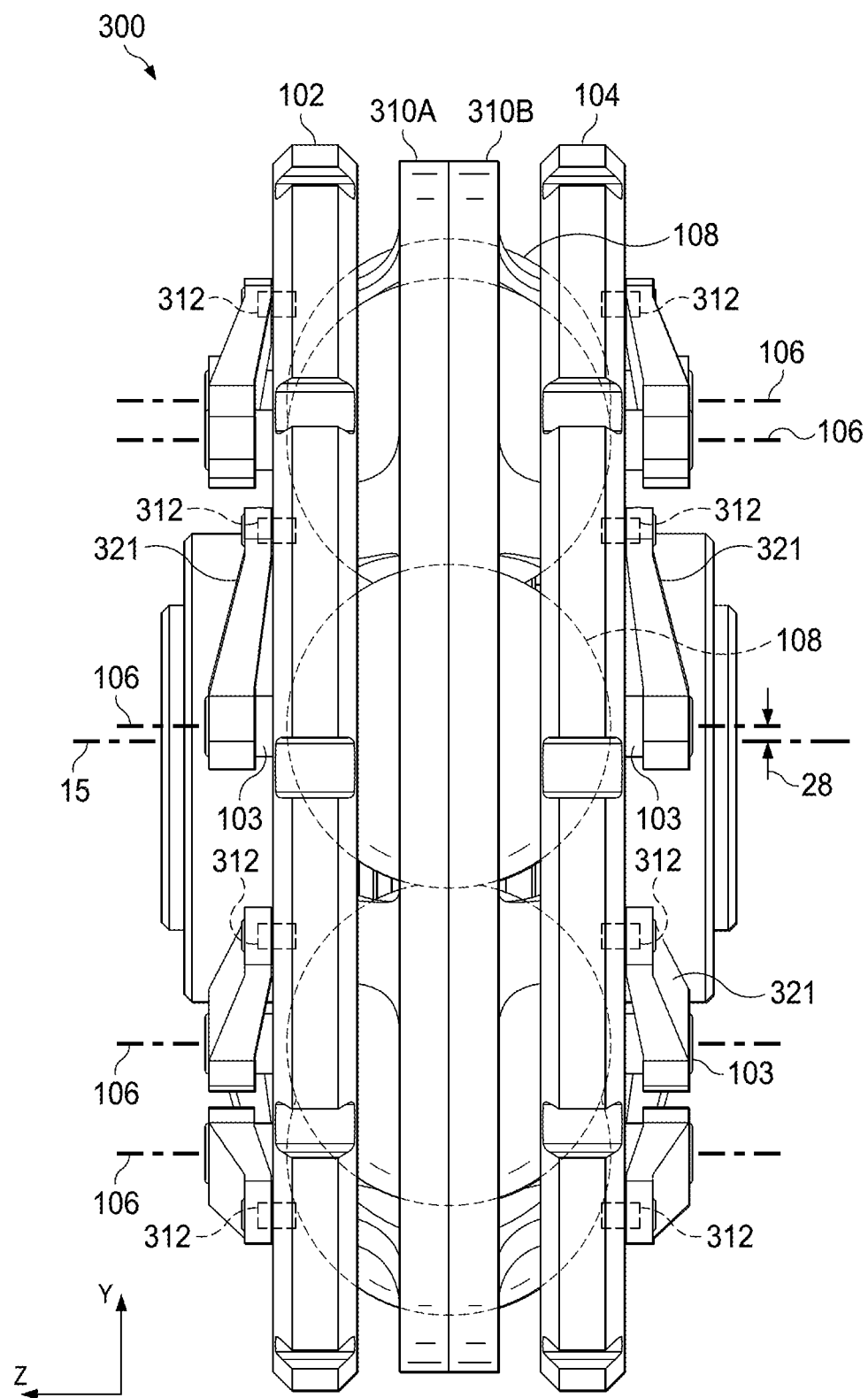
Figure 3C:
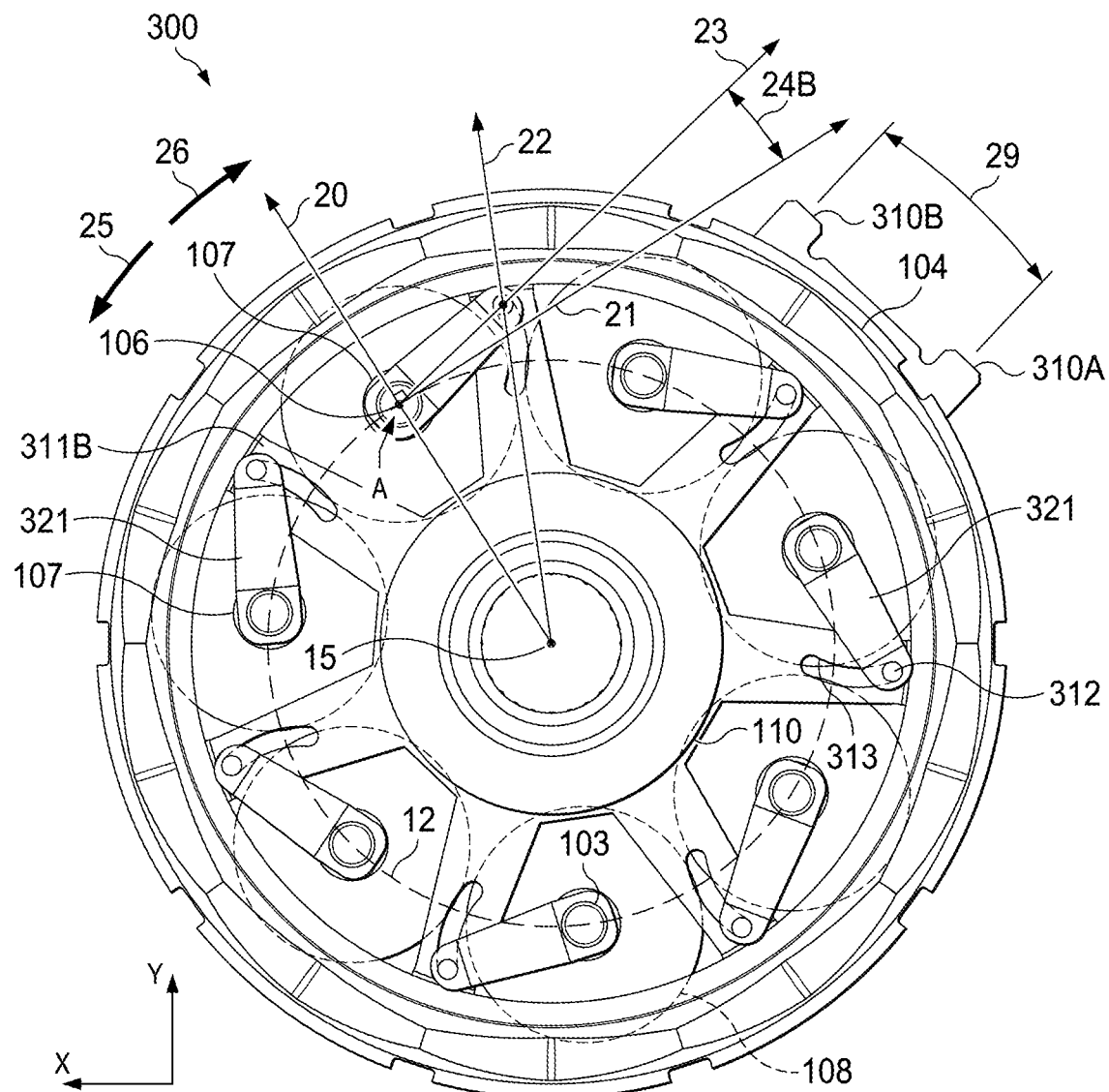

FIGS. 3A-3C depict CVT 300 with links 321 coupled to carrier arms 311A, 311B, wherein links 321 coupled to carrier arms 311A are configured at first offset angle (psi) 24A and links 321 coupled to carrier arms 311B are configured at second offset angle (psi) 24B for forward rotation. Carrier halves 310A, 310B are rotated relative to each other to angular position (beta) 29. As depicted in FIGS. 3A-3C, carriers 310A, 310B may be rotated relative to each other such that an angular position (beta) 29 is zero. Skew angle (zeta) 27 applied to axles 103 is zero, tilt angle (gamma) is zero, and power output on one side of CVT 300 equals power input on the opposite side (minus any losses).

Figure 3D:
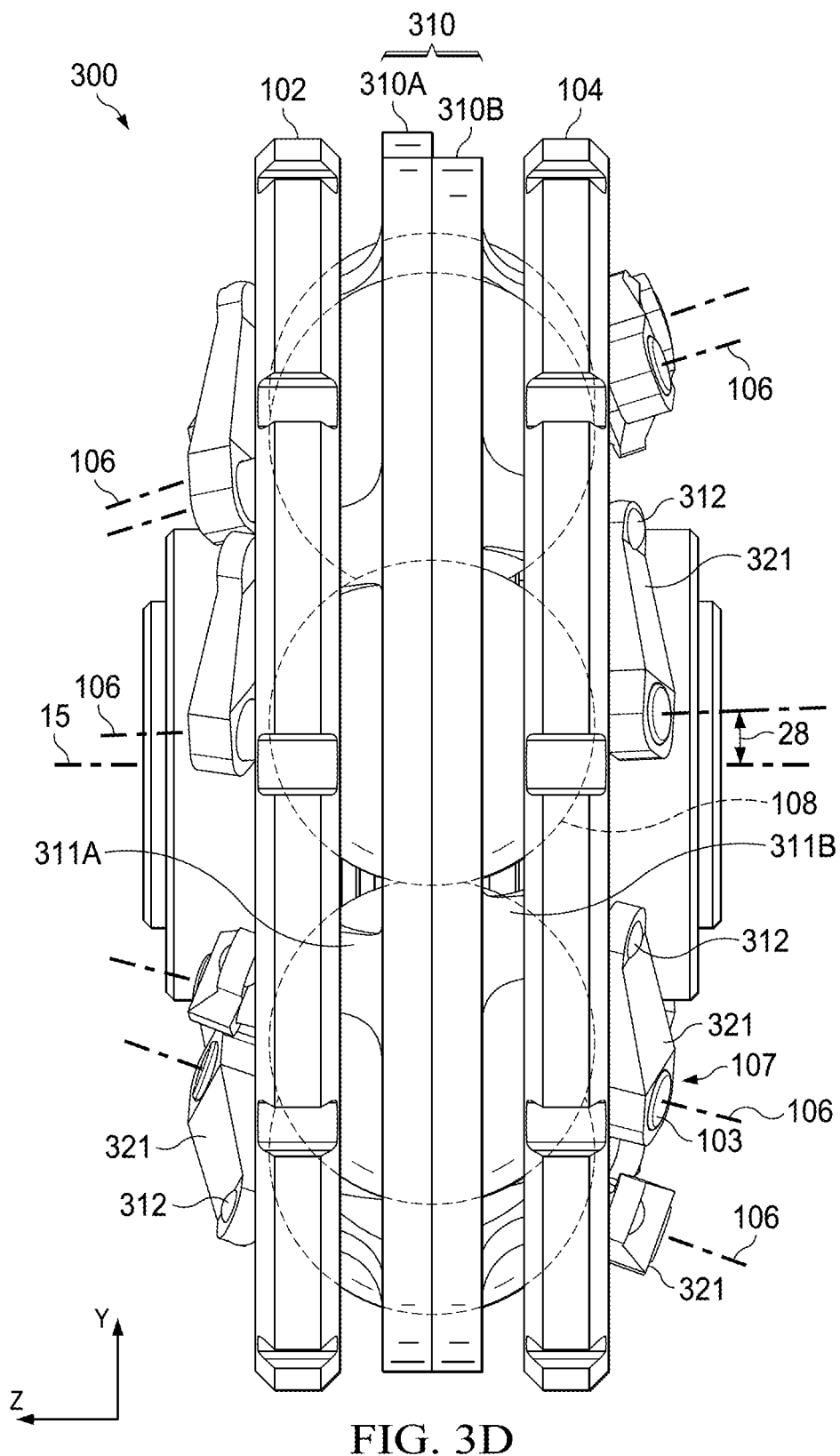

FIG. 3D depicts a partial cutaway view of one embodiment of CVT 300 with pins 312 radially positioned in slots 313 of carrier arms 311A, 311B. Links 321 coupled to carrier arms 311A may be configured at first offset angle (psi) 24A and links 321 coupled to carrier arms 311B are configured at second offset angle 24B, whereby CVT 300 has an effective offset angle (psi) 24 for forward rotation. Carrier halves 310A, 310B may be rotated relative to each other to angular position (beta) 29. For each non-zero angular position, axles 103 (and therefore axes of rotation 106) are misaligned from a longitudinal axis of CVT 300, imparting a non-zero skew angle (zeta) 27. Rotation of each planet 108 about a corresponding y-axis results in spin-induced (traction) forces on that planet 108. As these forces are exerted on planets 108, friction and other forces in CVT 300 act to return CVT 300 to a balanced state, causing axles 103 to tilt to non-zero tilt angle (gamma) 28, resulting in CVT 300 operating in underdrive in forward rotation 25.

Figure 3E:
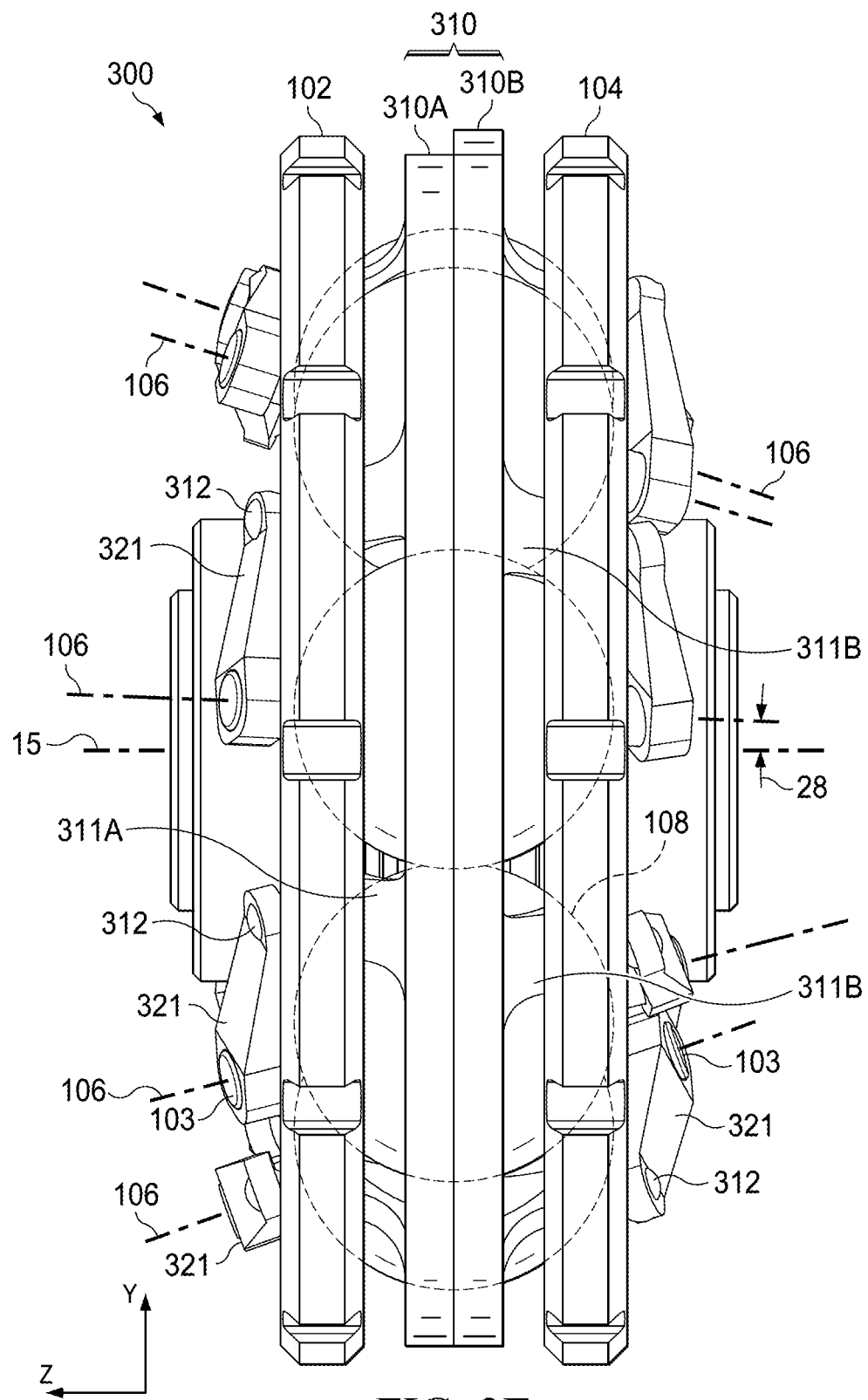

FIG. 3E depicts a partial cutaway view of one embodiment of CVT 300 with pins 312 radially positioned in slots 313 of carrier arms 311A, 311B. Links 321 coupled to carrier arms 311A are configured at first offset angle (psi) 24A and links 321 coupled to carrier arms 311B are configured at second offset angle 24B, whereby CVT 300 has an effective offset angle (psi) 24 for forward rotation. To adjust speed ratio, carrier halves 310A, 310B may be rotated relative to each other to angular position (beta) 29. For each non-zero angular position, axles 103 (and therefore axes of rotation 106) are misaligned from a longitudinal axis of CVT 300, imparting a non-zero skew angle (zeta) 27. Rotation of each planet 108 about a corresponding y-axis results in spin-induced (traction) forces on that planet 108. As these forces are exerted on planets 108, friction and other forces in CVT 300 act to return CVT 300 to a balanced state, causing axles 103 to tilt to non-zero tilt angle (gamma) 28, resulting in CVT 300 operating in overdrive in forward rotation 25.

Figure 3F:
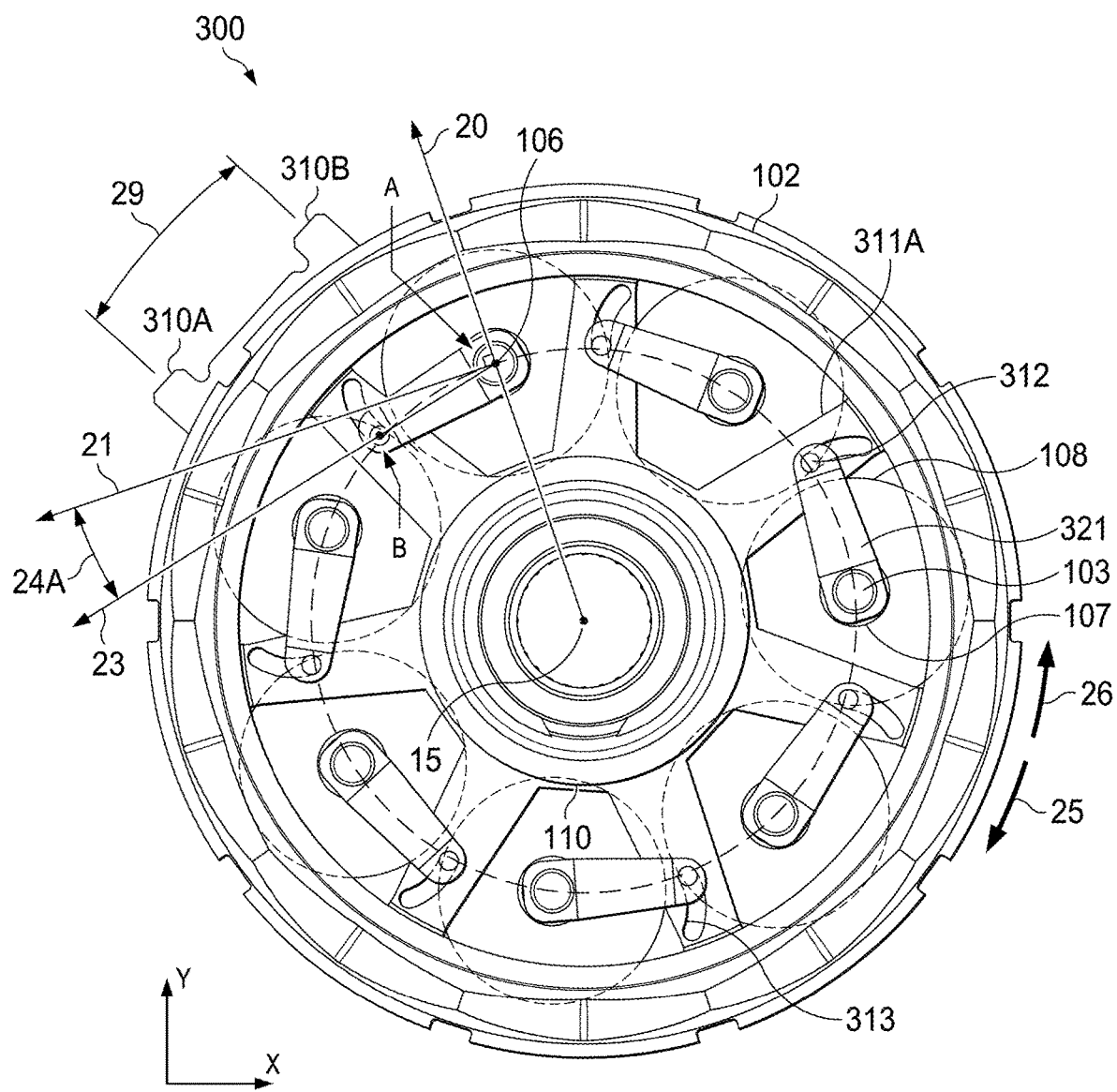
Figure 3G:
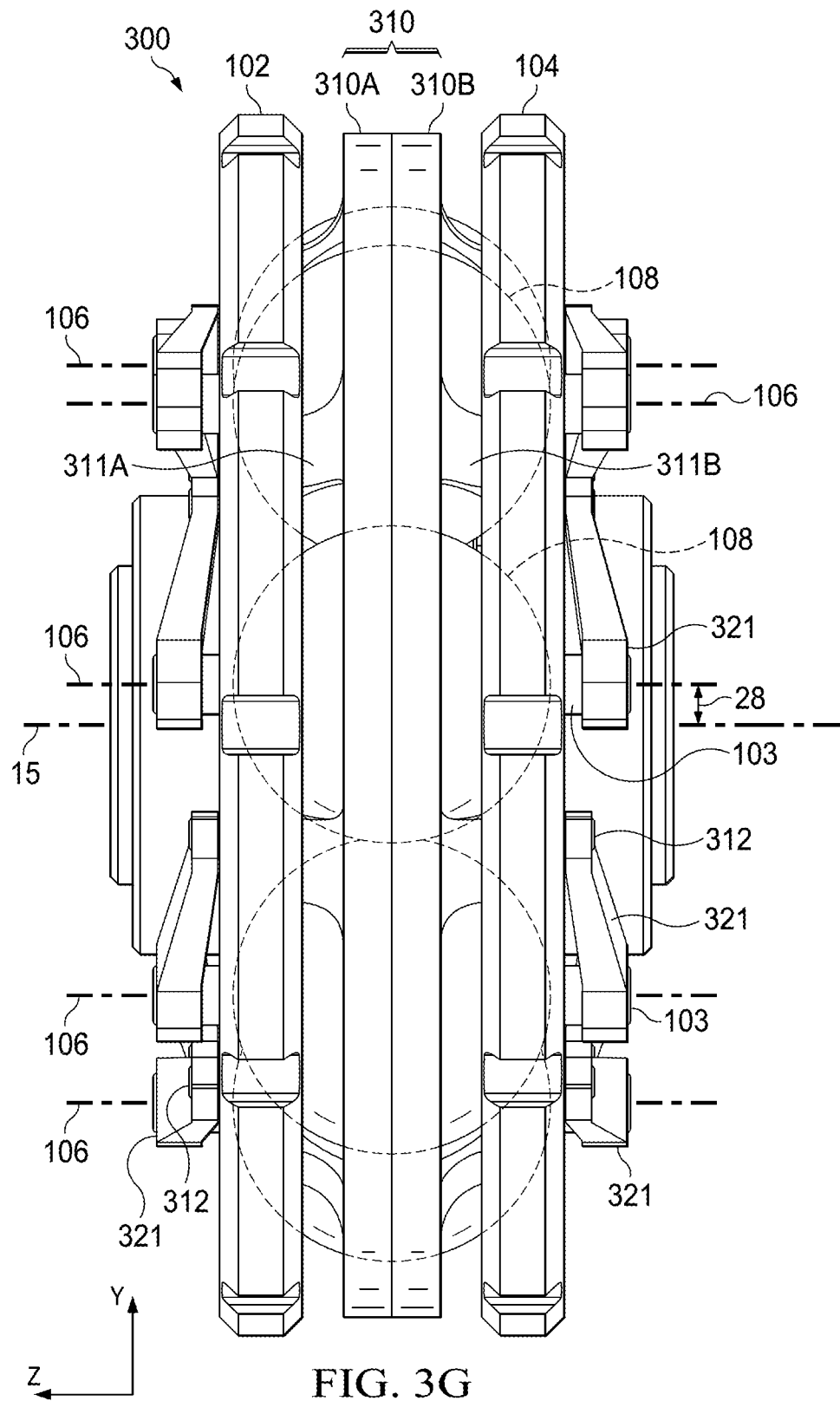
Figure 3H:
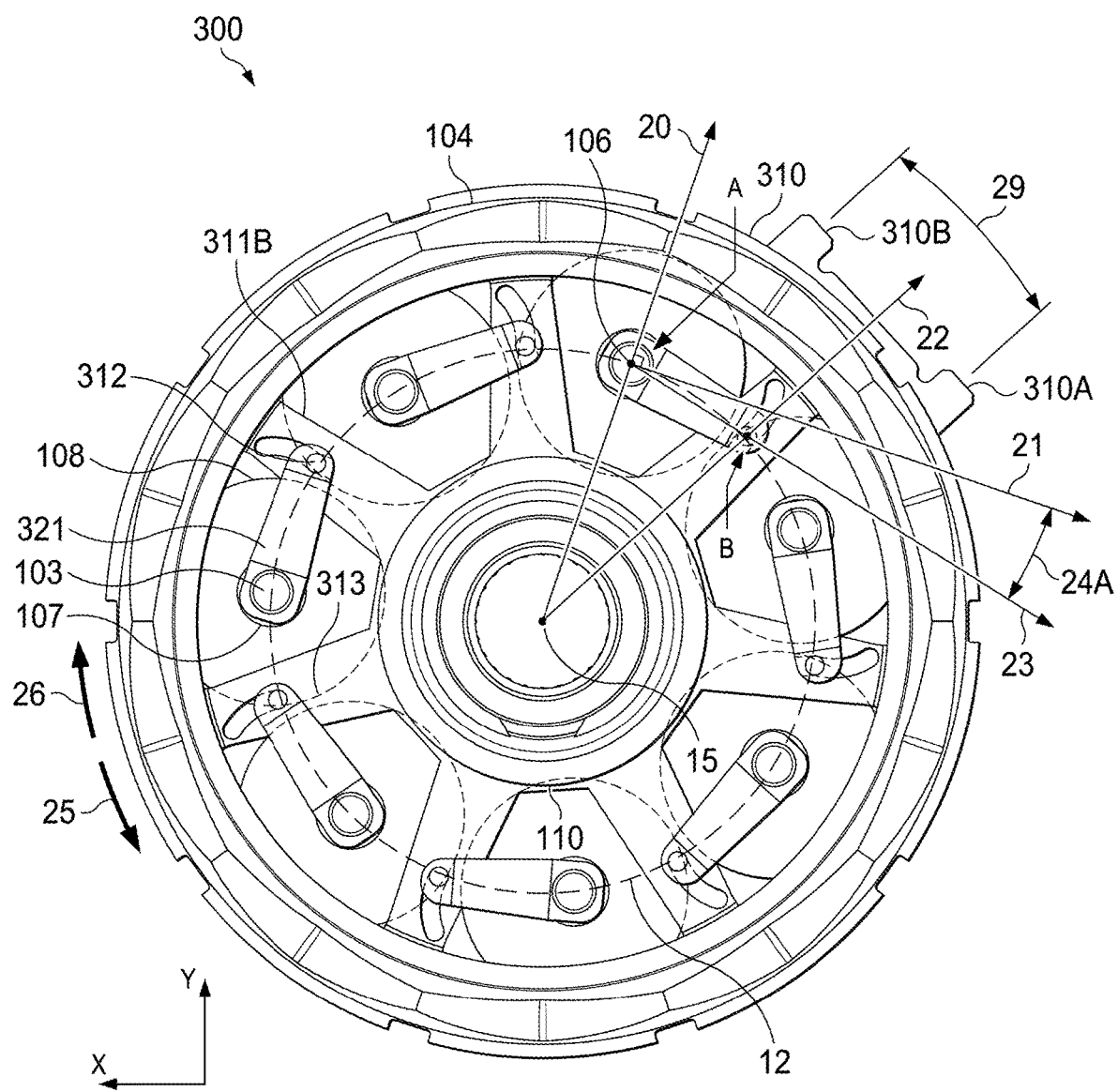

FIGS. 3F-3H depict partial side and front views of one embodiment of CVT 300 configured for operating in reverse direction 26 at a 1:1 ratio. Comparing the radial positioning of pins 312 in slots 313 in carrier arms 311A in FIGS. 3A and 3F, pins 312 are positioned radially outward of pitch circle 12 in FIG. 3A such that offset angle (psi) 24A is positive, whereas pins 312 are positioned radially inward of pitch circle 12 in FIG. 3F such that offset angle (psi) 24A is negative. Similarly, comparing the radial positioning of pins 312 in slots 313 in carrier arms 311B in FIGS. 3C and 3H, pins 312 are positioned radially outward of pitch circle 12 in FIG. 3C such that offset angle (psi) 24B is positive, whereas pins 312 are positioned radially inward of pitch circle 12 in FIG. 3H such that offset angle (psi) 24B is negative.

As described above, CVT 300 depicted in FIGS. 3A-3J has links 321 trailing planets 108, and effective offset angle (psi) 24 is positive for operation in forward direction 25 and negative for operation in reverse direction 26. Furthermore, radially outward positioning pins 312 for both links 321 may not be required for operation in forward direction 25, as long as effective offset angle (psi) 24 composed of first offset angle (psi) 24A and second offset angle (psi) 24B is positive. Similarly, radially inward positioning pins 312 for both links 321 may not be required for operation in reverse direction 26, as long as effective offset angle (psi) 24 composed of first offset angle (psi) 24A and second offset angle (psi) 24B is negative.

Figure 3I:
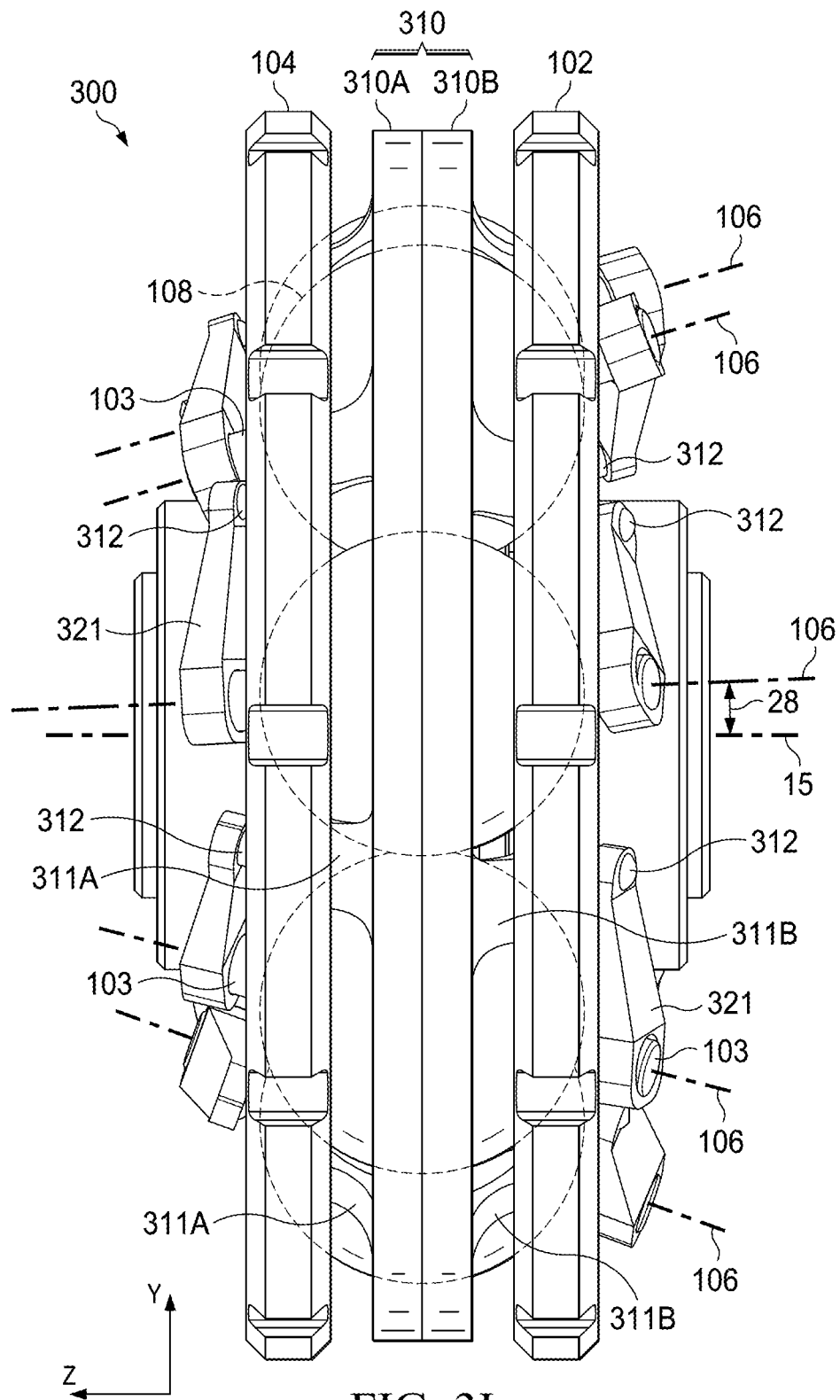

FIG. 3I depicts a partial cutaway view of one embodiment of CVT 300 with pins 312 radially positioned in slots 313 of carrier arms 311A, 311B. Links 321 coupled to carrier arms 311A are configured at first offset angle (psi) 24A and links 321 coupled to carrier arms 311B are configured at second offset angle (psi) 24B, whereby CVT 300 has an effective offset angle (psi) 24 for reverse rotation. To adjust speed ratio, carrier halves 310A, 310B may be rotated relative to each other to angular position (beta) 29. For each non-zero angular position, axles 103 (and therefore axes of rotation 106) are misaligned from a longitudinal axis of CVT 300, imparting a non-zero skew angle (zeta) 27. Rotation of each planet 108 about a corresponding y-axis results in spin-induced (traction) forces on that planet 108. As these forces are exerted on planets 108, friction and other forces in CVT 300 act to return CVT 300 to a balanced state, causing axles 103 to tilt to non-zero tilt angle (gamma) 28, resulting in CVT 300 operating in underdrive in reverse rotation 26.

Figure 3J:
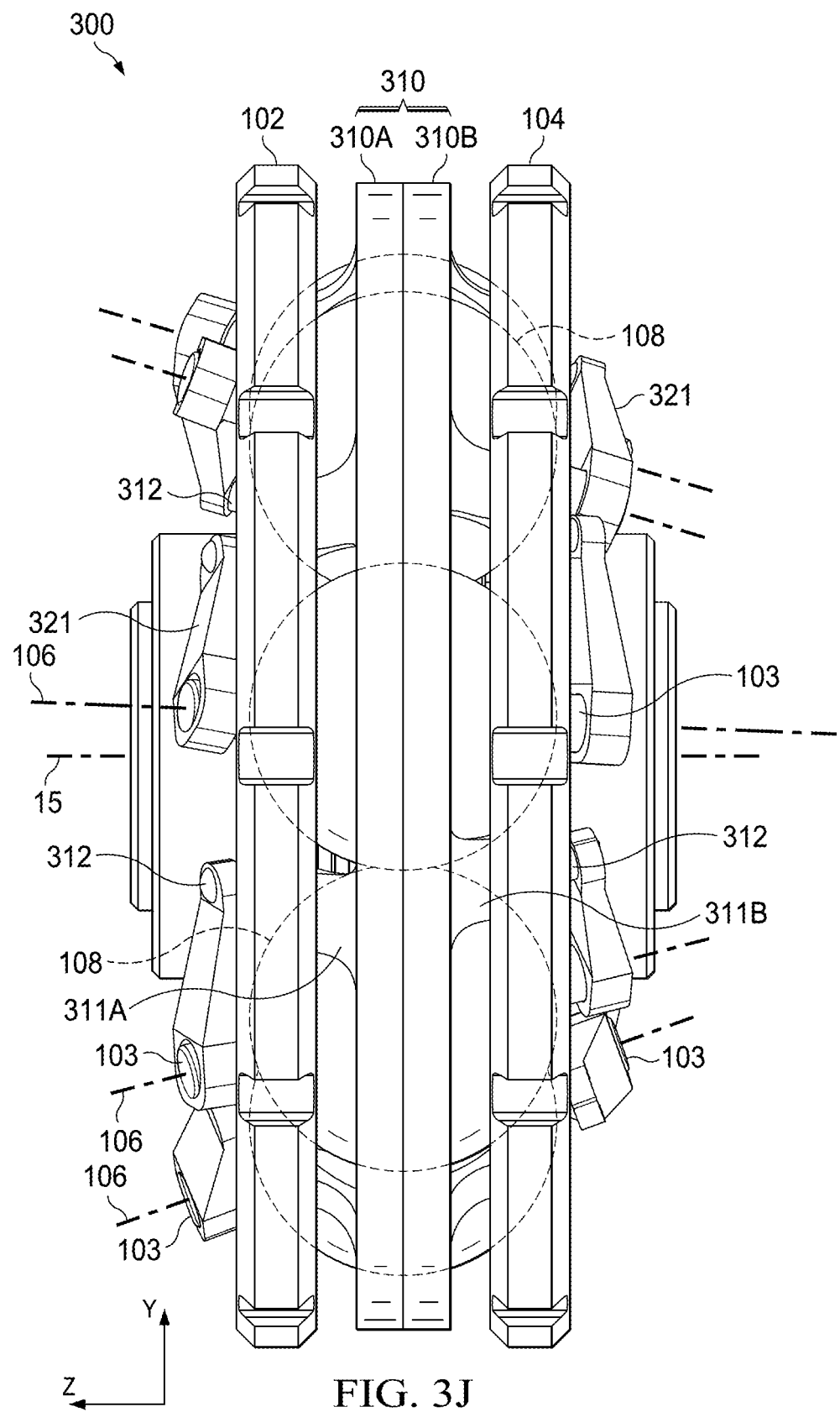

FIG. 3J depicts a partial cutaway view of one embodiment of CVT 300 with pins 312 radially positioned in slots 313 of carrier arms 311A, 311B. Links 321 coupled to carrier arms 311A are configured at first offset angle (psi) 24A and links 321 coupled to carrier arms 311B are configured at second offset angle 24B, whereby CVT 300 has an effective offset angle (psi) 24 for reverse rotation. To adjust speed ratio, carrier halves 310A, 310B may be rotated relative to each other to angular position (beta) 29. For each non-zero angular position, axles 103 (and therefore axes of rotation 106) are misaligned from a longitudinal axis of CVT 300, imparting a non-zero skew angle (zeta) 27. Rotation of each planet 108 about a corresponding y-axis results in spin-induced (traction) forces on that planet 108. As these forces are exerted on planets 108, friction and other forces in CVT 300 act to return CVT 300 to a balanced state, causing axles 103 to tilt to non-zero tilt angle (gamma) 28, resulting in CVT 300 operating in overdrive in reverse rotation 26.

In some embodiments, carrier halves 310A, 310B or links 321 may be coupled to one or more actuators (not shown). An actuator may rotate one or both carrier halves 310A, 310B to angular position (beta) 29 to impart non-zero skew angle (zeta) 27 to cause axles 103 to tilt to tilt angle (gamma) 28 to adjust a speed ratio of CVT 300. An actuator may translate pins 312 radially inward or outward to adjust offset angle (psi) 24 to be positive or negative to configure CVT 300 for operation in forward direction 25 or reverse direction 26. An actuator may be actuated manually, such as by a person adjusting a lever or twisting a grip, or an actuator may be controlled electronically, such as by a controller operating a set of instructions and communicatively coupled to an electronic servo, encoder, hydraulic pump, or other form of actuation. An electronic controller may determine if CVT is to be operated in forward direction 25 or reverse direction 26 and adjust offset angle (psi) independently or concurrently with adjusting an angular position (beta), skew angle (zeta) 27 or tilt angle (gamma) 28.

Figure 4A:
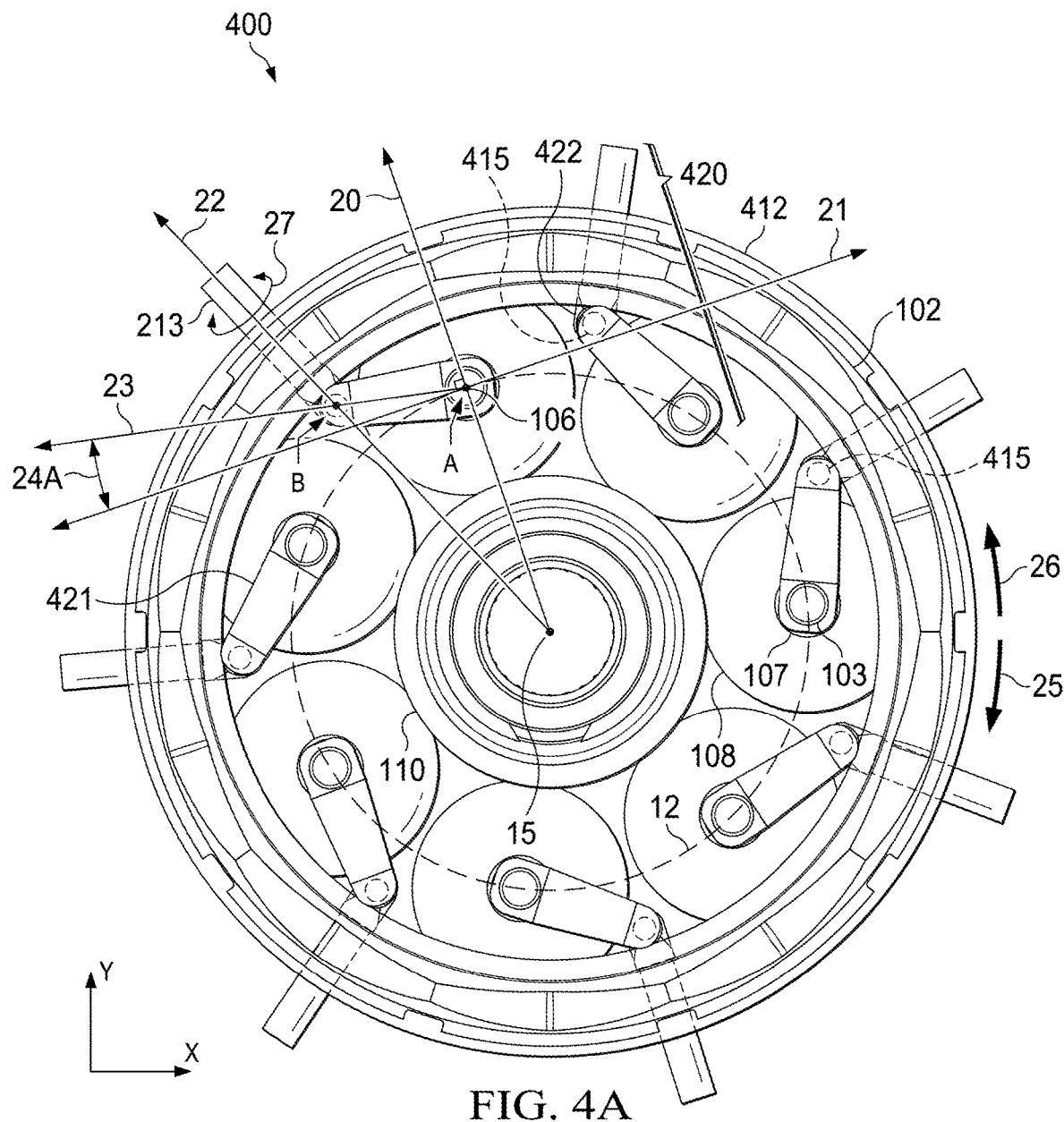
FIGS. 4A-4O depict partial perspective, side and front views of a CVT, illustrating one embodiment of a control system capable of operation in forward direction and reverse direction.
Figure 4B:
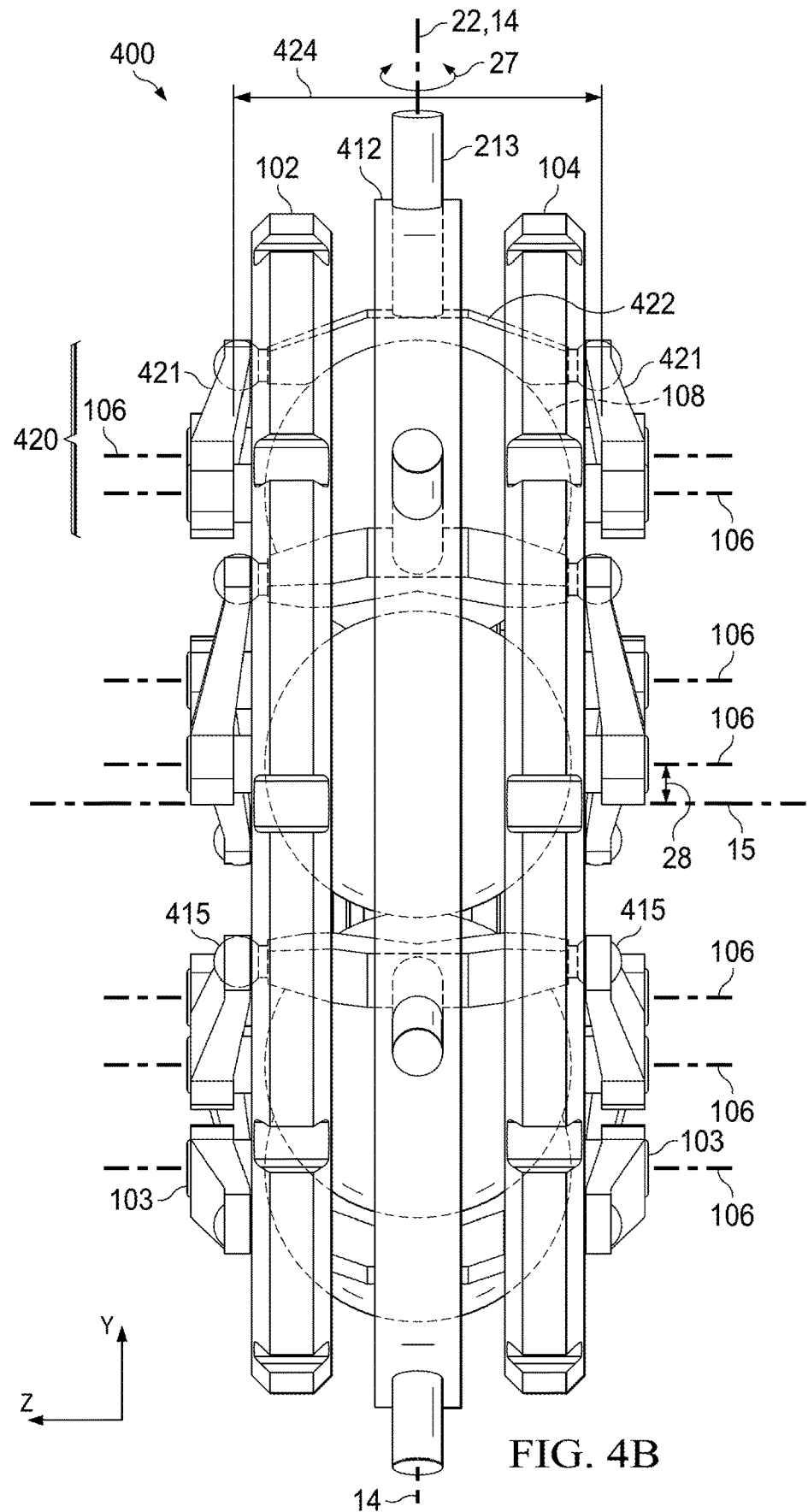
Figure 4C:
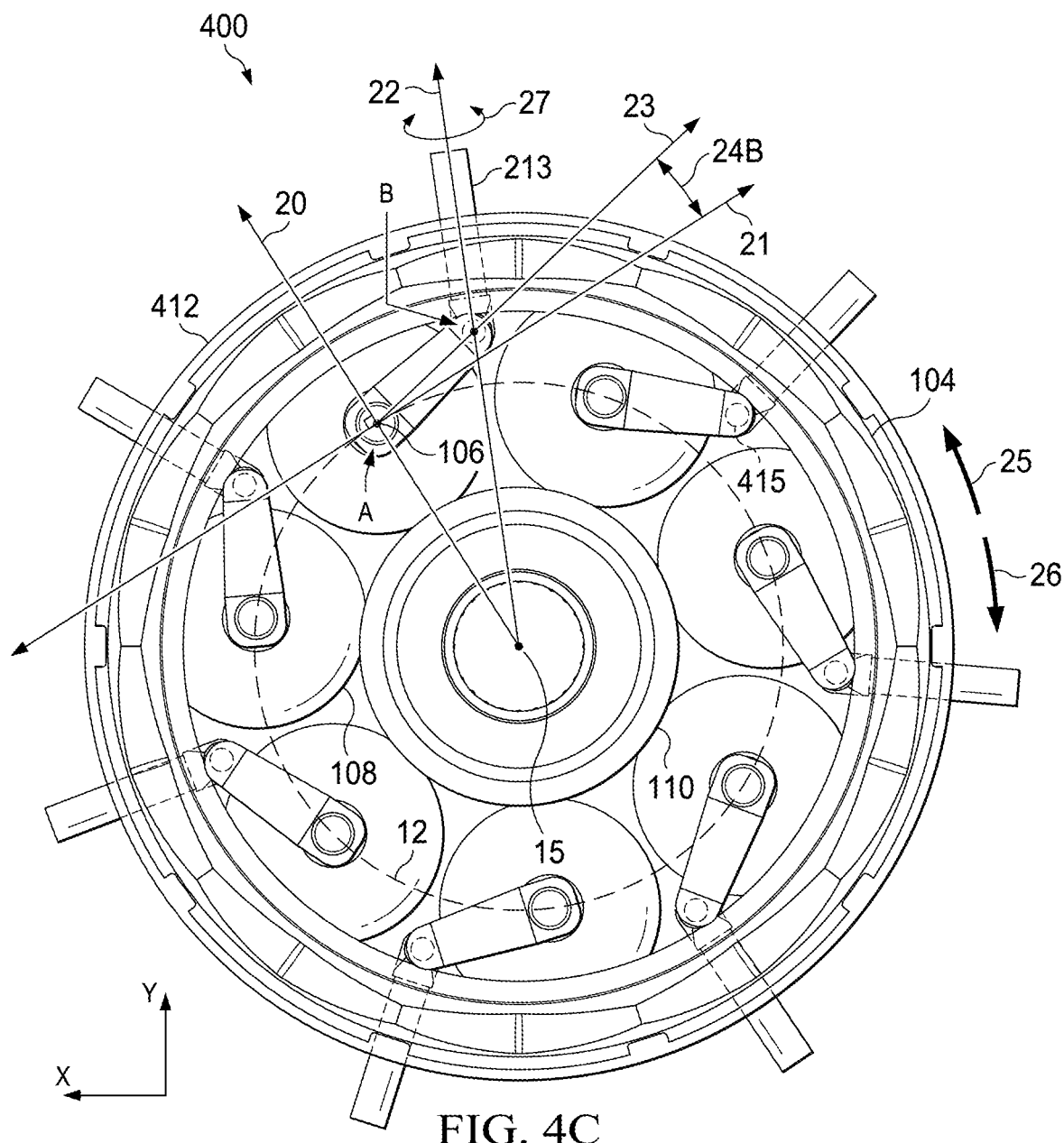
Figure 4D:
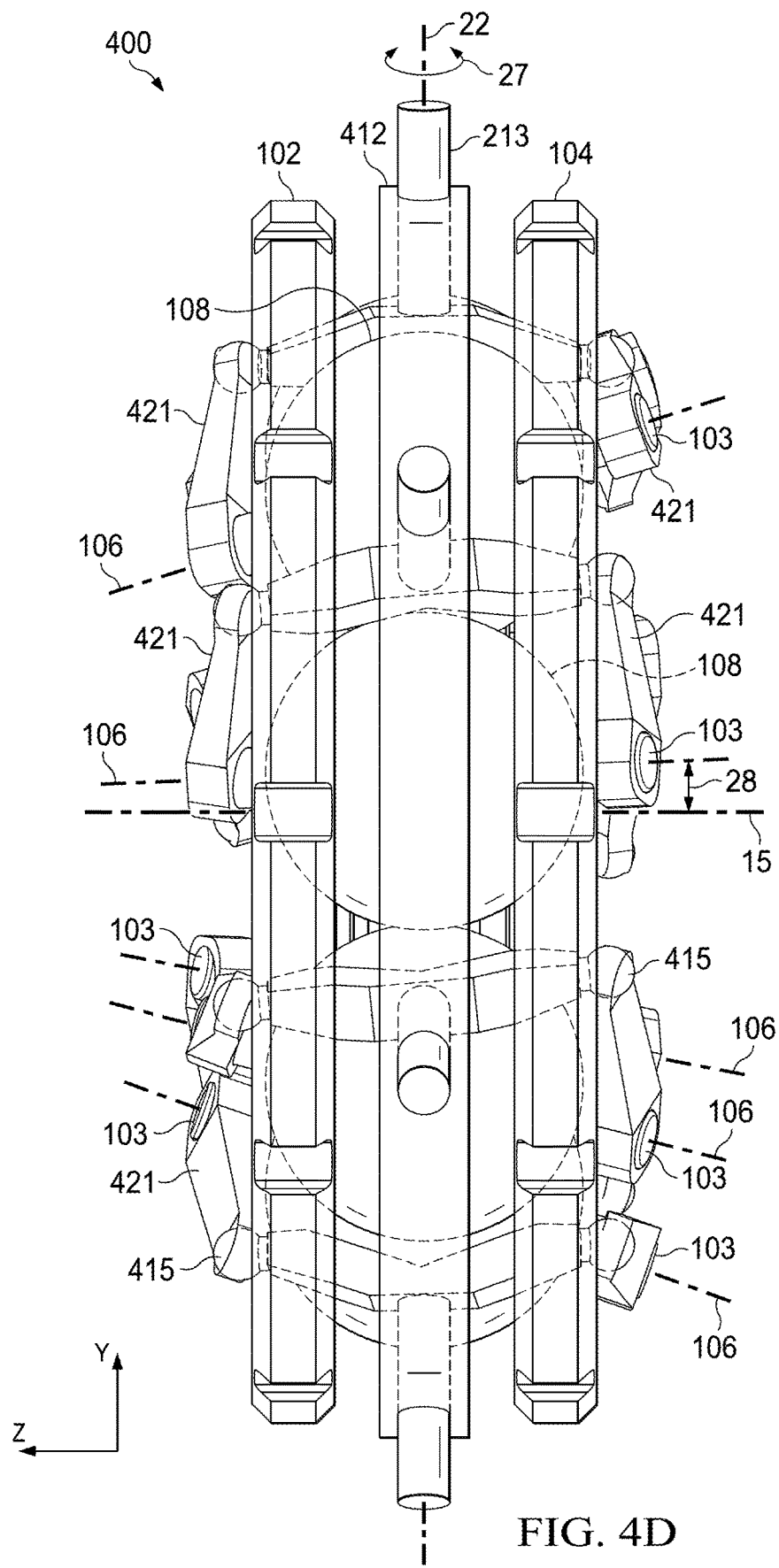
Figure 4E:
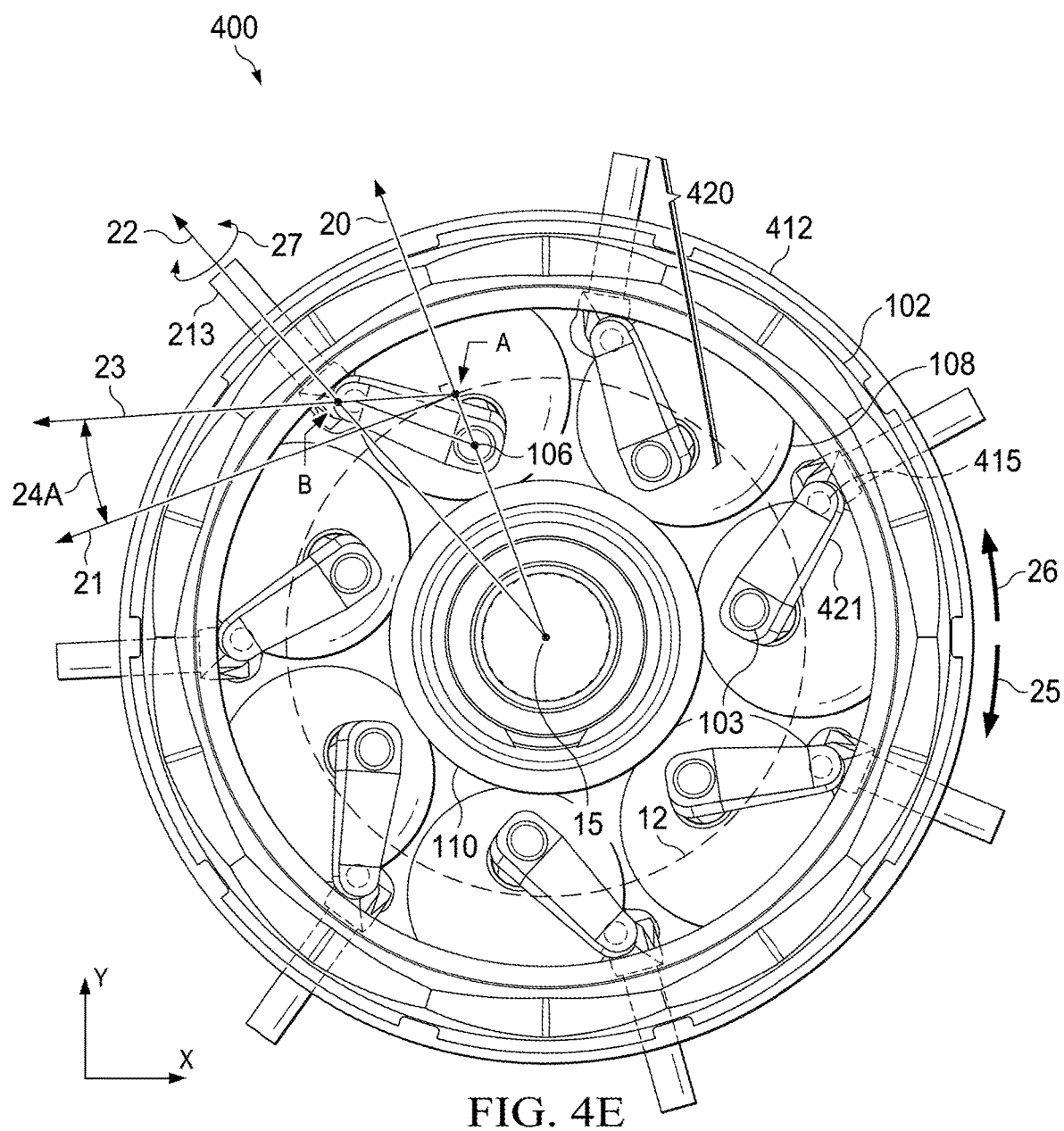
Figure 4F:
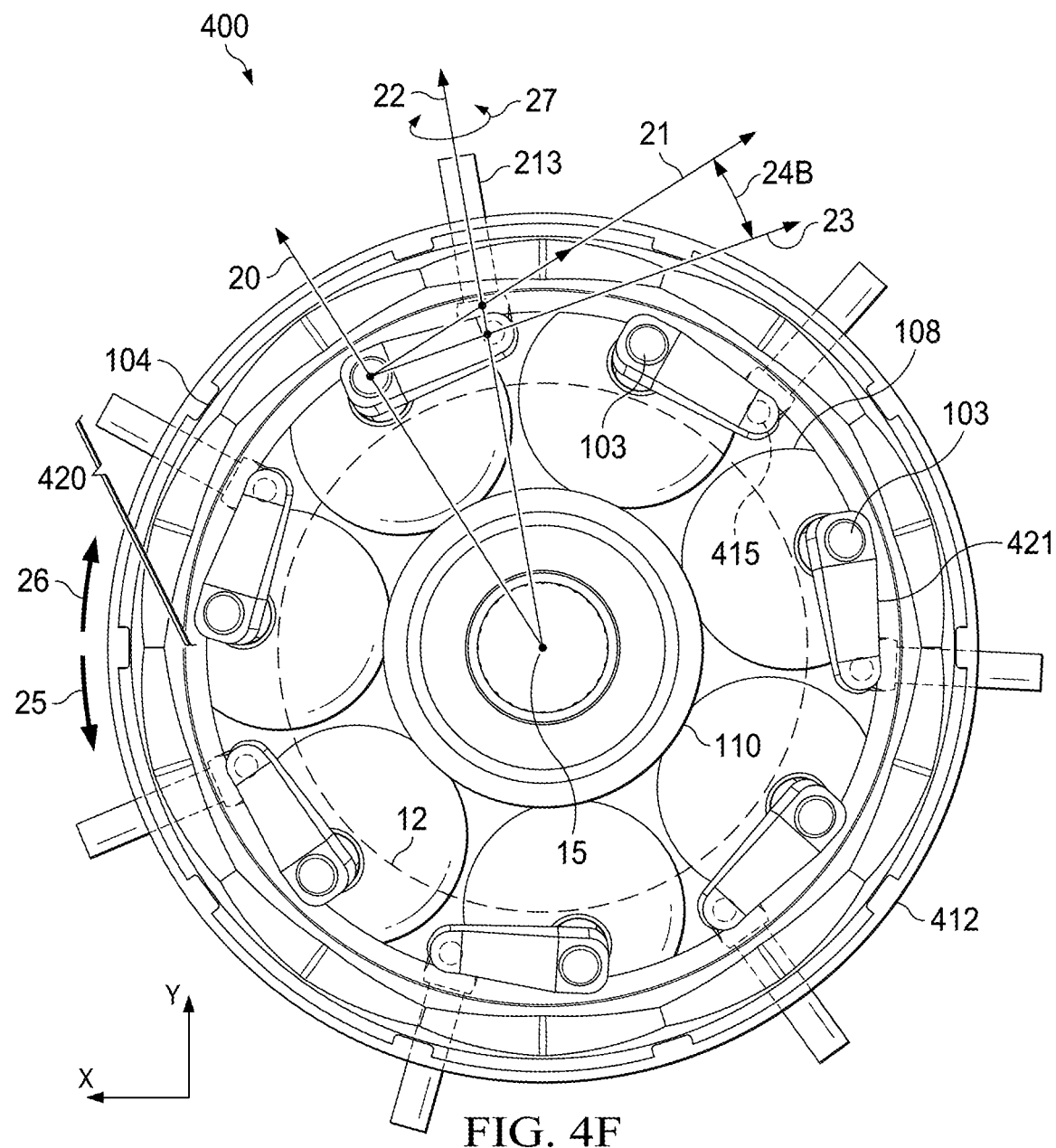
Figure 4G:
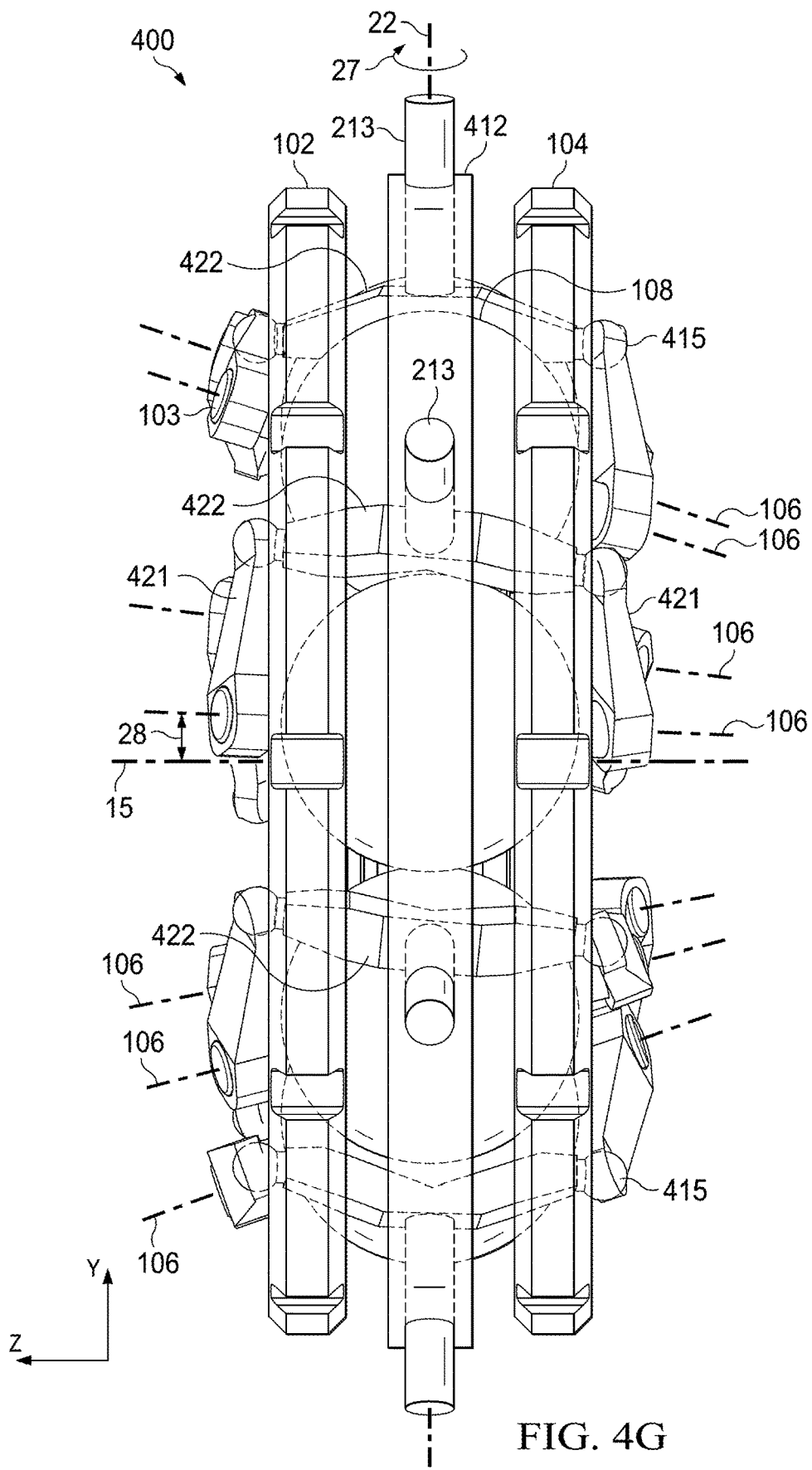
Figure 4H:
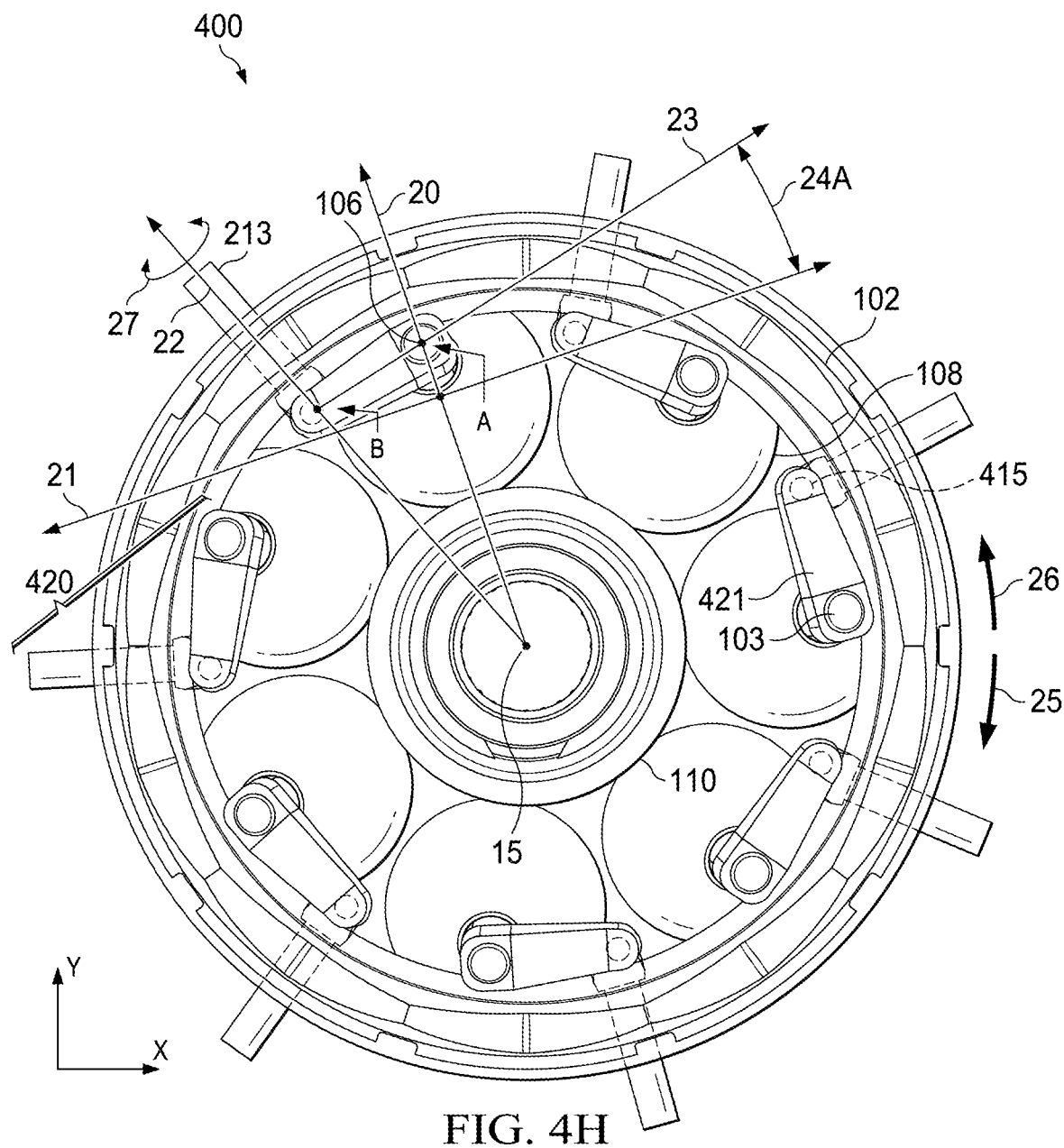
Figure 4I:
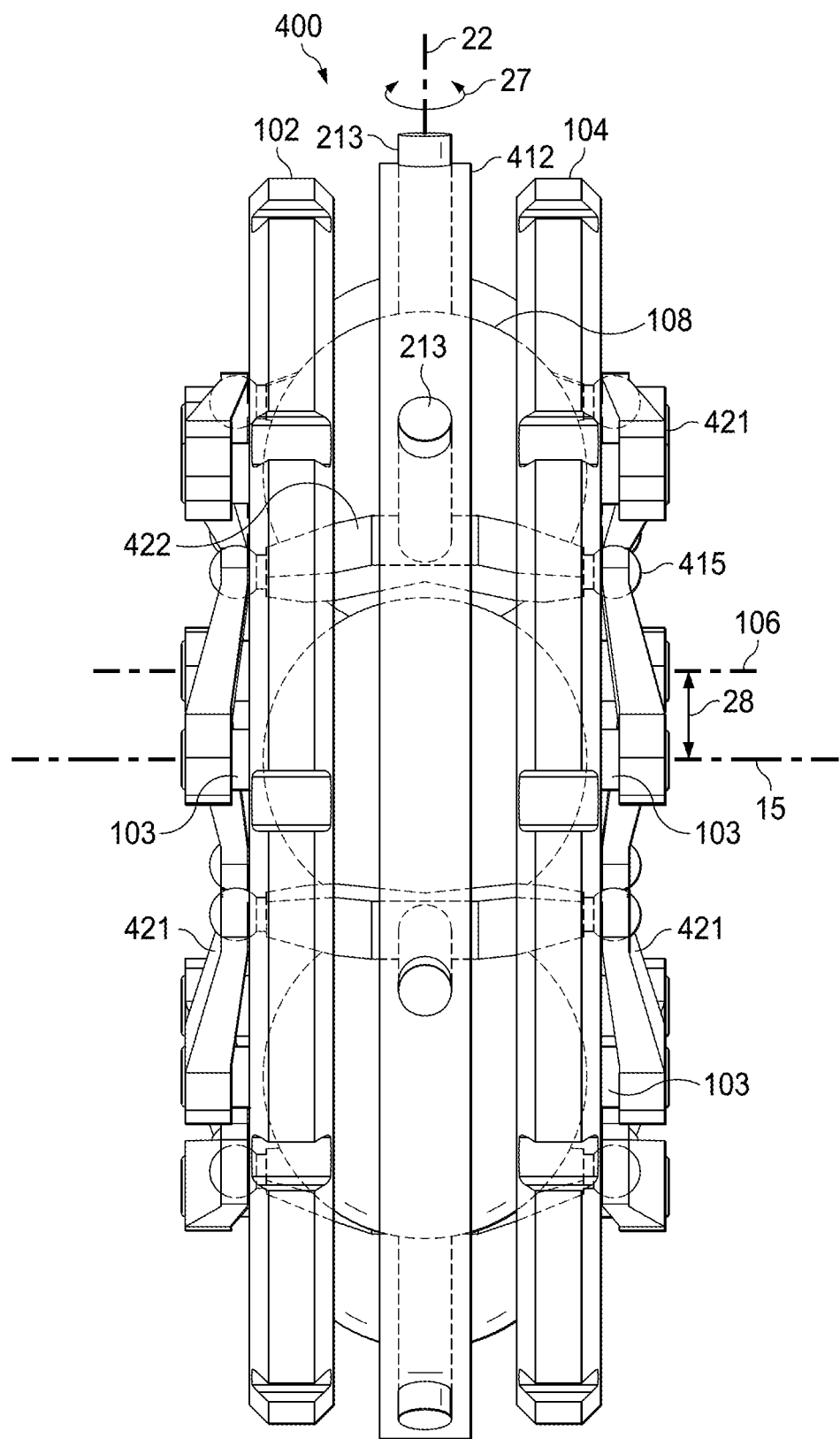
Figure 4J:
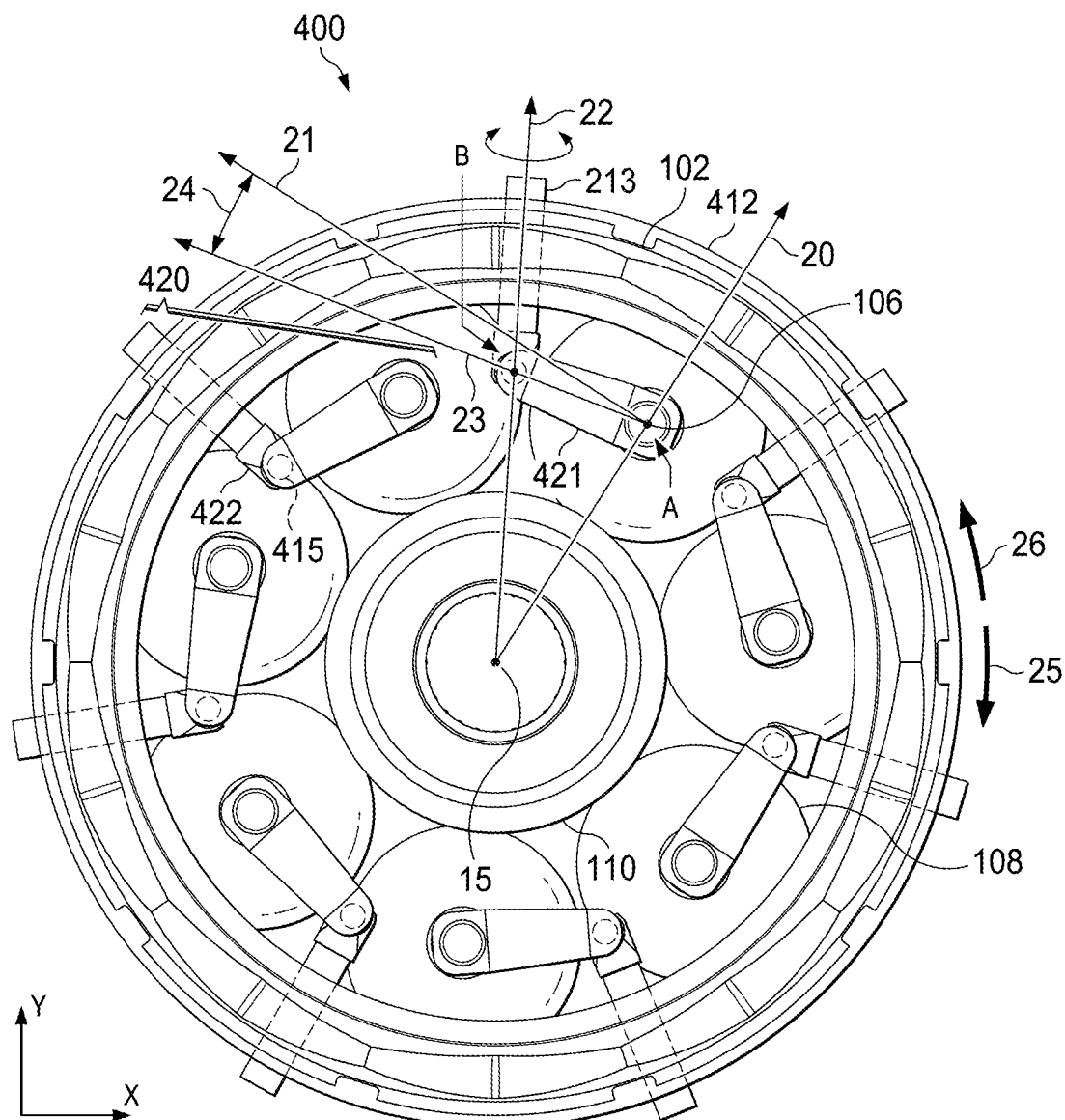
Figure 4K:
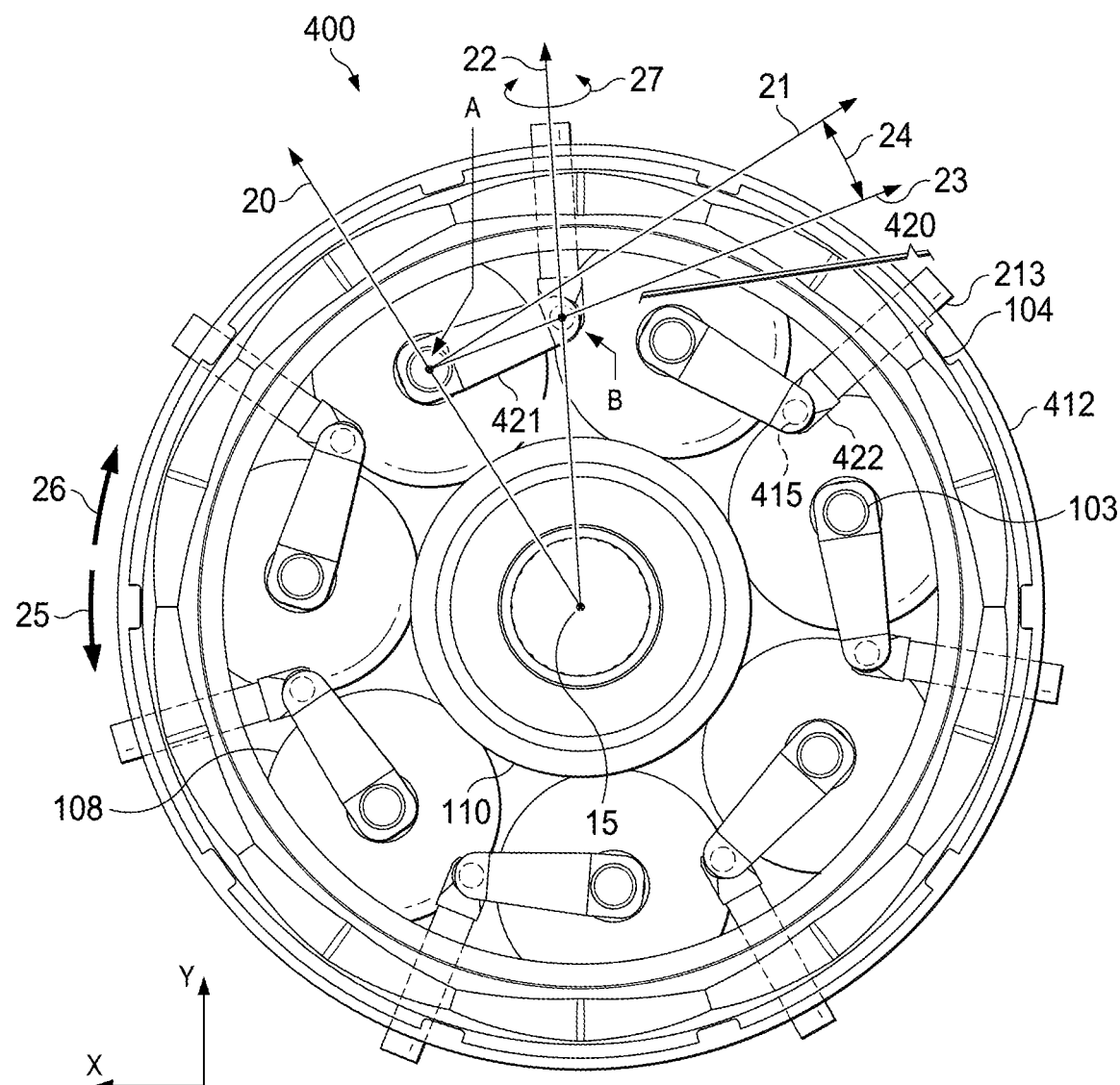
Figure 4L:
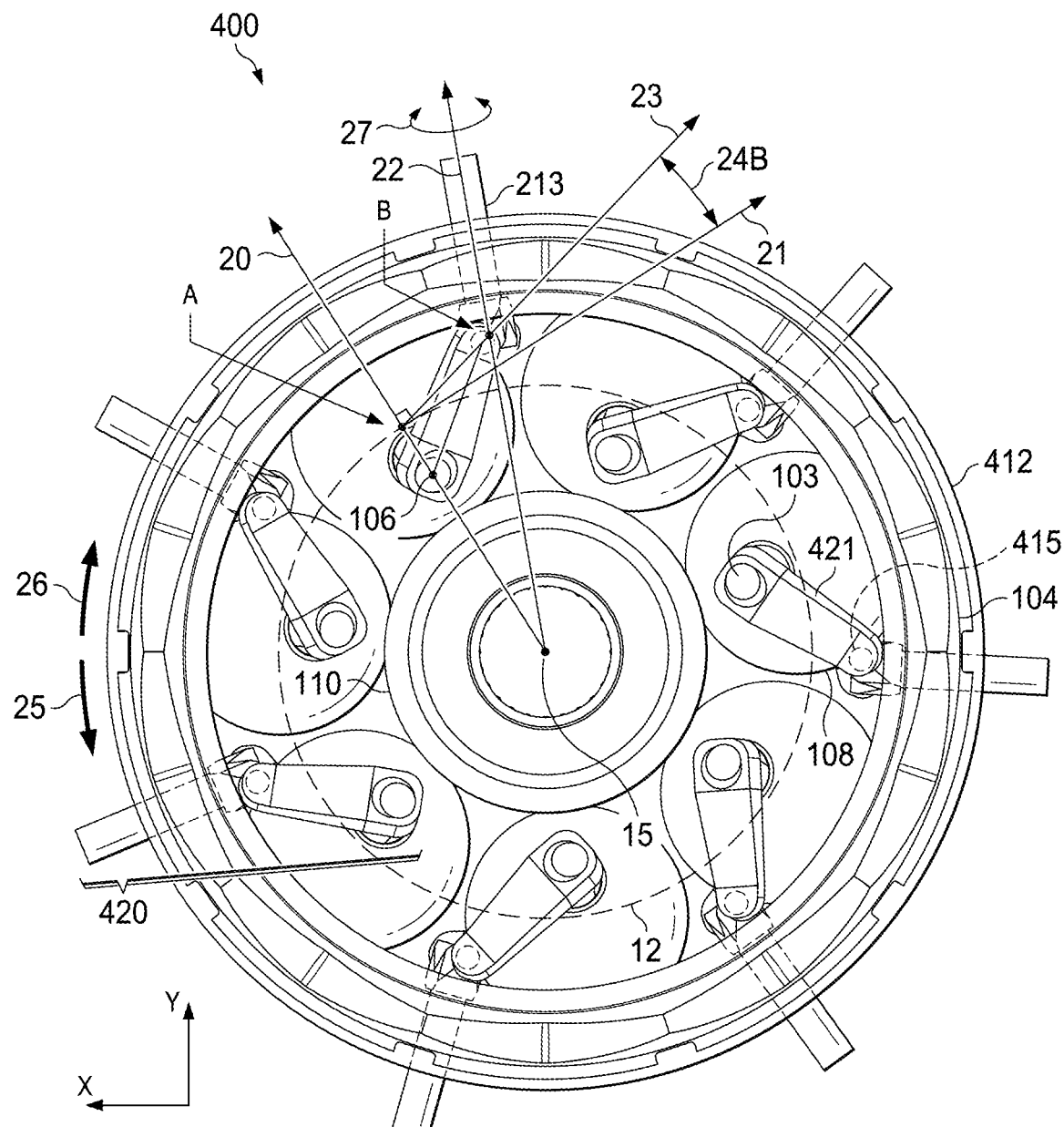
Figure 4M:
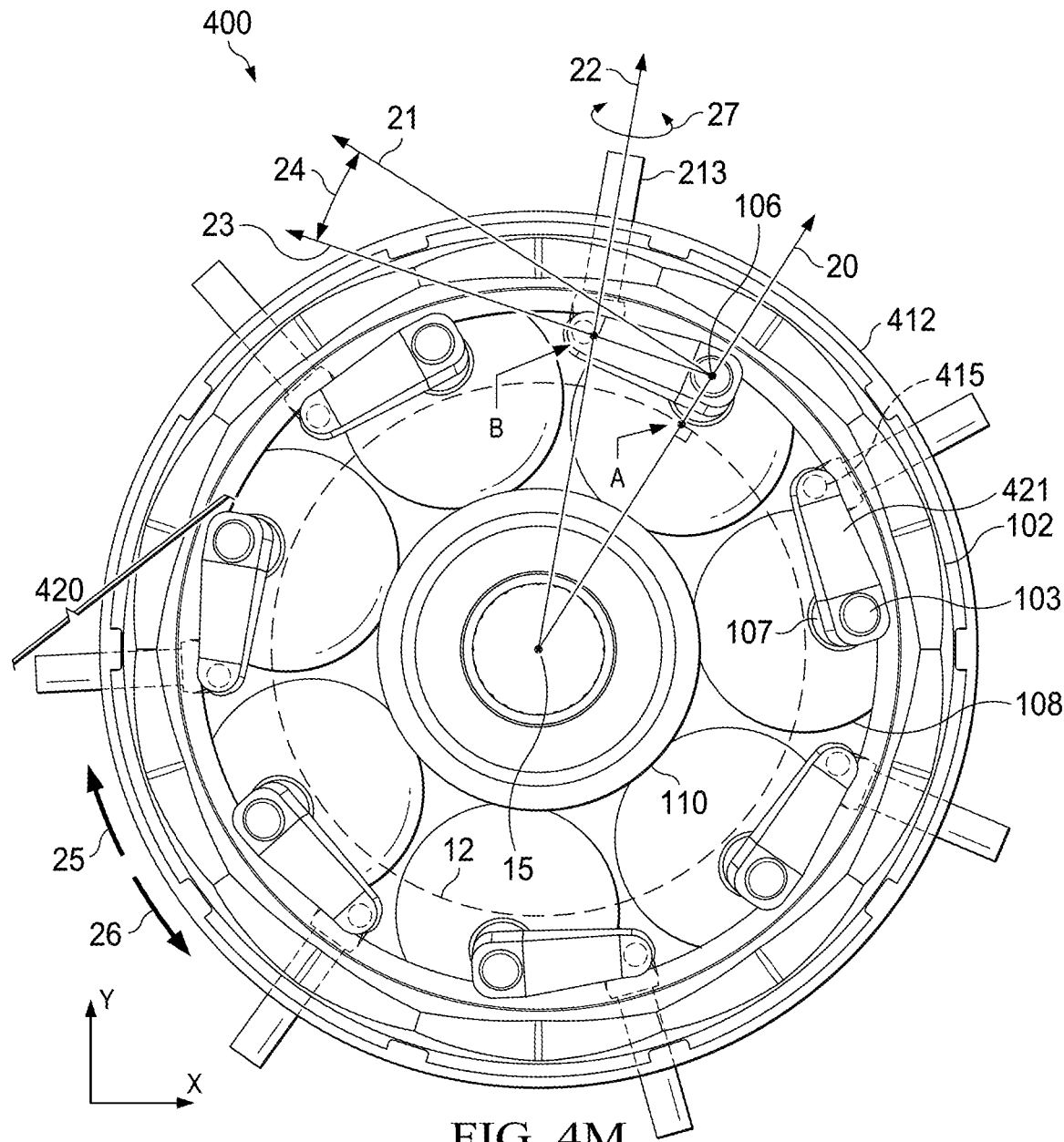
Figure 4N:
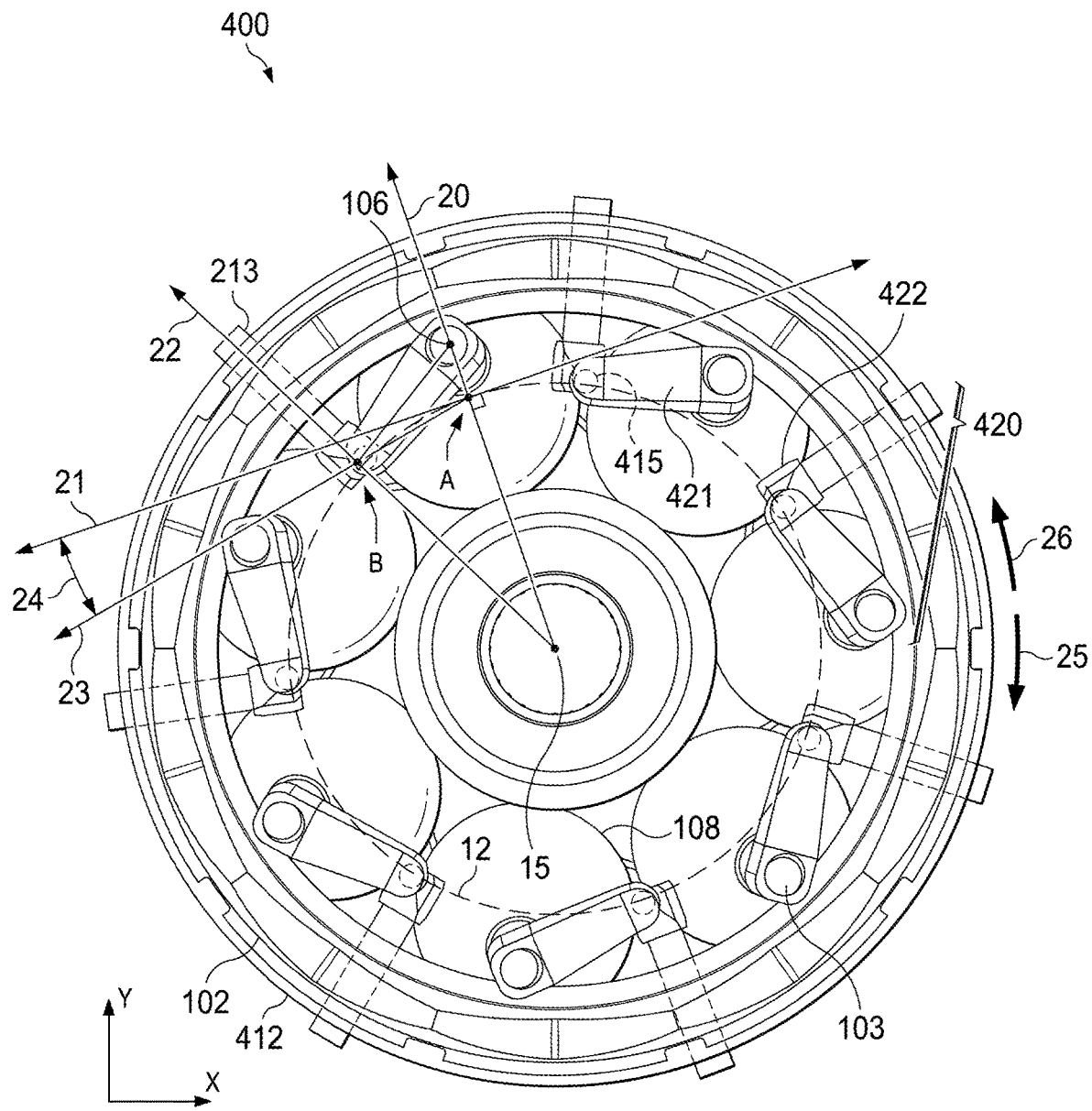
Figure 4O:
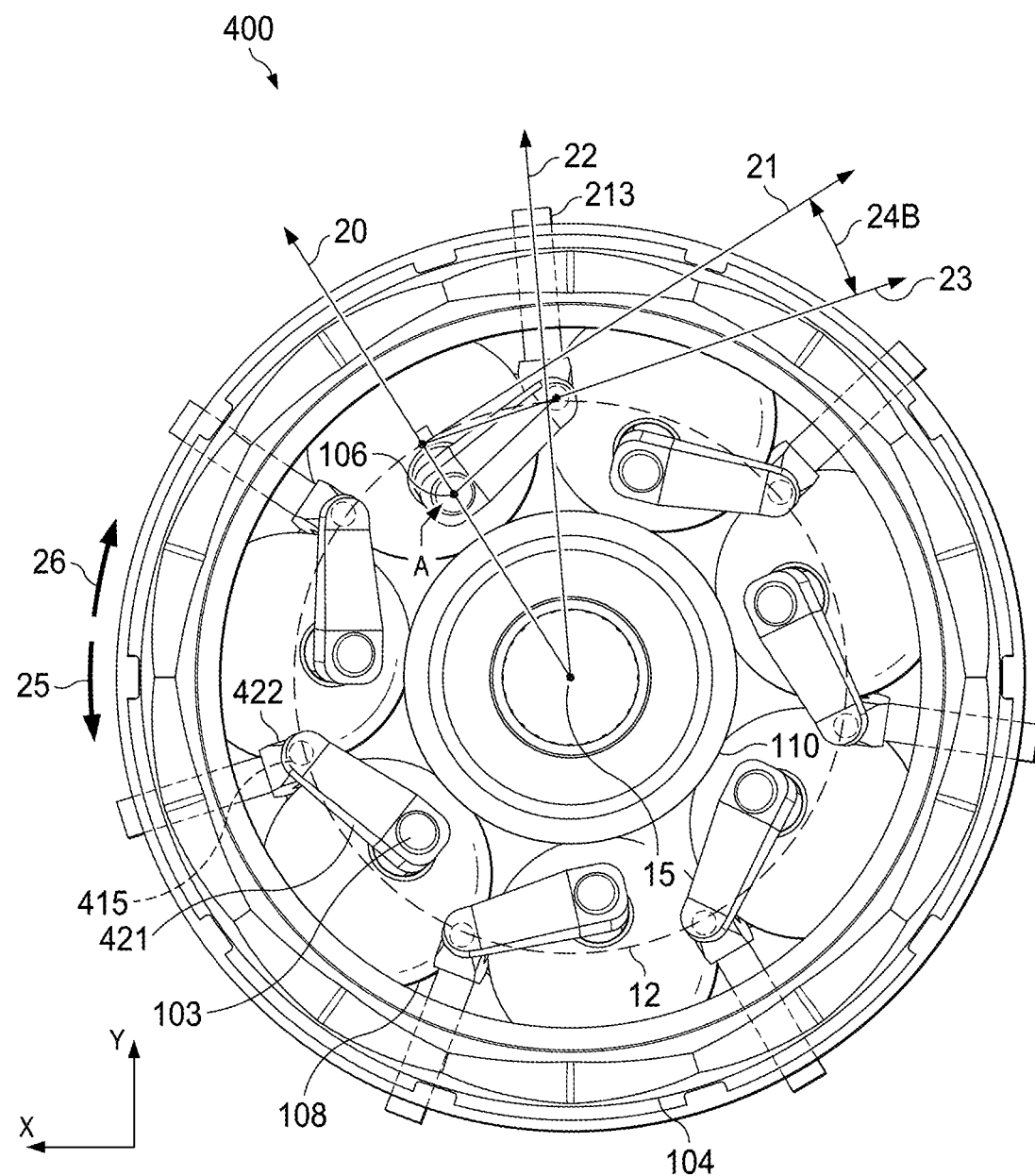

A CVT capable of operation in forward direction and reverse direction is described herein with respect to FIGS. 4A-4O in which axles 103 are coupled to and controlled by a control system with trunnions 420, in which each planet 108 has a corresponding trunnion 420 that is rotatable about a radial axis to induce a (non-zero) skew condition on planet 108 and is further translatable radially to a positive offset angle (psi) 24 or a negative offset angle (psi) 24, wherein CVT 400 is configured for operation in forward rotation 25 or reverse rotation 26 depending on whether offset angle (psi) 24 is positive or negative and whether trunnion 420 leads or trails planet 108. FIGS. 4A-4O depict embodiments in which trunnions 420 trail planets 108 for operation in forward direction 25 and lead planets 108 for operation in reverse direction 26. Variations are possible in which trunnions 420 lead planets 108 in forward direction 25 and trail planets 108 in reverse direction 26.

Rotating trunnion extension 213 rotates center link 422, advancing one link 421 and receding a corresponding link 421. The advancement and recession of links 421 may apply a non-zero skew condition on axles 103 coupled to planets 108. A non-zero skew condition generates unbalanced forces, and the geometry and configuration of CVT 400 causes axles 103 to tilt. Tilting axles 103 to a non-zero tilt angle (gamma) 28 causes contact points between planets 108 and traction rings 102, 104 to change, adjusting a speed ratio of CVT 400.

CVT 400 comprises planets 108 located between and in contact with traction rings 102, 104 and sun 110. Planets 108 are rotatably coupled to axles 103 such that planets 108 rotate about axes of rotation 106 defined by axles 103. If present, bearings 107 allow rotation of planets 108 about axles 103. In some embodiments, bearings 107 allow planets 108 to rotate about axles 103 but constrain planets 108 from axial movement along axles 103.

Planets 108 are fixed axially due to their position between traction rings 102, 104 and traction sun 110, and are controllable due to their coupling via axles 103, links 421, center link 422, trunnion extension 213 and synchronizing ring 212.

Each trunnion 420 comprises trunnion extension 213 coupled to center link 422, which is coupled at each end to a pair of links 421. Trunnion extension 213 comprises a rigid member radially translatable in opening 216 of synchronizing ring 212 and rotatable about axis 22. Center link 422 is rigidly coupled to trunnion extension 213, whereby rotation of trunnion extension 213 rotates center link 422. Each link 421 is coupled to one end of an axle 103 and center link 422, whereby rotation of center link 422 advances a first link 421 and recedes a second link 421.

Trunnions 420 may be formed or configured for selected degrees of freedom between trunnion extensions 213 and planet axles 103. For example, in some embodiments, axles 103 may rotate about their y-axes 22 but are constrained or fixed axially. In these embodiments, a coupling between links 421 and axles 103 may have only one degree of freedom. In other embodiments, spherical joints or other couplings 415 allow multiple degrees of freedom between links 421 and axles 103. In some embodiments, at least one link 421 may be formed as a resilient member to provide at least one additional degree of freedom. In some embodiments, links 421 may be formed with directional resiliency or rigidity, whereby links 421 behave as rigid members relative to a first direction but behave as resilient members in a second direction. For example, when a torque is applied to links 421 relative to their z-axes, links 421 may behave as rigid members. However, when an axial force is applied to links 421, links 421 may behave as resilient members in the axial direction and allow some axial deflection, returning to their original configuration when the force is removed. An advantage to directional resiliency in a control system for CVT 400 may be an increased range of speed ratios or a smaller volume necessary for the control system or CVT 400. For example, if trunnion extension 213, center link 422 and axles 103 are formed as rigid members, rotation of trunnion extension 213 may be limited based on dimensions such as the width of trunnions 420, the width of center link 422, or the effective length of links 421, and rotation or translation of trunnions 420 may exceed tolerances. However, links 421 having resilient properties, coupling 415 allowing multiple degrees of freedom, or other couplings relative to an axial direction may allow a control system for CVT 400 to flex or twist to remain within tolerances, which may extend the ratio range of CVT 400.

Operationally, trunnion extension 213 is rotatable to skew angle (zeta) 27 about radial line 22 to impart a non-zero skew condition on planet axles 103. A non-zero skew condition, along with the geometry and configuration of CVT 400, generate unbalanced forces on planets 108. The generation of forces due to the non-zero skew condition is a function of the rotation of trunnion 213, the length of center link 422, the effective length of links 421, distance 424 between links 421, the length of axles 103, the direction of rotation of CVT 400 or other factors. Unbalanced forces cause axles 103 to adjust toward tilt angle (gamma) 28 corresponding to a force-balanced state and a zero-skew condition.

In addition to rotating trunnion 420s about axes 22 to skew angle (zeta) 27, trunnion extensions 213 may be translated radially inward or outward to rotate trunnions 420 about the z-axes for planets 108 to offset angle (psi) 24, in which offset angle (psi) 24 may be defined as an angle between tangent line 21 and line 23 passing through the intersection of radial line 22 and center plane 14 which bisects center links 422. A magnitude of offset angle (psi) 24 determines the stability and sensitivity for operation in forward direction 25 and reverse direction 26.

To enable control in forward direction 25, trunnion extension 213 may be radially translated to rotate trunnion 420 about z-axis of planets 108 to offset angle (psi) 24. Rotation of trunnions 420 to a positive or negative offset angle (psi) 24 results in a radial position of center links 422 inward or outward of pitch circle 12. Radial positioning of center links 422 outward of pitch circle 12 enables control of CVT 400 in forward rotation 25. Radial positioning of center links 422 inward of pitch circle 12 enables control of CVT 400 in reverse rotation 26.

FIGS. 4A-4C depict partial front and side views of one embodiment of CVT 400 configured with center links 422 translated radially outward relative to pitch circle 12 for forward direction 25 and with trunnion extensions 213 rotated about axes 22 such that skew angle (zeta) 27 is zero, wherein forces are balanced and tilt angle (gamma) 28 is zero, whereby variator 400 is operating at a speed ratio of 1:1 (i.e., a rotational speed of second traction ring 104 is substantially equal to a rotational speed of first traction ring 102 minus any friction losses).

FIGS. 4D-4F depict partial front, side, and back views of one embodiment of CVT 400 configured with center links 422 translated radially outward of pitch circle 12 for operation in a forward direction, and with trunnion extensions 213 rotated about axes 22 to non-zero skew angle (zeta) 27, wherein unbalanced forces (e.g., spin-induced forces) cause axles 103 to adjust to a non-zero tilt angle (gamma) 28, whereby CVT 400 is operating in underdrive in forward direction 25.

FIGS. 4G-4H depict partial front and side views of one embodiment of CVT 400 configured with center links 422 translated radially outward of pitch circle 12 for operation in a forward direction 25, and with trunnion extensions 213 rotated about axes 22 to non-zero skew angle (zeta) 27 to cause axles 103 to adjust to a non-zero tilt angle (gamma) 28, whereby CVT 400 is operating in overdrive.

FIGS. 4I-4K depict partial front and back views of one embodiment of variator 400 configured with center links 422 translated radially inward of pitch circle 12 for operation in a reverse direction 26, and with trunnion extensions 213 rotated about axes 22 to non-zero skew angle (zeta) 27 to cause an adjustment of axles 103 to a non-zero tilt angle (gamma) 28 such that CVT 400 is operating at a 1:1 ratio.

FIGS. 4L-4M depict partial front and back views of one embodiment of CVT 400 configured with center links 422 translated radially inward of pitch circle 12 for operation in a reverse direction 26, and with trunnion extensions 213 rotated about axes 22 to non-zero skew angle (zeta) 27 to cause an adjustment of axles 103 to a non-zero tilt angle (gamma) 28 whereby CVT 400 is operating in underdrive.

FIGS. 4N-4O depict partial front and back views of one embodiment of CVT 400 configured with center links 422 translated radially inward of pitch circle 12 for stable operation in a reverse direction 26, and with trunnion extensions 213 rotated about axes 22 to non-zero skew angle (zeta) 27 to cause an adjustment of axles 103 to a non-zero tilt angle (gamma) 28 whereby CVT 400 is operating in overdrive.

Embodiments disclosed in FIGS. 4A-4O may be controlled manually, such as by a person rotating a hand grip, lever, or other mechanical actuator. Embodiments disclosed in FIGS. 4A-4O may also be controlled electronically, such as by a controller communicatively coupled to one or more actuators (not shown), whereby the controller receives input regarding a target operating condition of CVT 400 and adjusts one or more of skew angle (zeta) 27 and offset angle (psi) 24 to adjust a tilt angle (gamma) 28 of CVT 400 for operation in forward direction 25 or reverse direction 26. The target operating condition may be a target speed ratio, target ratio, output speed or input speed. The controller may determine a direction of operation (e.g., forward direction 25 or reverse direction 26) and adjust offset angle (psi) 24 accordingly. As the magnitude of offset angle (psi) 24 increases, the stability of CVT 400 increases. As the magnitude of offset angle (psi) 24 nears zero, the sensitivity of CVT 400 increases.

As mentioned above, CVTs described herein may be operated in forward and reverse directions, such as by rotating trunnions 220, 320 or 420 about the z-axes of planets 108 to an offset angle (psi) 24 associated with forward direction 25 or reverse direction 26. In addition to enabling control in forward and reverse, embodiments disclosed herein may be configured for more stability or more sensitivity.

Referring to FIGS. 2A-2J, the more radially inward or outward coupling 215 is moved (i.e., a magnitude of an offset angle (psi) is closer to a maximum possible magnitude for psi), the more stable CVT 200 may operate, whereas radial translation of coupling 215 toward a neutral offset angle (psi) 24 (i.e., a magnitude of an offset angle (psi) is closer to zero), the faster CVT 200 may be adjusted.

In some embodiments, a controller may be configured to determine a target offset angle (psi) based on a target stability or sensitivity. For example, a controller may control CVT by configuring trunnion 220 to a maximum offset angle (psi) for stability and reducing the frequency at which zeta angle is changed. This example may work well in scenarios in which undesirable or unexpected rollback or operation in reverse direction 26 is unlikely to occur. An advantage to this control scheme may be reduced power consumption by an actuator used to adjust a speed ratio of CVT 200.

In some embodiments, operating CVT 200 with the magnitude of offset angles (psi) 24 always close to zero may be useful in scenarios in which an unexpected or unfavorable rollback or operation in reverse direction 26 may occur. An advantage to this control scheme may be the ability to rapidly switch between operation in forward direction and reverse direction. A controller may be configured with at least two control schemes, wherein one control scheme configures CVT 200 into a stable configuration with higher magnitude offset angles (psi), and a sensitive configuration with the magnitude of offset angles (psi) closer to zero.

Referring to FIGS. 3A-3J, the larger offset angle (psi) 24 to which links 321 are rotated (i.e., a magnitude of an offset angle (psi) is closer to a maximum possible magnitude for psi), the more stable CVT 300 may operate, whereas the smaller offset angle (psi) 24 to which links 321 are rotated (i.e., a magnitude of an offset angle (psi) is closer to zero), the faster CVT 300 may be adjusted for a given skew angle (zeta) 27. A controller may be configured to determine offset angle (psi) based on a target stability or sensitivity.

In some embodiments, a controller may control CVT by configuring trunnion 320 to a maximum offset angle (psi) 24 for stability and reducing the frequency at which skew angle (zeta) 27 is changed. This example may work well in scenarios in which unfavorable or unexpected rollback or operation in reverse direction 26 is unlikely to occur. An advantage to this control scheme may be reduced power consumption by an actuator used to adjust a speed ratio of CVT 300.

In some embodiments, operating CVT 300 with the magnitude of offset angles (psi) 24 always close to zero may be useful in scenarios in which an unexpected or unfavorable rollback or operation in reverse direction 26 may occur. An advantage to this control scheme may be the ability to rapidly switch between operation in forward direction and reverse direction.

A controller may be configured with at least two control schemes, wherein one control scheme configures CVT 300 into a stable configuration with higher magnitude offset angles (psi), and a sensitive configuration with the magnitude of offset angles (psi) closer to zero. In some embodiments, an offset angle (psi) greater than 10 degrees may provide a stable configuration. In some embodiments, an offset angle (psi) greater than 12 degrees may provide a stable configuration. In some embodiments, an offset angle (psi) greater than 15 degrees may provide a stable configuration. In some embodiments, an offset angle (psi) less than 10 degrees may provide a sensitive configuration. In some embodiments, an offset angle (psi) less than 7 degrees may provide a sensitive configuration. In some embodiments, an offset angle (psi) less than 5 degrees may provide a sensitive configuration.

A controller may be coupled to a user interface and a plurality of sensors. User inputs may be received by the controller from the user interface. A user input may include a target speed ratio, a direction of rotation, a control scheme, or some combination. In some embodiments, a user input may be interpreted by the controller. For example, a user may select "Economy" and "Forward" and the controller may interpret the user input to configure a CVT with a positive, larger magnitude offset angle (psi) 24 for stable control in forward rotation, or a user may select "Low" and "Forward" and the controller may recognize that operation in this combination may be an indicator that rollback is likely and configure a CVT with a positive, lower magnitude offset angle (psi).

Referring to FIGS. 4A-4O, the more radially inward or outward that center links 422 are positioned (i.e., the larger offset angle (psi) 24 to which links 421 are rotated such that a magnitude of an offset angle (psi) is closer to a maximum possible magnitude), the more stable CVT 400 may operate, whereas the closer to pitch circle 12 that center links 422 are positioned, the faster CVT 400 may be adjusted for a given skew angle (zeta) 27.

In some embodiments, a controller may be configured to determine offset angle (psi) 24 based on a target stability or sensitivity. For example, a controller may control CVT 400 by positioning center links 422 to configure CVT 400 with a maximum offset angle (psi) 24 for stability and reducing the frequency at which skew angle (zeta) 27 is changed. This example may work well in scenarios in which undesirable or unexpected rollback or operation in reverse direction 26 is unlikely to occur. An advantage to this control scheme may be reduced power consumption by an actuator used to adjust a speed ratio of CVT 400.

In some embodiments, operating CVT 400 with the magnitude of offset angle (psi) 24 always close to zero may be useful in scenarios in which an unexpected or unfavorable rollback or operation in reverse direction 26 may occur. An advantage to this control scheme may be the ability to rapidly switch between operation in forward direction and reverse direction. A controller may be configured with at least two control schemes, wherein one control scheme configures CVT 400 into a stable configuration with higher magnitude offset angles (psi), and a sensitive configuration with the magnitude of offset angles (psi) closer to zero.

As described herein, planets 108 may be in contact with traction rings 102, 104 and sun 110. Contact may be direct or may include embodiments in which a traction fluid between contact points allows CVT 200, 300 or 400 to behave as if there is direct contact between components.

Operation in reverse direction 26, as described herein, may refer to powered and unpowered events in which a CVT is rotated in a direction opposite a design direction.

Embodiments disclosed herein may include a controller executing a set of instructions for a control process. As used herein, the term "shutdown" refers to a process or sequence in which power is removed from all electronic components. Shutdown may therefore include removing power from an electronic control unit (ECU), user displays, and the like, and may also include removing power from actuators, hydraulic and lubrication pumps, fans and other auxiliary and accessory devices.

A control process may include a controller tracking speed ratio, which may involve the controller tracking tilt angle (gamma) 28. Referring to embodiments of CVT 200, 300 or 400, in some embodiments, a controller may track speed ratio based on skew angle (zeta) 27. In some embodiments, a controller may track speed ratio relative to distance D that ring 212 is translated axially in CVT 200. In some embodiments, a controller corresponding to CVT 300 may track speed ratio based on a relative angular position (beta) of carrier halves 310A, 310B. In some embodiments, a controller corresponding to CVT 400 may track speed ratio based on skew angle (zeta) 27 of trunnion extensions 213. Variations in CVT geometry and components will allow for other ways to track speed ratio directly or indirectly. In some embodiments, tracking speed ratio using direct or indirect measurements may be performed once reverse speed is detected, and a controller may remain on an upshift (forward adjustment) side of the tracked speed ratio.

Examples of operation in reverse direction include the following scenarios:

In this scenario, vehicle speed is zero prior to shutdown, the prime mover is turned off, the controller is powered down, a range box (if part of the drivetrain) is in gear (forward or reverse), and the vehicle rolls in a direction opposite of the gear range selection. An example of this scenario occurs when a vehicle is stopped in a gear range on flat ground and powered off, but the vehicle is pushed or pulled in an opposite direction of the range. The controller is powered down, so downshift cannot be tracked as the vehicle rolls back and the CVT may lock if the planet axles translate into certain configurations. A control process may include the controller sensing when the vehicle stops (or is about to stop). The controller may impart a skew angle (zeta) to cause a slight upshift to the speed ratio before the controller is powered down, or the controller may, upon receiving a signal to power down, impart a skew angle (zeta) to cause a slight upshift to the speed ratio. In some embodiments, when the controller identifies a condition or set of conditions that may possibly result in a rollback situation, the controller may execute a set of instructions that result in a control system operating with a magnitude of an offset angle (psi) being closer to zero and with higher frequency data sampling. The magnitude of the offset angle (psi) may be greater than 3 degrees but less than 10 degrees, less than 5 degrees, or some other angle or range of angles that allows control of the CVT and is able to switch directions if needed.

In this scenario, vehicle speed is zero prior to shutdown, the prime mover is turned off, the controller is powered down, a range box (if part of the drivetrain) is in gear (forward or reverse), and the vehicle rolls in opposite direction of range selection. An example is if the vehicle stalls when traversing a hill and subsequently rolls backward. This scenario might be more common than the standard shutdown since there might not be enough time to adjust the transmission to underdrive. A challenge is that a tilt angle of the planet axles might not be tracked as the vehicle rolls back and the CVT may lock if the planet axles translate into certain configurations. A control process may include the controller sensing when the vehicle stalls (or is about to stall) and imparting a skew angle (zeta) to cause a slight upshift to the speed ratio before the controller powers down or changing an offset angle (psi) to, or the controller, upon receiving a signal indicating the engine has stalled and the controller is about to power down, imparting a skew angle (zeta) to cause a slight upshift to the speed ratio. In some embodiments, when the controller identifies a condition or set of conditions that are likely to result in a rollback situation, the controller may execute a set of instructions that result in a control system operating with a magnitude of an offset angle (psi) being closer to zero and with higher frequency data sampling. The magnitude of the offset angle (psi) may be greater than 3 degrees but less than 7 degrees, less than 5 degrees, or some other angle or range of angles that allows control of the CVT and is able to switch directions if needed.

In this scenario, the vehicle speed may be zero, with the prime mover speed below a clutch engagement point, such that even with a range box in gear (either forward or reverse), the vehicle rolls in the opposite direction of range selection. An example of this scenario is when a driver stops on a slope and releases the brake before either applying sufficient throttle to go forward or engaging a parking brake to prevent the vehicle from rolling backward. There may be different control processes, depending on the circumstances. The controller performs a control process to adjust a CVT to a slight upshift (forward adjustment) when the vehicle stops. If the vehicle is equipped with accelerometers or other sensors that allow the vehicle to detect slopes, a control process performs a slight upshift when a vehicle comes to a stop and a controller has determined that the vehicle is on a slope. Once reverse speed is detected, a controller may ensure a CVT remains on an upshift side of a target speed ratio. In some embodiments, when the controller identifies a condition or set of conditions that indicate a rollback situation, the controller may execute a set of instructions that result in a control system changing a sign of the offset angle (psi), operating with a magnitude of an offset angle (psi) being closer to zero, and with higher frequency data sampling. The magnitude of the offset angle (psi) may be greater than 3 degrees but less than 10 degrees, less than 5 degrees, or some other angle or range of angles that allows control of the CVT and is able to switch directions if needed.

In this scenario, the vehicle speed is zero, the prime mover speed is above a clutch engagement point, but the clutch is slipping and not transmitting torque to the drivetrain, the range box is in gear (forward or reverse) but the vehicle rolls in an opposite direction of the range selection. This may be due to the slope, towing, pushing, or some other external factor. This scenario may occur when a vehicle is on a steeper grade and the driver remains on the throttle but not enough to overcome the grade. In some embodiments, the controller executes instructions in a control process to adjust a CVT to a slight upshift (perform a forward adjustment) when the vehicle speed reaches zero. In some embodiments, tracking speed ratio using direct or indirect measurements may be performed once reverse speed is detected, and a controller may remain on an upshift (forward adjustment) side of the tracked speed ratio. A challenge with this scenario or control process is that timing of an upshift may be critical, as the timing between when wheel speed is zero and rollback begins may be very short. In some embodiments, when the controller identifies a condition or set of conditions that indicate a powered rollback situation, the controller may execute a set of instructions that result in a control system changing an offset angle (psi) of the CVT, operating with a magnitude of an offset angle (psi) closer to zero, changing the skew angle (zeta) to keep the CVT operating in a target range (overdrive or underdrive), and increasing the rate of frequency data sampling. Using CVT 200 depicted in FIGS. 2A-2J as an example, if CVT 200 is operating in overdrive in a forward direction (such as depicted in FIG. 2E) and encounters a powered rollback situation, a controller may execute a set of instructions to restrict the magnitude of the offset angle (psi) to be greater than 3 degrees but less than 10 degrees and ring 212 may be axially translated from a position near first traction ring 102 to a position near second traction ring 104 to keep CVT 200 in overdrive (as depicted in FIG. 2I), or an axial position of ring 212 may be maintained to switch operation of CVT 200 from overdrive to underdrive (as depicted in FIG. 2J). The CVT may be operated at some other angle or range of angles that allows control of the CVT and is able to switch directions if needed.

In this scenario, the vehicle speed is non-zero and the range box is in gear. There may be a fast transition from throttle to brake, the prime mover speed may remain high and the clutch may be engaged. Furthermore, the brakes may be applied hard, inducing wheel lock. This scenario may occur, for example, when there is an emergency stop on a slope, and the driver then releases the brake before reapplying the throttle or engaging a parking brake, or may occur if there is an emergency stop on flat ground but is then pushed or towed in an opposite direction. In some embodiments, a controller executes a set of instructions in a control process to downshift the CVT rapidly to avoid stalling the engine, such that power is constantly applied to the CVT controller. A control process may include the controller slightly upshifting (forward adjustment) a speed ratio of the CVT as the wheel speed nears zero. In some embodiments, once reverse speed is detected, the controller may execute a set of instructions to keep a CVT on an upshift (forward adjustment) of a target speed ratio. A challenge may be to the difficulty in smoothly tracking a relationship between wheel and engine speed at high wheel deceleration rates. A challenge is that rollback may be more likely when the throttle is reengaged if the CVT is not fully downshifted.

In this scenario, the vehicle speed is non-zero and the range box is in gear. The wheels lose traction and spin, so the transmission upshifts (adjusts forward). The vehicle may slow to a stop and the driver releases the throttle, so the prime mover is at idle and the clutch is open. The vehicle may roll in the opposite direction of range selection. This scenario may occur, for example, if the vehicle is climbing a hill of loose material, there is loss of traction, and the driver releases the throttle. The controller performs a control process to increase a speed ratio of the CVT when the wheels break loose. The controller may also perform a control process to slightly increase the speed ratio of the CVT when the wheel speed reaches zero. A control process may include tracking a ratio (or track a corresponding parameter such as tilt angle (gamma) 28) with beta angle 29, remaining in an upshift side of present speed ratio. A challenge with existing CVTs includes the difficulty in smoothly tracking a relationship between wheel speed and engine speed at high wheel acceleration rates. Also, in some prior approaches, tilt angle (gamma) 28 must be tracked through a full ratio sweep. Embodiments disclosed herein may mitigate this challenge by allowing a controller to execute a control process that is able to independently adjust speed ratio and offset angle, such that the CVT may be adjusted quickly for a wide range of conditions. If the transmission is already at the highest speed ratio, further increases are not possible and a controller may execute a set of instructions to maintain a maximum skew angle (zeta) and the rate of data sampling may decrease.

In this scenario, the vehicle speed is non-zero and the range box is in gear. The wheels lose traction and spin, so the speed ratio of a CVT increases. The vehicle may slow but then regain traction, so the driver remains on the throttle and the input clutch experiences slipping. The vehicle may roll in the opposite direction of range selection. This scenario may occur, for example, if the vehicle is climbing a loose hill, there is loss of traction, but the driver remains on the throttle and traction is regained. A control process may be a rapid increase of speed ratio when the wheels break loose. A control process for a CVT may include increasing a skew angle (zeta) to cause a slight upshift when the wheel speed reaches zero. In some embodiments, a controller may track a speed ratio and adjust the skew angle (zeta) to remain in upshift side of a target speed ratio. Tracking a relationship between wheel speed and engine speed at high wheel acceleration rates may be difficult, rollback may be more likely due to an upshift prior to stalling, and tilt angle (gamma) must be tracked through a full ratio sweep. Embodiments disclosed herein may mitigate this challenge by allowing a controller to execute a control process that is able to independently adjust speed ratio and offset angle, such that the CVT may be adjusted quickly for a wide range of conditions. If the transmission is already fully upshifted to full overdrive, further upshifting to enable rollback is not possible. Embodiments disclosed herein may address operation in reverse direction—including rollback—of continuously variable transmissions. Embodiments described herein may be particularly useful for controlling CVTs by imparting a skew angle (zeta) on a plurality of planets to control a transmission ratio.

A drivetrain may include a prime mover, a CVT, and a control system. A prime mover generates power. Power may be delivered at a constant speed level or at varying (including modulating) speed levels, which depend on, among other things, user inputs or output power. A planetary gear set allows a drive train having a CVT to operate in various modes. By selectively locking or unlocking one or more of a sun gear, a set of planet gears, or a ring gear, the drive train can operate in various modes including, but not limited to, low mode, high mode, forward mode, or reverse mode. For example, power may be input through the sun gear, and by locking a ring gear, power exits the set of planet gears, but in a reverse direction. A control system receives signals indicating operating conditions for one or more of the prime mover, clutches, a planetary gear set, a CVT and a differential, and sends control signals to one or more of the prime mover, the clutches, the planetary gear set and the CVT. The control signals ensure a target performance of the drivetrain. In some embodiments, signals indicating operating conditions of a prime mover are not received. However, in other embodiments, signals indicating operating conditions of a prime mover are received, allowing embodiments to take advantage of the capabilities of a CVT and optimize performance of the prime mover as well as the performance of an auxiliary device or accessory on a vehicle. A control system for a CVT employing a plurality of tiltable balls may receive signals indicating a target direction of rotation and an actual direction of rotation. Signals indicating a target direction of rotation may include user inputs, signals from an accelerometer, throttle or other vehicle sensor, signals from a global positioning system (GPS) or other external source, including combinations thereof. Signals indicating an actual direction of rotation may include signals from accelerometers or similar systems indicating relative movement, signals from pickups or other sensors directly sensing (or measuring) parameters of internal components, or environmental sensors capable of determining motion of a vehicle based on changes in the surroundings. In some embodiments, the control system is configured to determine an unintended change in the direction of rotation based on an indication of brake pressure or an increase in brake pressure and/or reduced vehicle speed or a vehicle speed below a predetermined threshold. The threshold may be constant or may vary according to several factors, including but not limited to, a load, a pitch angle, a roll angle, wheel speed, vehicle speed, hydraulic pressure, brake pressure, or some other factor or combination of factors. For example, if the wheel speed is low relative to vehicle speed, embodiments may determine the vehicle is slipping, or high brake pressure in combination with any non-zero vehicle speed may determine the vehicle operator is trying to stop the vehicle. Hydraulic pressure may indicate a load. A pitch angle and a roll angle (and the combination) are examples of factors that might help determine conditions in which rollback is more likely to occur. A control system may be configured to determine an unintended change in the direction of rotation based on a comparison of engine speed and vehicle speed, including acceleration (a rate of change of vehicle speed). For example, a controller may receive signals from an engine speed sensor indicating the engine is operating at an increased speed and a vehicle speed sensor indicating the vehicle speed is decreasing. This comparison may indicate the wheels are slipping. The controller may then perform any processes necessary to counteract the effects of operation in reverse direction of a CVT. For example, in some embodiments, a control system is configured to impart an additional skew condition to each planet. In some embodiments, a control system is configured to send an indication to increase throttle of the prime mover. Other signals and indicators may be used to determine when operation in reverse direction is possible or likely. For example, in some embodiments, a control system is configured to determine if a clutch is slipping, if the vehicle is on a slope likely to result in the vehicle stalling.

In operation, a prime mover generates power having an associated torque and speed. Power may be transmitted directly to the CVT, such as by a direct coupling the prime mover to the CVT, or indirectly through an element such as a shaft, sprocket, chain, belt, pulley or planetary gear set to the CVT. Power from the CVT may be transmitted either directly or indirectly to a downstream gear set. A gear set may be configured for an output torque or speed. For example, power may enter a planetary gear set via an outer ring but may exit the planetary gear set via a sun gear. Alternatively, a planetary gear set may be configured to allow power to enter via a carrier, a sun gear, a planet gear or some combination. Similarly, a planetary gear set may be configured to allow power to exit the planetary gear set via the outer ring, the planet gears, the carrier, the sun gear, or some combination. A control system receives signals related to the operation of the prime mover or CVT and optimizes one or more of the prime mover operation or the CVT operation based on a target output parameter or operating condition. For example, a result may be based on efficiency or acceleration (power transfer).

Embodiments disclosed herein may provide additional advantages. For example, embodiments disclosed with respect to CVT 200 and 400 are free from side components, which may allow for better circulation of lubrication using unpowered techniques (e.g., "splash lubrication"), whereas embodiments disclosed with respect to CVT 300 may include lubrication channels, ports, or other fluid delivery systems in carriers 310A, 310B for powered or directed lubrication.

Embodiments disclosed herein are exemplary. Other modifications may be possible that are still within the scope of the disclosure. For example, FIGS. 2A-2J depict embodiments in which axles 103 are axially fixed to planets 108 and planets 108 are axially fixed by other components including first traction ring 102, second traction ring 104, and sun 110 such that tilting planets 108 is accomplished by an axial translation of trunnion extensions 215.

A variation of an embodiment of FIGS. 2A-2J is also described in which trunnion extensions 215 are axially fixed, and axles 103 are axially translatable relative to planets 108 to tilt planets 108. A person of skill in the art will appreciate, after reading this disclosure, that a variation may be possible in which a third point is located along the line AB between point A (the intersection of axis of rotation 106 and a midplane of axles 103) and point B (a geometric center of couplings 215) in which axles 103 may be translated axially in a first direction and couplings 215 may be translated axially in an opposite direction to cause planets 108 to tilt, wherein the distance that point A and point B are translated depend on the location of the third point on line AB.

As another example of variations possible within the scope of the disclosed technology, FIGS. 3A-3J depict one embodiment in which links 321 are coupled between axles 103 and carrier arms 311 via pins or other couplings 312. Rotation of carriers 310A, 310B to adjust carrier arms 311 may require multiple degrees of freedom. Pins 312 are depicted in slots 313. Pins may be spherical or have some other arcuate surface to provide multiple degrees of freedom. Links 321 may also provide one or more degrees of freedom. Other configurations and materials may provide other degrees of freedom, may improve degrees of freedom, may provide directional degrees of freedom. In FIGS. 3A-3J, carrier arms 311A, 311B are depicted generally as radial spokes. However, in some embodiments, carrier arms 311A, 311B may be curved (in an axial, radial or angular direction), angled, or otherwise configured to provide degrees of freedom.

As used herein, the terms "comprises," "comprising," "includes," "including," "has," "having" or any other variation thereof, are intended to cover a non-exclusive inclusion.

For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. That is, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present).

As used herein, a term preceded by "a" or "an" (and "the" when antecedent basis is "a" or "an") includes both singular and plural of such term unless the context clearly dictates otherwise. Also, as used herein, the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments that may or may not be given therewith or elsewhere in the specification and all such embodiments are intended to be included within the scope of that term or those terms.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," or "in an embodiment," or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the disclosed technology.

Although the disclosed technology has been described with respect to specific embodiments thereof, these embodiments are merely illustrative, and not restrictive of the disclosed technology. The description herein of illustrated embodiments of the disclosed technology is not intended to be exhaustive or to limit the disclosed technology to the precise forms disclosed herein (and in particular, the inclusion of any particular embodiment, feature or function is not intended to limit the scope of the disclosed technology to such embodiment, feature or function). Rather, the description is intended to describe illustrative embodiments, features and functions in order to provide a person of ordinary skill in the art context to understand the disclosed technology without limiting the disclosed technology to any particularly described embodiment, feature or function. While specific embodiments of, and examples for, the disclosed technology are described herein for illustrative purposes only, various equivalent modifications are possible within the spirit and scope of the disclosed technology, as those skilled in the relevant art will recognize and appreciate. As indicated, these modifications may be made to the disclosed technology in light of the foregoing description of illustrated embodiments of the disclosed technology and are to be included within the spirit and scope of the disclosed technology. Thus, while the disclosed technology has been described herein with reference to particular embodiments thereof, a latitude of modification, various changes and substitutions are intended in the foregoing disclosures, and it will be appreciated that in some instances some features of embodiments of the disclosed technology will be employed without a corresponding use of other features without departing from the scope and spirit of the disclosed technology as set forth. Therefore, many modifications may be made to adapt a particular situation or material to the essential scope and spirit of the disclosed technology.

In the description herein, numerous specific details are provided, such as examples of components and/or methods, to provide a thorough understanding of embodiments of the disclosed technology. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the disclosed technology. While the disclosed technology may be illustrated by using a particular embodiment, this is not and does not limit the disclosed technology to any particular embodiment and a person of ordinary skill in the art will recognize that additional embodiments are readily understandable and are a part of this disclosed technology.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

What is claimed is:

1. A continuously variable transmission (CVT) having a central axis, the CVT comprising:
   first and second traction rings rotatable about the central axis;
   a sun rotatable about the central axis;
   a plurality of planet assemblies configured to transfer power between the first and second traction rings, each planet assembly coupled to the first and second traction rings and the sun, each planet assembly comprising a planet rotatable about a planet axle, the planet axle defining an axis of rotation of the planet, each planet axle capable of being skewed to form a skew angle in a first direction between the central axis and the planet axle and of tilting to form a tilt angle in a second direction between the central axis and the planet axle, the tilt angle defining a transmission ratio of the CVT;
   a first carrier half coaxial with and at least partially rotatable about the central axis, the first carrier half coupled to a first end of each of the planet axles;

a second carrier half coaxial with and at least partially rotatable about the central axis, the second carrier half coupled by a plurality of links to a second end of each of the planet axles, the first carrier half and second carrier half being rotatable with respect to each other to define an angular position, the first carrier half and the second carrier half being limited in relative rotation with respect to each other to a maximum angular position, a non-zero angular position of the relative rotation of the first and second carrier halves imparting a non-zero skew angle on each of the planet axles, the non-zero skew angle imparting an adjustment to the tilt angle of each of the planet axles, thereby resulting in a change in the transmission ratio of the CVT; and a plurality of couplings configured to couple the plurality of links to the second carrier half, the plurality of couplings configured to allow the plurality of links to rotate out of plane with the second carrier half to facilitate tilting of the planet axles.

2. The CVT of claim 1, wherein the plurality of couplings comprise ball joints.

3. The CVT of claim 1, wherein the plurality of links are flexible.

4. The CVT of claim 1, further comprising:

a pitch circle coaxial about the central axis and having a radius equal to a plurality of centers of the planet assemblies; and a plurality of connections configured to connect the plurality of links to the plurality of planet axles, an effective offset angle defined by a tangent of the pitch circle at a respective one of the plurality of connections and a line between an associated one of the plurality of connections and an associated one of the plurality of couplings, the effective offset angle being positive when the plurality of links are located radially outside of the pitch circle, a positive offset angle associated with a forward direction of rotation, and the effective offset angle being negative when the plurality of links are located radially inside of the pitch circle, a negative offset angle associated with a reverse direction of rotation.

5. The CVT of claim 4, further comprising an actuator configured to adjust the radial position of the plurality of couplings in order to adjust the effective offset angle.

6. The CVT of claim 5, wherein the actuator is configured to adjust the radial position of the plurality of couplings to a positive effective offset angle when the CVT is rotating in the forward direction of rotation, and wherein the actuator is configured to adjust the radial position of the plurality of couplings to a negative offset angle when the CVT is rotating in the reverse direction of rotation.

* * * * *